United States Patent
Xiong et al.

(10) Patent No.: US 10,103,847 B2
(45) Date of Patent: Oct. 16, 2018

(54) METHODS APPARATUS OF ENB AND UE FOR MTC WITH NARROWBAND DEPLOYMENT

(71) Applicant: Intel IP Corporation, Santa Clara, CA (US)

(72) Inventors: Gang Xiong, Beaverton, OR (US); Seunghee Han, San Jose, CA (US); Debdeep Chatterjee, Mountain View, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/129,263

(22) PCT Filed: Jun. 26, 2015

(86) PCT No.: PCT/US2015/038000
§ 371 (c)(1),
(2) Date: Sep. 26, 2016

(87) PCT Pub. No.: WO2015/200804
PCT Pub. Date: Dec. 30, 2015

(65) Prior Publication Data
US 2017/0180086 A1 Jun. 22, 2017

Related U.S. Application Data

(60) Provisional application No. 62/018,360, filed on Jun. 27, 2014, provisional application No. 62/020,314, (Continued)

(51) Int. Cl.
*H04B 7/26* (2006.01)
*H04L 1/18* (2006.01)
(Continued)

(52) U.S. Cl.
CPC ........... *H04L 1/1861* (2013.01); *H04B 7/26* (2013.01); *H04L 1/1854* (2013.01);
(Continued)

(58) Field of Classification Search
None
See application file for complete search history.

(56) References Cited

U.S. PATENT DOCUMENTS

| 2010/0008332 A1* | 1/2010 | Balachandran ....... H04L 5/0007 370/336 |
| 2013/0083753 A1 | 4/2013 | Lee et al. |

(Continued)

FOREIGN PATENT DOCUMENTS

| CN | 102958157 A | 3/2013 |
| JP | 2017526197 A | 9/2017 |

(Continued)

OTHER PUBLICATIONS

"International Application Serial No. PCT/US2015/038000, International Search Report dated Oct. 16, 2015", 3 pgs.

(Continued)

*Primary Examiner* — Noel R Beharry
*Assistant Examiner* — Nicole King
(74) *Attorney, Agent, or Firm* — Schwegman Lundberg & Woessner, P.A.

(57) ABSTRACT

Systems, apparatus, user equipment (UE), evolved node B(eNB), and methods are described for machine-type communications (MTC) with narrowband deployment comprising including MTC Physical Control Format Indicator (M-PCFICH). One embodiment includes control circuitry configured to determine a super-frame structure, wherein the super-frame structure is set, at least in part, on a bandwidth of the narrowband deployment. The embodiment further comprises circuitry to determine configuration information (Continued)

for a UE in communication with the eNB, generate a configuration for an MTC Control Format Indicator (M-CFI) for the UE to indicate the determined configuration information, and transmit the M-CFI through a narrowband M-PCFICH within the super-frame structure.

24 Claims, 33 Drawing Sheets

Related U.S. Application Data filed on Jul. 2, 2014, provisional application No. 62/031,491, filed on Jul. 31, 2014.

(51) Int. Cl.
| | |
|---|---|
| *H04L 29/08* | (2006.01) |
| *H04L 5/00* | (2006.01) |
| *H04W 4/00* | (2018.01) |
| *H04W 72/12* | (2009.01) |
| *H04W 84/18* | (2009.01) |
| *H04W 92/16* | (2009.01) |
| *H04W 4/70* | (2018.01) |

(52) U.S. Cl.
CPC .......... *H04L 5/0037* (2013.01); *H04L 5/0042* (2013.01); *H04L 29/08306* (2013.01); *H04W 4/005* (2013.01); *H04W 4/70* (2018.02); *H04W 72/1215* (2013.01); *H04W 84/18* (2013.01); *H04W 92/16* (2013.01)

(56) References Cited

U.S. PATENT DOCUMENTS

| | | | |
|---|---|---|---|
| 2013/0100900 A1* | 4/2013 | Lee | H04W 72/048 370/329 |
| 2013/0121317 A1 | 5/2013 | Lee et al. | |
| 2013/0250878 A1 | 9/2013 | Sayana et al. | |
| 2014/0044056 A1 | 2/2014 | Chen et al. | |
| 2015/0280876 A1* | 10/2015 | You | H04L 5/0048 370/329 |

FOREIGN PATENT DOCUMENTS

| | | |
|---|---|---|
| WO | WO-2014077577 A1 | 5/2014 |
| WO | WO-2015200804 A1 | 12/2015 |

OTHER PUBLICATIONS

"International Application Serial No. PCT/US2015/038000, Written Opinion dated Oct. 16, 2015", 8 pgs.
"PBCH transmission for MTC coverage enhancement", R1-140302, 3GPP TSG RAN WG1, LG Electronics, (Feb. 1, 2014).
"Chinese Application Serial No. 201580027002.2, Voluntary Amendment filed on Sep. 1, 2017", (W/ English Claims), 30 pgs.
"European Application Serial No. 15812704.3, Extended European Search Report dated Feb. 7, 2018", 9 pgs.
"Japanese Application Serial No. 2016-567911, Office Action dated Feb. 27, 2018", 5 pgs.
"Korean Application Serial 10-2016-7032947, Notice of Preliminary Rejection dated Nov. 17, 2017", 10 pgs.
"Korean Application Serial No. 10-2016-7032947, Response Filed Jan. 16, 2018 to Notice of Preliminary Rejection dated Nov. 17, 2017", (W English Claims), 33 pgs.
Intel Corporation, "Coverage Improvement for PCFICH and PHICH", 3GPP Draft; R1-140117, vol. RAN WG1, No. Prague, Czech Republic, [Online] Retrieved from the internet: <URL:http://www.3gpp.org/ftp/Meetings 3GPP SYNC/RAN/RANI/Docs/> [retrieved on Feb. 9, 2014], (Feb. 9, 2014), 6 pgs.
Samsung, "PHICH and PCFICH for low cost & enhanced coverage MTC UE", 3GPP Draft; R1-135200, vol. RAN WG1, Online Retrieved from the internet: <URL:http://www.3gpp.org/ftp/tsg ran/WG1_RL1/TSGRI_75/Docs/> [retrieved on Nov. 2, 2013], (Nov. 2, 2013), 2 pgs.

* cited by examiner

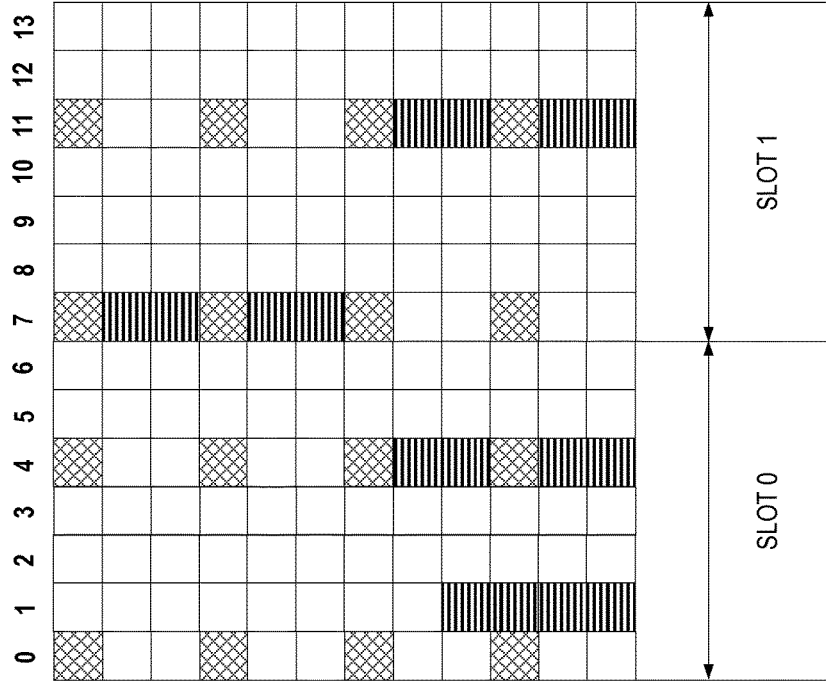
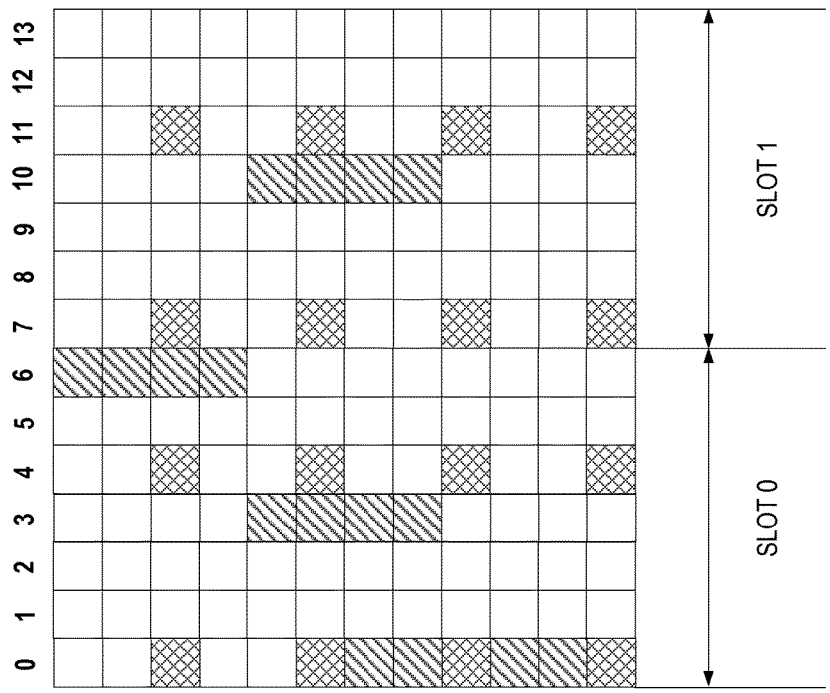
FIG. 13B
FIG. 13A

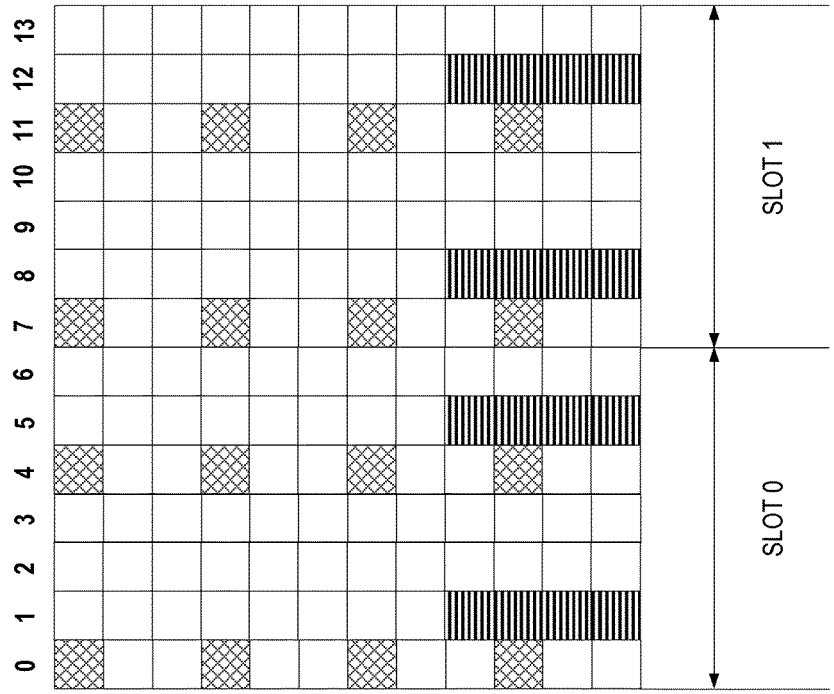
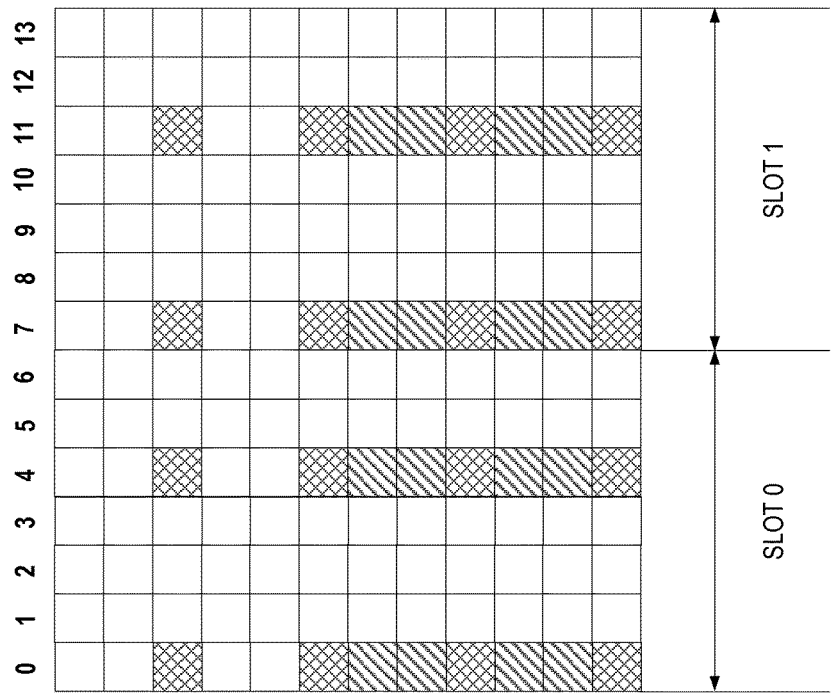
FIG. 15B
FIG. 15A

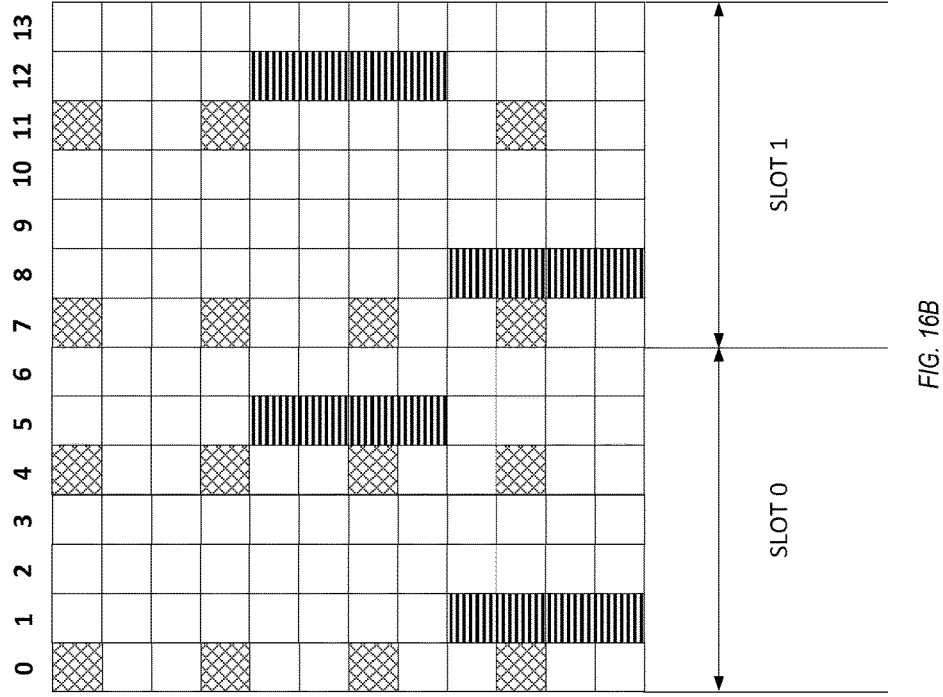
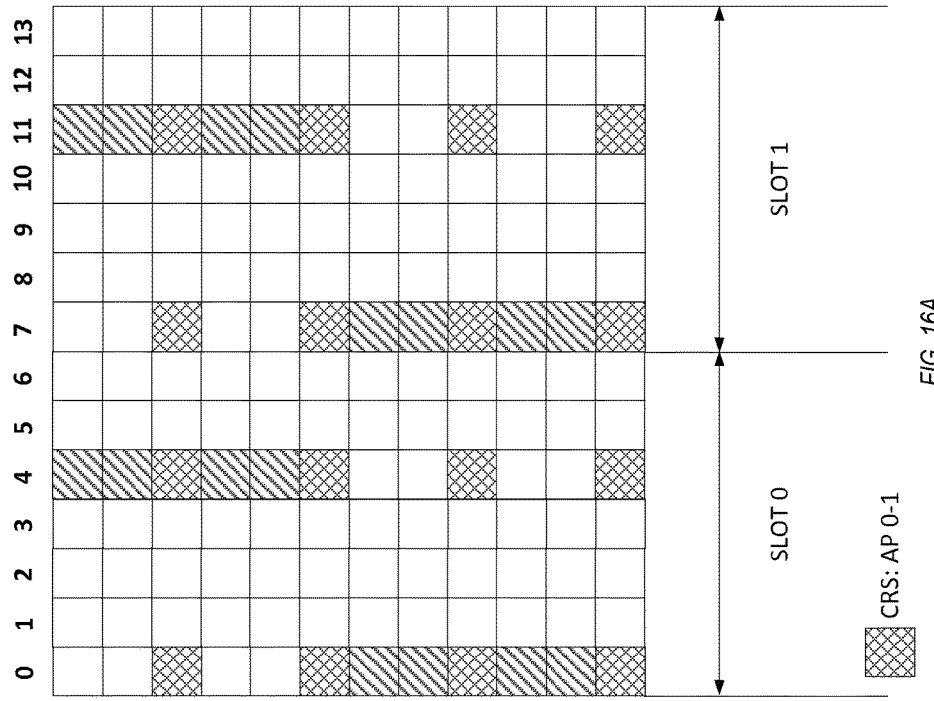
FIG. 16B
FIG. 16A

METHODS APPARATUS OF ENB AND UE FOR MTC WITH NARROWBAND DEPLOYMENT

PRIORITY CLAIM

This application is a U.S. National Stage Filing under 35 U.S.C. 371 from International Application No. PCT/US2015/038000, filed Jun. 26, 2015 and published in English as WO 2015/200804 on Dec. 30, 2015. which claims the benefit of priority to U.S. Provisional Patent Application Ser. No. 62/020,314 filed on Jul. 2, 2014 and entitled "PCFICH DESIGN FOR MTC WITH NARROWBAND DEPLOYMENT"; U.S. Provisional Patent Application Ser. No. 62/018,360 filed on Jun. 27, 2014 and entitled "SYSTEM DESIGN FOR MTC WITH NARROWBAND DEPLOYMENT"; and U.S. Provisional Patent Application Ser. No. 62/031,491 filed ON Jul. 31, 2014 and entitled "PHICH DESIGN FOR MTC WITH NARROWBAND DEPLOYMENT," all of which are incorporated herein by reference in their entirety.

TECHNICAL FIELD

Embodiments pertain to systems, methods, and component devices for wireless communications, and particularly to machine type communication (MTC).

BACKGROUND

MTC is an emerging technology related to the concept of "Internet of Things (IoT)." Existing mobile broadband networks were designed to optimize performance mainly for human type of communications and thus are not designed or optimized to meet MTC related requirements.

BRIEF DESCRIPTION OF THE DRAWINGS

FIG. 13A illustrates aspects of PCFICH resource mapping for certain REG mapping patterns, antenna port, and CP options according to certain embodiments.

FIG. 13B illustrates aspects of PCFICH resource mapping for certain REG mapping patterns, antenna port, and CP options according to certain embodiments.

FIG. 15A illustrates aspects of PCFICH resource mapping for certain REG mapping patterns, antenna port, and CP options according to certain embodiments.

FIG. 15B illustrates aspects of PCFICH resource mapping for certain REG mapping patterns, antenna port, and CP options according to certain embodiments.

FIG. 16A illustrates aspects of PCFICH resource mapping for certain REG mapping patterns, antenna port, and CP options according to certain embodiments.

FIG. 16B illustrates aspects of PCFICH resource mapping for certain REG mapping patterns, antenna port, and CP options according to certain embodiments.

DETAILED DESCRIPTION

Embodiments relate to systems, devices, apparatus, assemblies, methods, and computer readable media to enable MTC using reduced system bandwidth (e.g., 50 KHz, 100 KHz, 200 KHz, 400 KHz, 500 KHz, 600 KHz, etc.). In particular, systems and methods are described for UE associated with an eNB to implement communications with such reduced system bandwidth. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
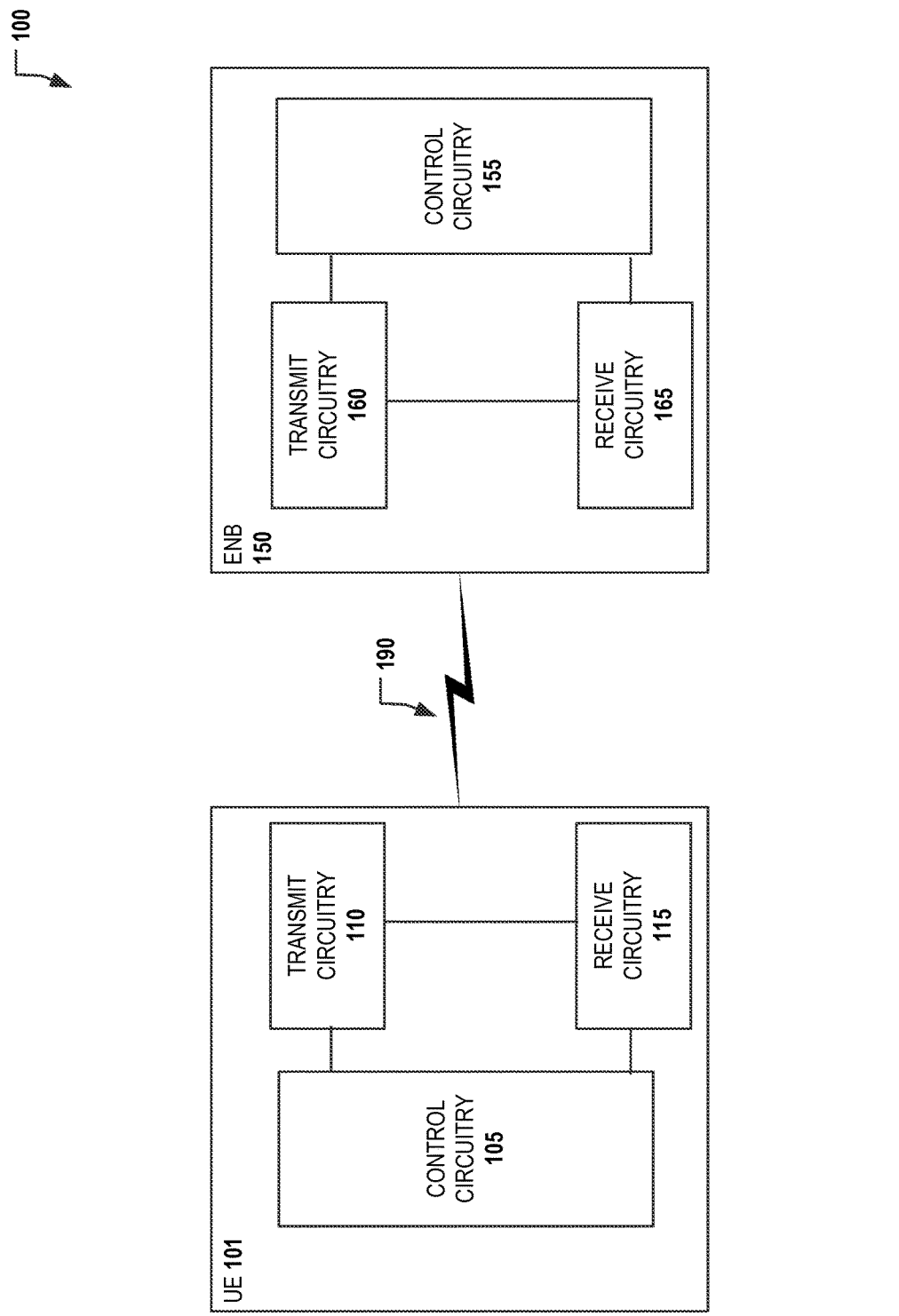
FIG. 1 illustrates a block diagram of a system including an evolved node B (eNB) and user equipment (UE) that may operate with MTC, according to certain embodiments.

FIG. 1 illustrates a wireless network 100, in accordance with some embodiments. The wireless network 100 includes UE 101 and eNB 150 connected via air interface 190. The UE 101 and any other UE in the system may be, for example, laptop computers, smart phones, tablet computers, printers, machine-type devices such as smart meters or specialized devices for healthcare monitoring, remote security surveillance, an intelligent transportation system, or any other wireless devices with or without a user interface. The eNB 150 provides network connectivity to a broader network (not shown) to UE 101 via air interface 190 in an eNB service area provided by eNB 150. Each eNB service area associated with eNB 150 is supported by antennas integrated with eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of eNB 150, for example, includes three sectors each covering a 120 degree area with an array of antennas directed to each sector to provide 360 degree coverage around eNB 150.

UE 101 includes control circuitry 105 coupled with transmit circuitry 110 and receive circuitry 115. The transmit circuitry 110 and receive circuitry 115 may each be coupled with one or more antennas.

The control circuitry 105 may be adapted to perform operations associated with MTC. The transmit circuitry 110 and receive circuitry 115 may be adapted to transmit and receive data, respectively, within a narrow system bandwidth (e.g., 200 kHz). The control circuitry 105 may perform various operations such as those described elsewhere in this disclosure related to a UE.

Within the narrow system bandwidth, the transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may transmit the plurality of multiplexed uplink physical channels in an uplink super-frame that is comprised of a plurality of uplink subframes.

Within the narrow system bandwidth, the receive circuitry 115 may receive a plurality of multiplexed downlink physical channels. The plurality of downlink physical channels may be multiplexed according to TDM or FDM. The receive circuitry 115 may receive the plurality of multiplexed downlink physical channels in a downlink super-frame that is comprised of a plurality of downlink subframes.

The transmit circuitry 110 and receive circuitry 115 may transmit and receive, respectively, HARQ acknowledgment (ACK) and/or negative acknowledgement (NACK) messages across air interface 190 according to a predetermined HARQ message schedule. The predetermined HARQ message schedule may indicate uplink and/or downlink super-frames in which the HARQ ACK and/or NACK messages are to appear.

FIG. 1 also illustrates eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via air interface 190.

The control circuitry 155 may be adapted to perform operations associated with MTC. The transmit circuitry 160 and receive circuitry 165 may be adapted to transmit and receive data, respectively, within a narrow system bandwidth (e.g., 200 kHz). The control circuitry 155 may perform various operations such as those described elsewhere in this disclosure related to an eNB.

Within the narrow system bandwidth, the transmit circuitry 110 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

The transmit circuitry 160 and receive circuitry 165 may transmit and receive, respectively, HARQ ACK and/or NACK messages across air interface 190 according to a predetermined HARQ message schedule. The predetermined HARQ message schedule may indicate uplink and/or downlink super-frames in which the HARQ ACK and/or NACK messages are to appear. MTC may then be implemented across air interface 190 using the circuitry of UE 101 and eNB 150. MTC enables a ubiquitous computing environment to enable devices to efficiently communicate with each other. IoT services and applications stimulate the design and development of MTC devices to be seamlessly integrated into current and next generation mobile broadband networks such as long term evolution (LTE) and LTE-Advanced communication systems that operate according to $3^{rd}$ generation partnership project (3GPP) standards (e.g., 3GPP LTE Evolved Universal Terrestrial Radio Access (E-UTRA) Physical Layer Procedures (Release 12) Sep. 26, 2014).

These existing mobile broadband networks were designed to optimize performance mainly for human type of communications and thus are not designed or optimized to meet the MTC related requirements. MTC systems as described herein function to lower device costs, enhanced coverage, and reduced power consumption. Embodiments described herein particularly reduce cost and power consumption by reducing the system bandwidth, which is corresponding to roughly a single Physical Resource Block (PRB) of existing LTE design. This cellular IoT using reduced system bandwidth could potentially operate in a re-allocated global system for mobile communications (GSM) spectrum, within the guard bands of an LTE carrier, or dedicated spectrum.

When LTE system bandwidth is reduced to a lower bandwidth, certain physical channel designs in existing LTE system cannot be reused because the channel standards are not compatible with the lower bandwidth constraint. Embodiments herein thus describe devices, systems, apparatus, and methods for MTC with narrowband deployment to address the issues identified above due to the narrower bandwidth constraint (e.g., PBCH, SCH, physical random access channel (PRACH), etc.)

Embodiments may thus include a super-frame structure where multiple physical channels can be multiplexed in a TDM manner; control channel design for MTC with narrowband deployment; and HARQ procedure with various number of HARQ processes for MTC with narrowband deployment.

Although the embodiments described below use a 200 kHz bandwidth, the design may be extended to other narrow bandwidth (e.g., 50 KHz, 100 KHz, 400 KHz, 500 KHz, 600 KHz, and etcetera). In addition, the MTC is used as the initial target application for the proposed narrow-band design, the design maybe be extended to other narrow-band deployed applications, (e.g., Device-to-Device, IoT, etc.).

Figure 2:
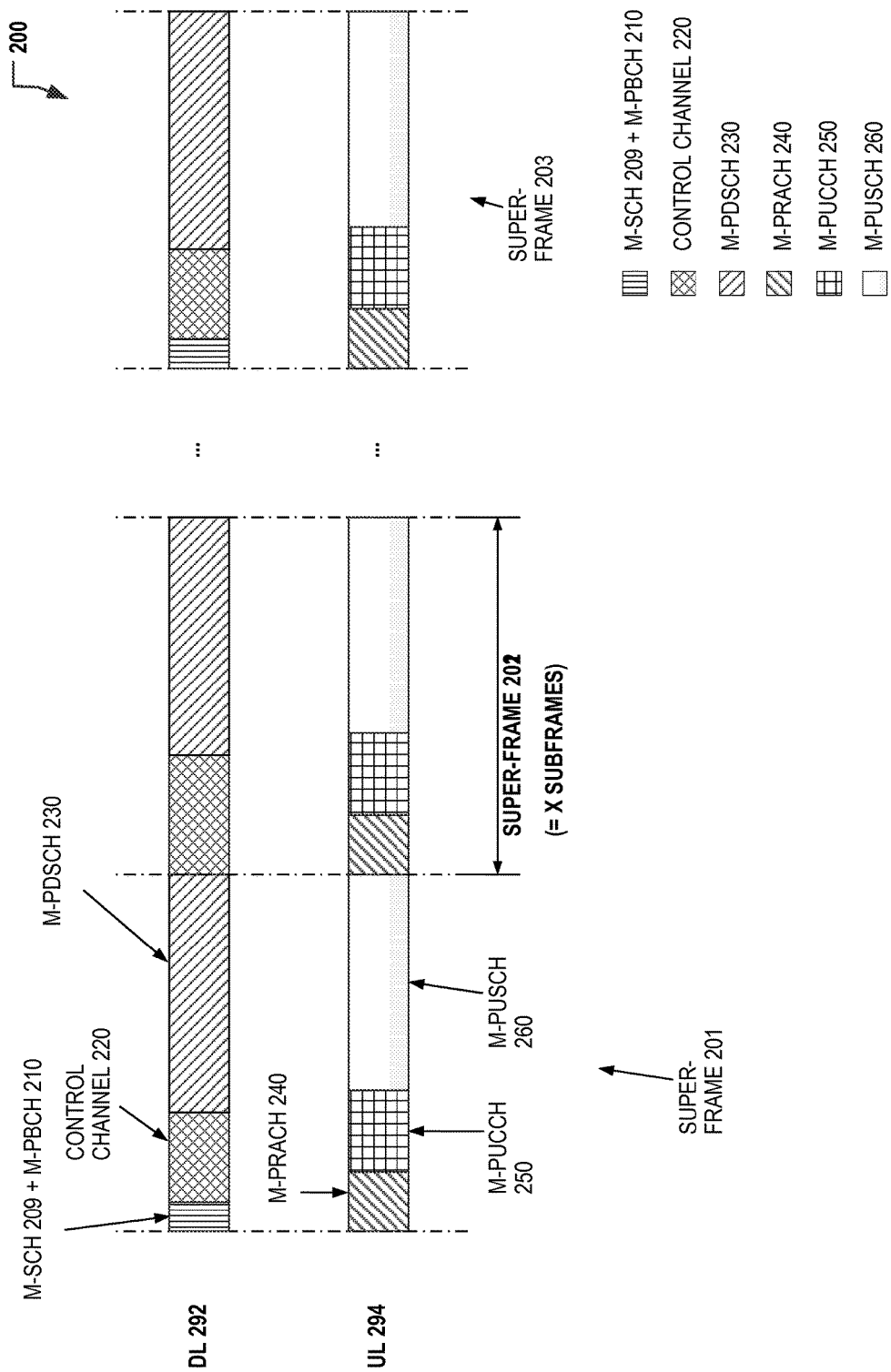
FIG. 2 illustrates aspects of system design form MTC with narrowband deployment, according to certain embodiments.

Various physical channels may be used as part of such an MTC. FIG. 2 illustrates one possible implementation of such; channels in channel design 200 are illustrated within super-frames 201, 202, and 203 for both download 292 and upload 294 paths. These physical channels include, but are not limited to, a synchronization channel (M-SCH) 209, a physical broadcast channel (M-PBCH) 210, a control channel 220, a physical downlink shared channel (M-PDSCH) 230, a physical random access channel (M-PRACH) 240, a physical uplink control channel (M-PUCCH) 250, and a physical uplink shared channel (M-PUSCH) 260. These channels and other potential channels are described below. MTC Synchronization Channel (M-SCH) 209 may include the MTC Primary Synchronization Signal (M-PSS) and/or MTC Secondary Synchronization Signal (M-SSS). It may be used to support time and frequency synchronization and provide the UE with the physical layer identity of the cell and the cyclic prefix length. Note that M-SCH may or may not be utilized to distinguish the Frequency Division Duplex (FDD) and Time Division Duplex (TDD) system although the TDD may not need to be supported in MTC system with narrowband deployment.

MTC Physical Broadcast Channel (M-PBCH) 210 carries MTC Master Information Block (M-MIB), which consists of a limited number of the most frequently transmitted parameters for initial access to the cell.

The MTC control channel includes MTC Physical Downlink Control Channel (M-PDCCH) and/or MTC Physical Control Format Indicator Channel (M-PCFICH) and/or MTC Physical Hybrid ARQ Indicator Channel (M-PHICH). Note that for the downlink data transmission, time domain resource allocation is supported, while for the uplink data transmission, time domain and/or frequency domain resource allocation can be supported.

M-PDSCH 230 is used for all user data, as well as for broadcast system information which is not carried on the PBCH 210, and for paging messages.

M-PUSCH 260 is used for uplink data transmission. It may be used to carry MTC Uplink Control Information (M-UCI) for MTC with narrowband deployment.

M-PRACH 240 is used to transmit the random access preamble. For initial access, it is utilized to achieve uplink synchronization.

M-PUCCH 250 is used to carry M-UCI. In particular, scheduling requests and HARQ acknowledgements for received M-SCH 209 transport blocks can be supported in M-PUCCH 250 transmission. Given the nature of narrowband transmission, it may not be beneficial to support the channel state reports in M-PUCCH 250, which is mainly used to facilitate channel dependent scheduling.

MTC Physical Multicast Channel (M-PMCH) is used to support Multimedia Broadcast and Multicast Services (MBMS).

FIG. 2 illustrates a system design for MTC with narrowband deployment. In the system design, a certain number of subframes are formed as a super-frame (e.g., X subframes are used to form a super-frame as shown in FIG. 2). The starting subframe and duration of the super-frame can be predefined or configured by eNB, where in the latter case, scheduling flexibility can be provided depending on specific system configuration, traffic scenarios, and the like. The duration of the super-frame and the corresponding number of subframes in a super-frame is determined at least in part based on the bandwidth of the narrowband deployment. In various embodiments, the super-frame duration is configured to enable compatibility with standard bandwidth LTE systems for MTC communications operating at narrow bandwidths as described above. In one embodiment, this configuration information can be included in the MIB conveyed in the M-PBCH or it can be carried in another system information block (SIB).

In the super-frame, multiple physical channels are multiplexed in a TDM or FDM) manner More specifically, in the download (DL) 202, either control channel/M-PDSCH or M-SCH/M-PBCH/M-PDSCH/control channel can be multiplexed in one super-frame. For example, as illustrated, super-frame 201 includes M-SCH 209A, M-PBCH 210A, Control channel 220A, and M-PDSCH 230A in the DL 202 of super-frame 201 and M-PRACH 240A, M-PUCCH 250A, and M-PUSCH 260A as segments in the upload (UL) 204 of super-frame 201. Thus, M-PRACH/M-PUCCH/PUSCH can be multiplexed in one super-frame. Note that UL 204 and DL 202 may have certain subframes offset to allow additional processing time. This super-frame structure is also beneficial to address the issue in the coverage limited scenarios. In particular, periodicity of a super-frame can be extended to allow more repetitions for DL 202 and UL 204 transmission, thereby improving the link budget. In certain embodiments, for example, a coverage enhancement target is selected for a system. A coverage enhancement target may be a link budget improvement associated with a periodicity of the super-frame structure. In other words, by increasing the size of a super-frame within the super-frame structure by, for example, increasing the number of subframes in a super-frame and thereby increasing the percentage of a super-frame devoted to data instead of overhead, the link budget is improved. In other embodiments, the size of a super-frame may be based, at least in part, on the bandwidth of the MTC system. In certain embodiments, a superframe may be set to match the amount of data in an MTC super-frame with the amount of data in a single frame (e.g. 10 subframes) in a standard LTE or LTE-advanced system. In other embodiments, the structure of a superframe may be based on a combination of coverage enhancement targets and compatibility with other systems based on the bandwidth of the MTC system.

In one embodiment, a MTC region can be defined in order to coexist with a current LTE system. In particular, the starting orthogonal frequency division multiplexing (OFDM) symbols of the MTC region in each subframe can be predefined or configured by a higher layer. For instance, the starting symbol of the MTC region can be configured after the PDCCH region in the legacy LTE system.

In the DL 202, M-PDSCH transmission is scheduled and follows M-PDCCH transmission. Unlike the current LTE specification, cross-subframe scheduling is employed for a MTC system with narrowband deployment. To avoid the excessive blind decoding attempts for M-PDCCH, the starting subframe of M-PDCCH is limited to a subset of the subframes. The configuration regarding the periodicity and offset of M-PDCCH transmission can be predefined or configured by eNB in a device-specific or cell-specific manner In one embodiment, this configuration information can be included in the MIB conveyed in the M-PBCH 210.

M-PBCH 210 is transmitted with periodicity of Y subframes, preceded by an M-SCH 209 transmission. To reduce the overhead and improve the spectrum efficiency, M-PBCH 210 is less frequently transmitted compared to M-PDCCH. In the case when M-PDCCH transmission is collided with M-SCH 209 and M-PBCH 210, the starting subframe of M-PDCCH is delayed by N subframes, where N is the number of subframes allocated for M-SCH 209 and M-PBCH 210 transmission.

Note that certain super-frames can be configured as MBMS Single Frequency Network (MBSFN) super-frames. The M-PBCH 210 may be allocated after the control region in the configured MBSFN super-frame. The configuration information can be configured and transmitted (broadcast or unicast/groupcast) by eNB. As in the existing LTE specification, extended Cyclic Prefix (CP) can be used to facilitate the efficient MBSFN operation by ensuring the signals remain within the CP at the UE receivers.

In the UL, M-PUCCH 250 and M-PUSCH 260 are transmitted after M-PRACH in one super-frame. Although as shown in the FIG. 1, M-PUCCH is followed by M-PUSCH transmission, it can be transmitted in the middle of M-PUSCH or after M-PUSCH. The time location of M-PRACH, M-PUCCH, and M-PUSCH can be predefined or configured by eNB. In one embodiment, this configuration information can be included in the MIB conveyed in the M-PBCH.

In one example, M-PUSCH is transmitted in a subframe #0-#4 and #6-#9, while M-PUCCH is transmitted in the subframe #5. In another example, M-PUSCH is transmitted in the subframe #0-#8, while M-PUCCH is transmitted in the subframe #9. Note that in order to allow adequate processing time for M-PDCCH decoding, the starting subframe of the M-PUSCH transmission may offset certain number of subframes relative to the last subframe of the M-PDCCH transmission.

In one embodiment, M-PCFICH can be considered in the control channel as the current LTE specification. However, unlike the PCFICH in the existing LTE standard, M-PCFICH carries a MTC Control Format Indicator (M-CFI) which is used to indicate the information for M-PDCCH and M-PDSCH transmission (e.g., the time/frequency locations of M-PDCCH transmission). In this case, control channel overhead can be adjusted according to a particular system configuration, traffic scenario, and channel conditions. To simplify the specification effort and implementation, some existing PCFICH designs in current LTE specification can be reused for M-PCFICH design, (e.g., modulation scheme, layer mapping and precoder design). In this case, 16 M-PCFICH symbols are grouped into 4 symbol quadruplets (e.g., resource elements), and each symbol quadruplet can be allocated into one MTC resource element group (M-REG). In other embodiments, other groupings may be used. For example, in another embodiment, the time/frequency locations for M-PDCCH and/or M-PDSCH are predetermined or configured by the higher layers. In this case, M-PCFICH is not needed in the control channel design.

Furthermore, M-PHICH may or may not be included in the control channel. In one embodiment, M-PHICH is not needed in the control channel design. This can be considered if HARQ is not supported for MTC with narrowband deployment or in the case when M-PHICH functionality may be replaced by M-PDCCH.

In another embodiment, M-PHICH is supported to carry the HARQ ACK/NACK, which indicates whether the eNB has correctly received a transmission on the PUSCH. The number of PHICH groups for M-PHICH transmission can be predefined or configured by eNB. In one embodiment, the configuration information can be broadcast in the MTC Master Information Block (M-MIB) conveyed in the MTC Physical Broadcast Channel (M-PBCH) or broadcast in MTC System Information Block (M-SIB). To simplify the specification effort and implementation, some existing PHICH designs in current LTE specification can be reused for M-PHICH design (e.g., modulation scheme, layer mapping, and precoder design). In this case, 12 symbols for one M-PHICH group are grouped into 3 symbol quadruplets, and each symbol quadruplet can be allocated into one MTC resource element group (M-REG).

In the case when M-PCFICH and M-PHICH are supported, several options can be considered in the control region design for MTC with narrowband deployment as follows.

In one embodiment, M-PCFICH is located in the first $K_0$ subframes of the control region while M-PHICH is allocated in the last $K_1$ subframes of the control region. In addition, M-PDCCH is allocated in the resource elements which are not assigned for M-PCFICH and M-PHICH in the control region.

In another embodiment, M-PCFICH is located in the first $M_0$ subframes of the control region while M-PHICH is located in the $M_1$ subframes of the data region. Similarly, M-PDCCH and M-PDSCH are allocated in the resource elements which are not assigned for M-PCFICH in the control region and M-PHICH in the data region, respectively.

Note that in the example embodiments shown below, continuous resource allocations are considered for MTC control region. Distributed resource allocation for the MTC control region can be easily extended in other embodiments.

Figure 3:
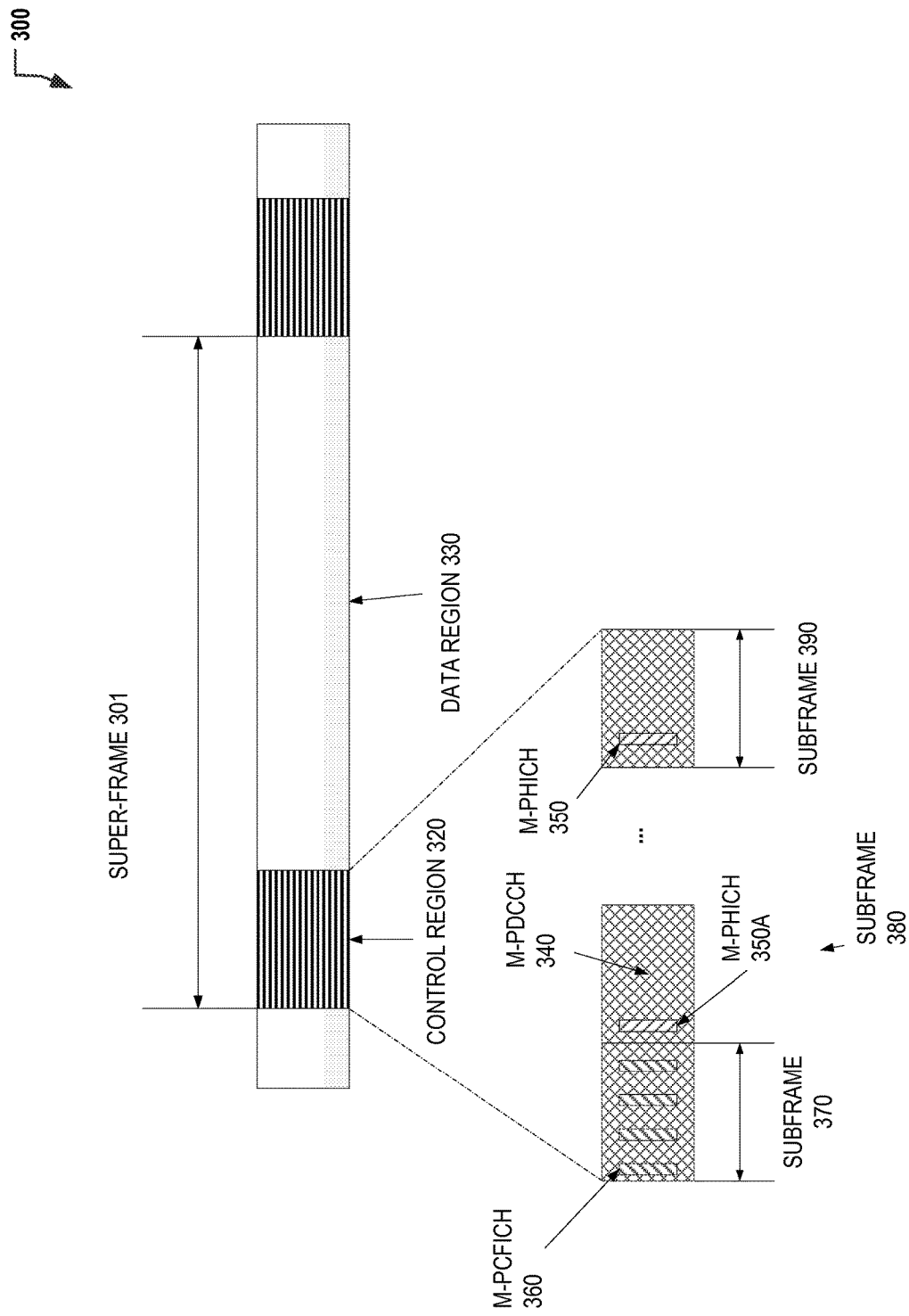
FIG. 3 illustrates aspects of control channel design, according to certain embodiments.

FIG. 3 illustrates one implementation of a control channel 300, according to some embodiments. FIG. 3 shows control region 320 within super-frame 301, with control region 320 followed by data region 330. Control region 320 includes M-PCFICH 360 in subframe 370, M-PHICH 350A in subframe 380, and M-PHICH 350 in subframe 390, with M-PDCCH elements in all subframes including M-PDCCH 340 in subframe 380. In this embodiment, M-PCFICH 360 is located in the first $K_0$ subframes of the control region, while M-PHICH 350A is allocated in the last $K_1$ subframes of the control region, where $K_0 < (N_{control} - 1)$, $K_1 \leq (N_{control} - 1)$ and $N_{control}$ is the number of subframes allocated for control channel. Furthermore, the M-PDCCH 340 transmission is rate-matched or punctured around the allocations for M-PCFICH 360 and M-PHICH 350A transmission. Note that $K_0$ and $K_1$ can be predefined or configured by higher layers.

For M-PCFICH 360 resource mapping, four symbol quadruplets can be either separated by approximately one-fourth of the $K_0$ subframes or allocated in the contiguous M-REGs, with the starting position derived from the physical cell identity. Similarly, for M-PHICH 350A resource mapping, three symbol quadruplets can be either separated by approximately one-third of the $K_1$ subframes or allocated in the contiguous M-REGs, with the starting position derived from the physical cell identity.

The embodiment of FIG. 3 shows one example of the control region design option 1 for MTC with narrowband deployment. In this example, M-PCFICH 360 is allocated and equally distributed in the first subframe of the control region (i.e., $K_0=1$). Similarly, M-PHICH 350A is equally distributed from the second subframe to the last subframe of the control region (i.e., $K_1=(N_{control}-1)$).

Figure 4:
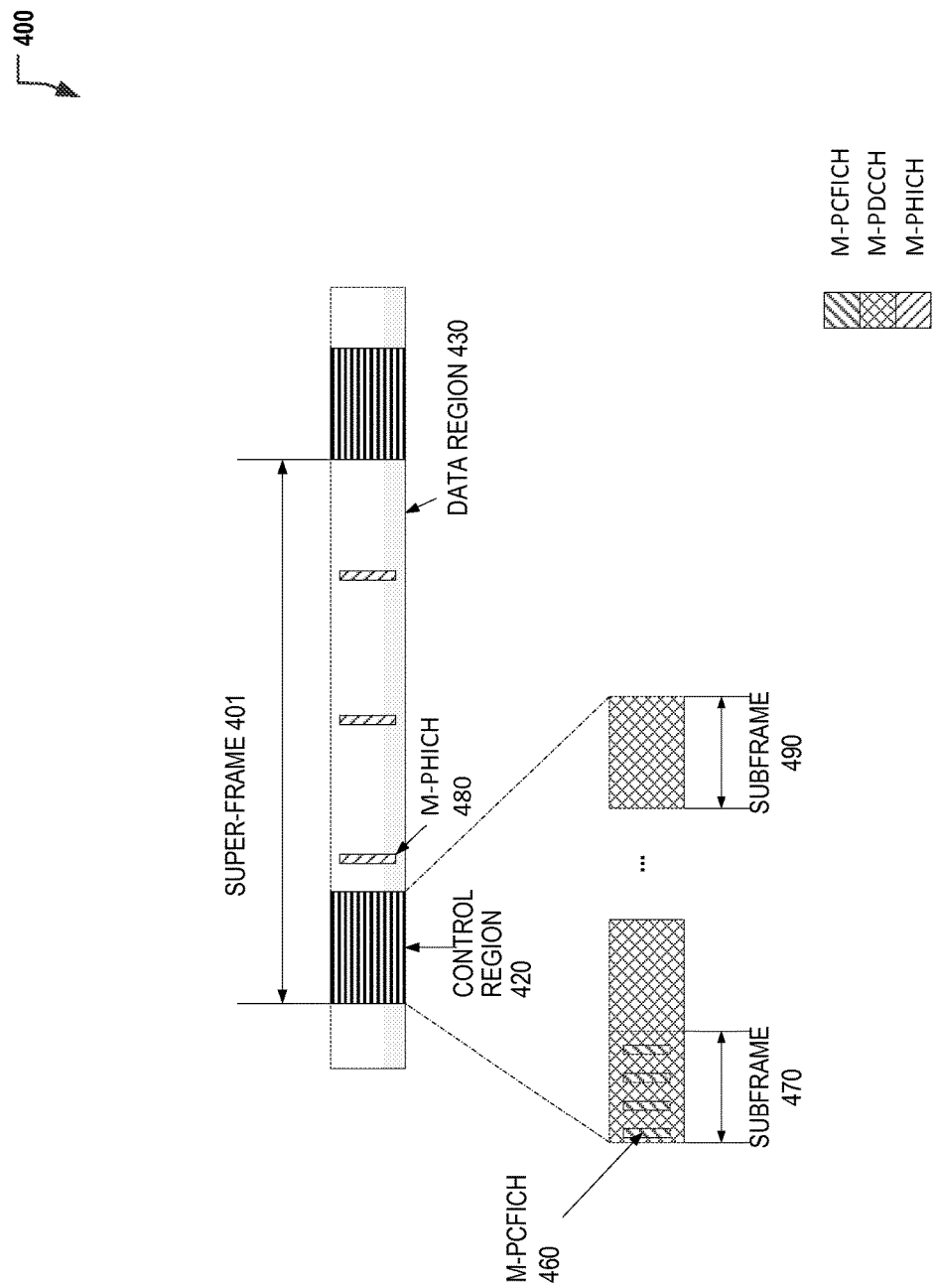
FIG. 4 illustrates aspects of control channel design, according to certain embodiments.

FIG. 4 illustrates another example of the control region design for MTC with narrowband deployment. In this example, M-PCFICH is allocated and equally distributed in the first subframe of the control region (i.e., $M_0=1$). Similarly, M-PHICH is equally distributed in the data region (i.e., $M_1=N_{data}$).

Similar to the embodiment of FIG. 3, FIG. 4 shows control region 420 in super-frame 401 with subframes 470, 490, and M-PCFICH 460. Data region 430 follows control region 420. M-PHICH 480, however, is within data region 430. In this option, M-PCFICH 460 is located in the first $M_0$ subframes of the control region 420, while M-PHICH 480 is located in the $M_1$ subframes of the data region, where $M_0<(N_{control}-1)$, $M_1 \le N_{data}$, and $N_{data}$ is the number of subframes allocated for the data region. FIG. 4 particularly shows these in the first subframe, while additional embodiments may use related configurations as stated above. Similarly, M-PDCCH and M-PDSCH are allocated in the resource elements that are not assigned for M-PCFICH 460 in the control region and M-PHICH 480 in the data region, respectively. Note that $M_0$ and $M_1$ can be predefined or configured by higher layers.

Similar to the initial embodiment of control channel 300, four symbol quadruplets for M-PCFICH 460 transmission can be either separated by approximately one-fourth of the $M_0$ subframes or allocated in the contiguous M-REGs, with the starting position derived from the physical cell identity. For M-PHICH 480 resource mapping, three symbol quadruplets can be either separated by approximately one-third of the $M_1$ subframes or allocated in the contiguous M-REGs in the data region, with the starting position derived from the physical cell identity.

Figure 5A:
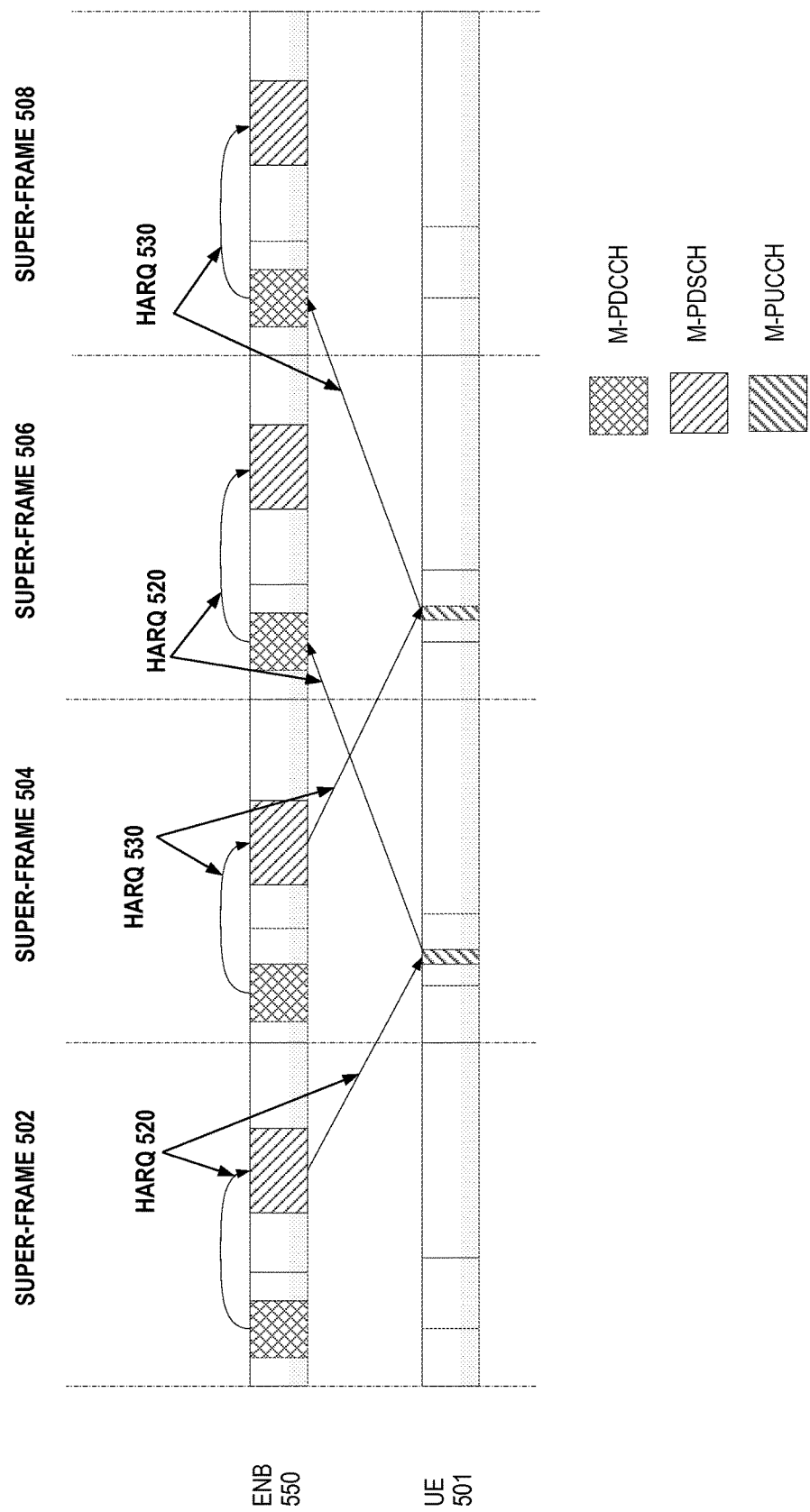
FIG. 5A illustrates aspects of a hybrid automatic repeat request (HARQ) procedure with two HARQ processes for a download, according to some example embodiments.
Figure 5B:
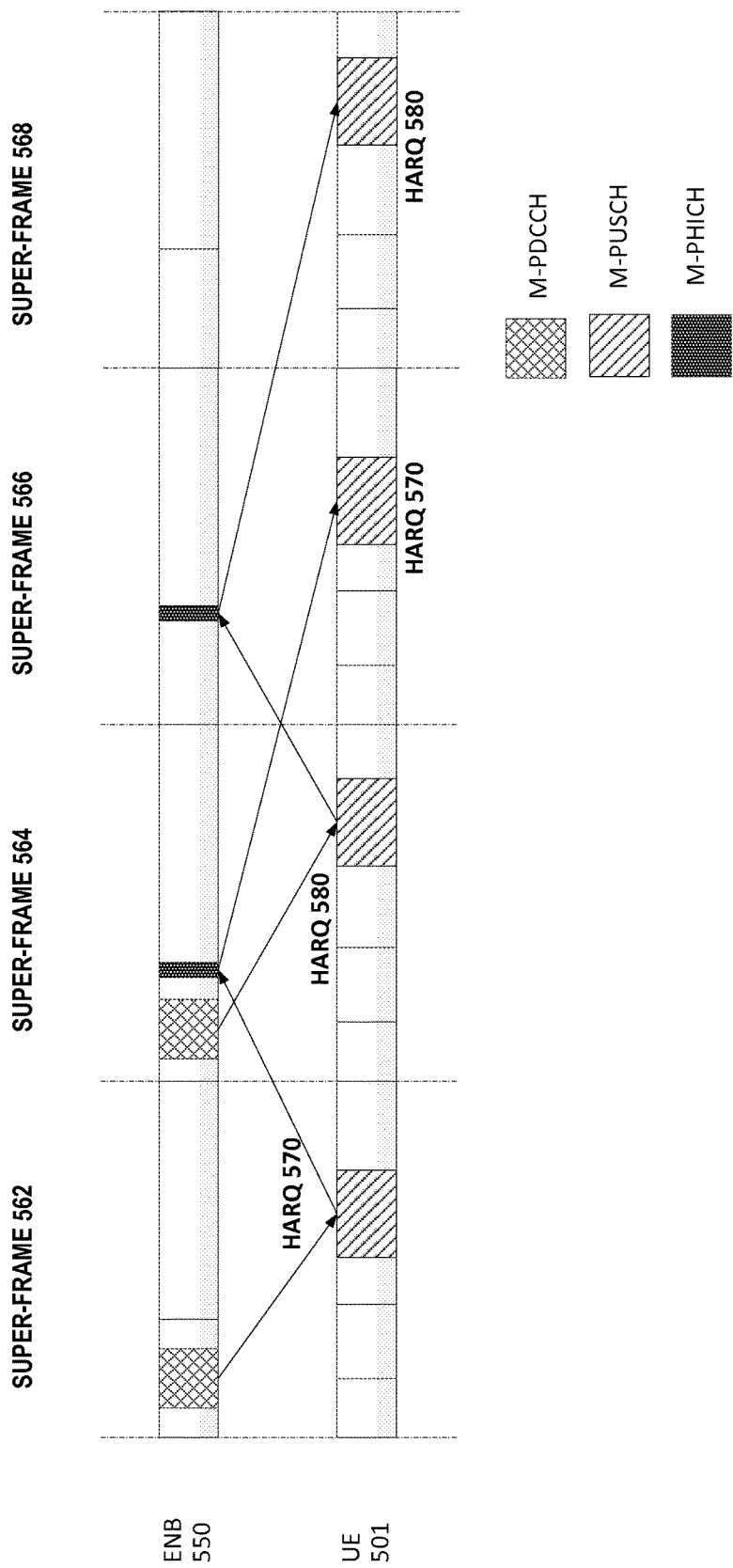
FIG. 5B illustrates aspects of a HARQ procedure with two HARQ processes for an upload, according to some example embodiments.

FIGS. 5A and 5B illustrate upload and download HARQ procedure with two HARQ processes implemented by a UE 501 and an eNB 550. FIG. 5A shows a download HARQ procedure with two HARQ processes shown as HARQ 520 and HARQ 530 across super-frames 502-508. FIG. 5B shows an upload HARQ procedure with two HARQ processes shown as HARQ 570 and HARQ 580 across super-frames 562-568.

For the DL HARQ procedure of FIG. 5A, in the super-frame 502, M-PDSCH with HARQ 520 process is scheduled and transmitted. After UE 501 decodes the M-PDSCH, it feeds back ACK/NACK to eNB 550 via M-PUCCH in the super-frame 504. In the case with NACK, eNB 550 would schedule the retransmission in the super-frame 506. Similarly, for HARQ 530 process, initial transmission and retransmission for M-PDSCH are scheduled in the super-frame 504 and 508, respectively, while the ACK/NACK feedback is transmitted via M-PUCCH in the super-frame 506. Unlike the existing LTE specification, the M-PUCCH resource index for HARQ acknowledgement can be associated with the index of either the first control channel elements (CCE) in the M-PDCCH or the starting subframe of the M-PDCCH or the combination of both for the corresponding M-PDSCH transmission. In another embodiment, the M-PUCCH resource index for HARQ acknowledgement can be indicated by the starting subframe of M-PDSCH transmission.

For the UL HARQ procedure of FIG. 5B, in the super-frame 562, M-PUSCH with HARQ 570 process is scheduled and transmitted. Then eNB 550 will send the ACK/NACK via M-PHICH in the super-frame 564. If NACK is received by MTC UE 501, M-PUSCH retransmission would occur in the super-frame 566. A similar design principle is also applied for HARQ 580 process. Unlike the existing LTE specification, the M-PHICH index can be associated with the index of the starting subframe used for the corresponding M-PUSCH transmission.

Figure 6A:
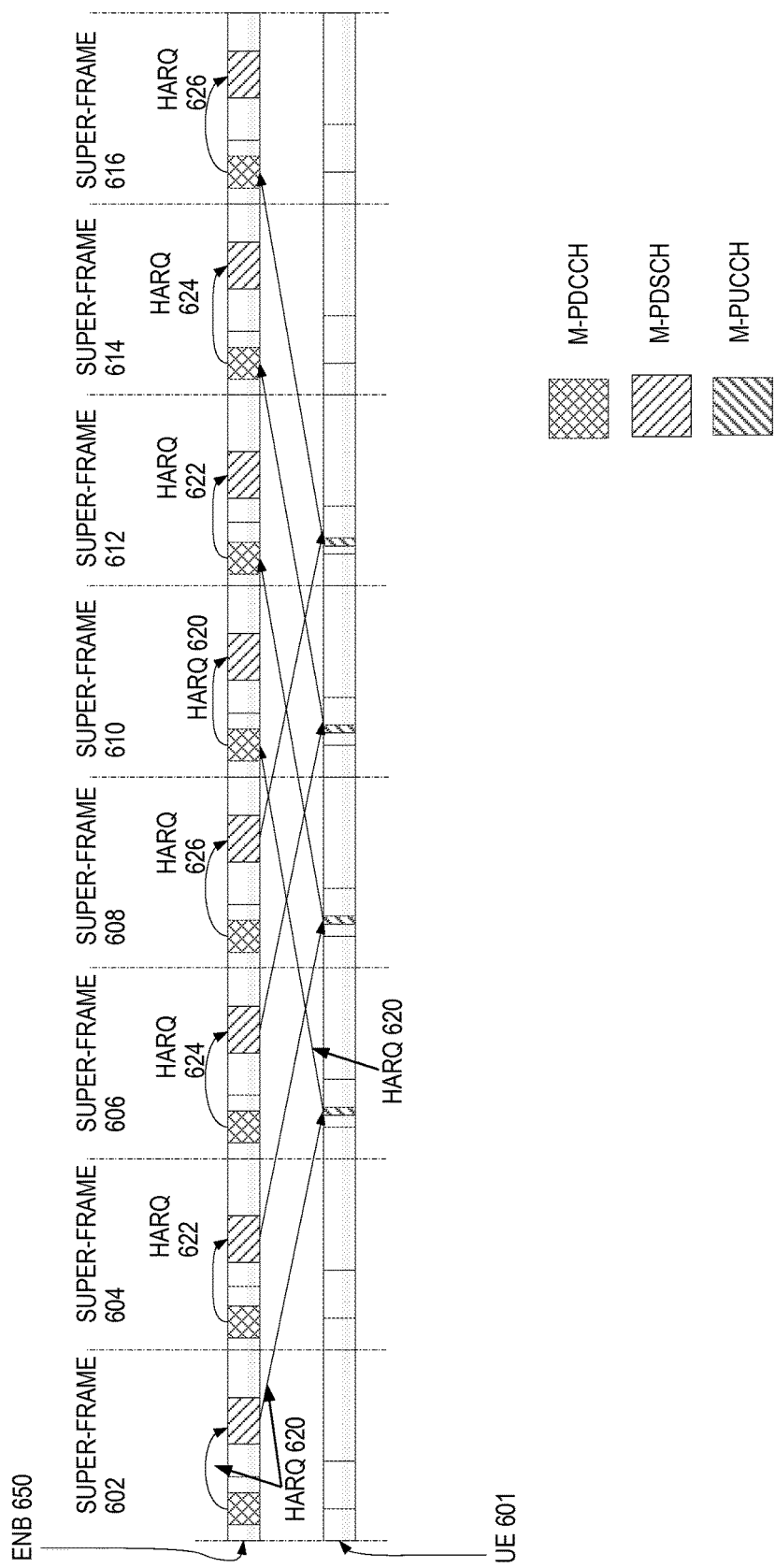
FIG. 6A illustrates aspects of a HARQ procedure with four HARQ processes for a download, according to some example embodiments.
Figure 6B:
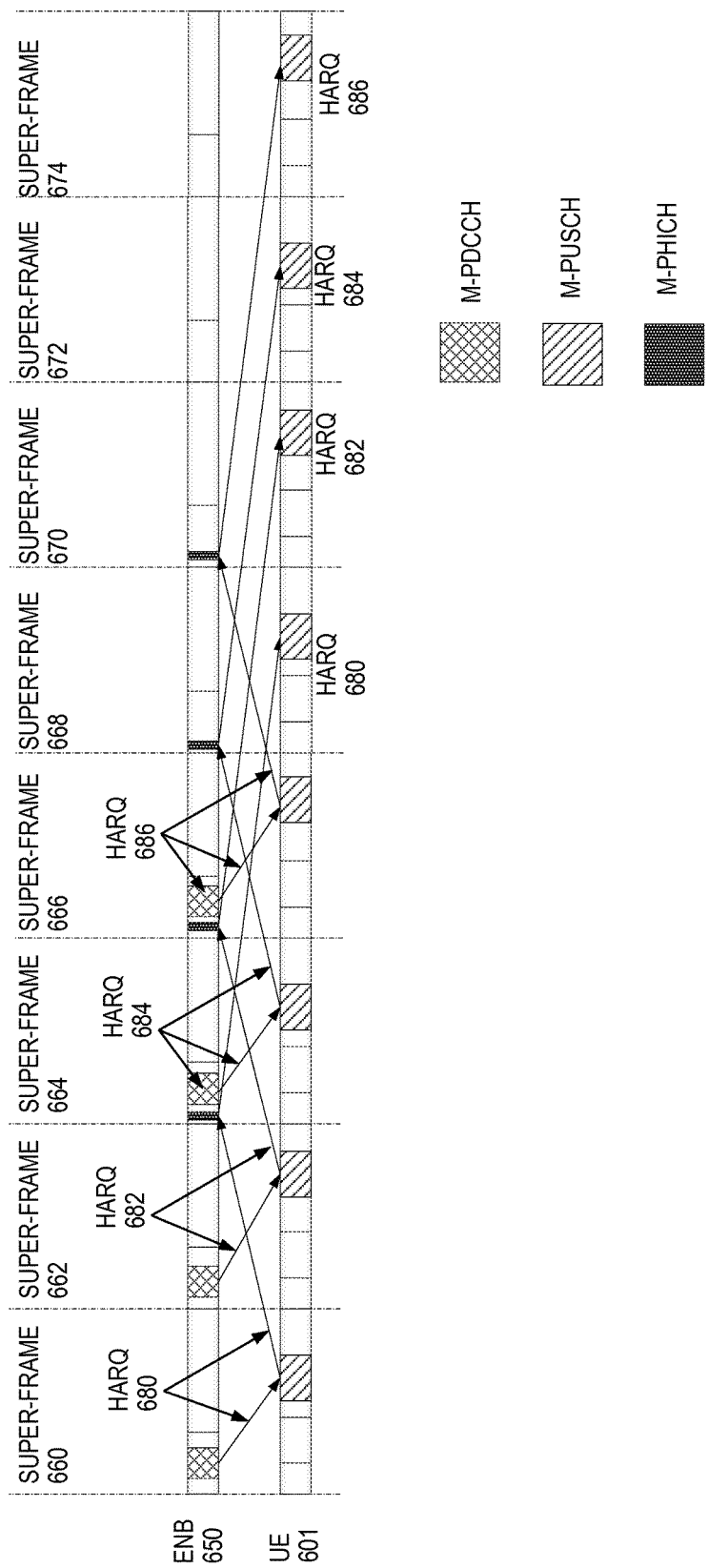
FIG. 6B illustrates aspects of a HARQ procedure with four HARQ processes for an upload, according to some example embodiments.

FIGS. 6A and 6B show upload and download HARQ procedures for four HARQ processes. FIG. 6A shows download processes HARQ 620, 622, 624, AND 626 across superframes 602-616 between UE 601 and eNB 650. FIG. 6B shows upload HARQ processes HARQ 680, 682, 684, and 686 across super-frames 660-674 for eNB 650 and UE 601.

As shown in FIG. 6A, for DL HARQ processes, UE 601 would provide the ACK/NACK feedback via M-PUCCH with a two super-frame delay after it receives the M-PDSCH transmission. Subsequently, the retransmission occurs two super-frames later after eNB 650 receives the NACK.

For UL HARQ processes, the gap between M-PUSCH transmission and ACK/NACK feedback via M-PHICH, as well as between ACK/NACK feedback and M-PUSCH retransmission, is similarly two super-frames.

The same design principle can be generalized and applied for the HARQ procedure with 2×M HARQ processes (M>2). More specifically, the gap between the data transmission (M-PDSCH in the DL and M-PUSCH in the UL) and the ACK/NACK feedback (M-PUCCH in the DL and M-PHICH in the UL), as well as between ACK/NACK feedback and the data retransmission, is M super-frames.

In another embodiment, in the case of HARQ procedure with 2×M HARQ processes (M≥2), an unbalanced processing gap can be introduced to allow an increased time-budget at the UE side. In this option, delay between the retransmission of M-PDSCH and M-PUCCH transmission (for DL HARQ), and the delay between the M-PUSCH retransmission and M-PHICH transmission (for UL HARQ) does not scale with an increase in the number of HARQ processes. For instance, in the case for four HARQ processes with M=2, for DL HARQ, a delay of three super-frames is available for transmission of the M-PUCCH with the DL HARQ information, while a retransmission (in case of a NACK) is scheduled in the next super-frame itself.

In another embodiment, multiple HARQ processes can be scheduled in one super-frame. In this option, multiple M-PDCCHs can be used to schedule multiple M-PDSCHs and/or M-PUSCHs in one super-frame.

Figure 7:
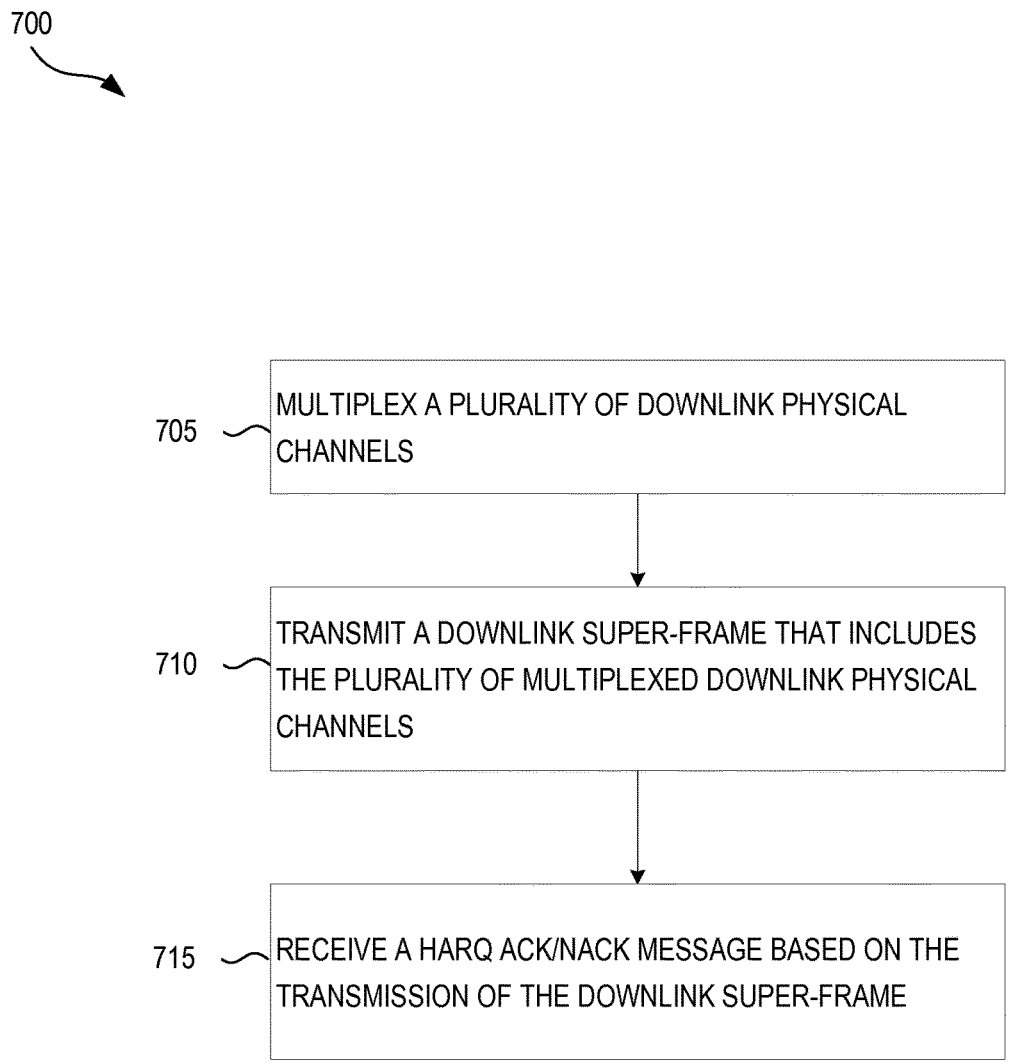
FIG. 7 illustrates a method that may be performed by an eNB, in accordance with certain example embodiments.
Figure 8:
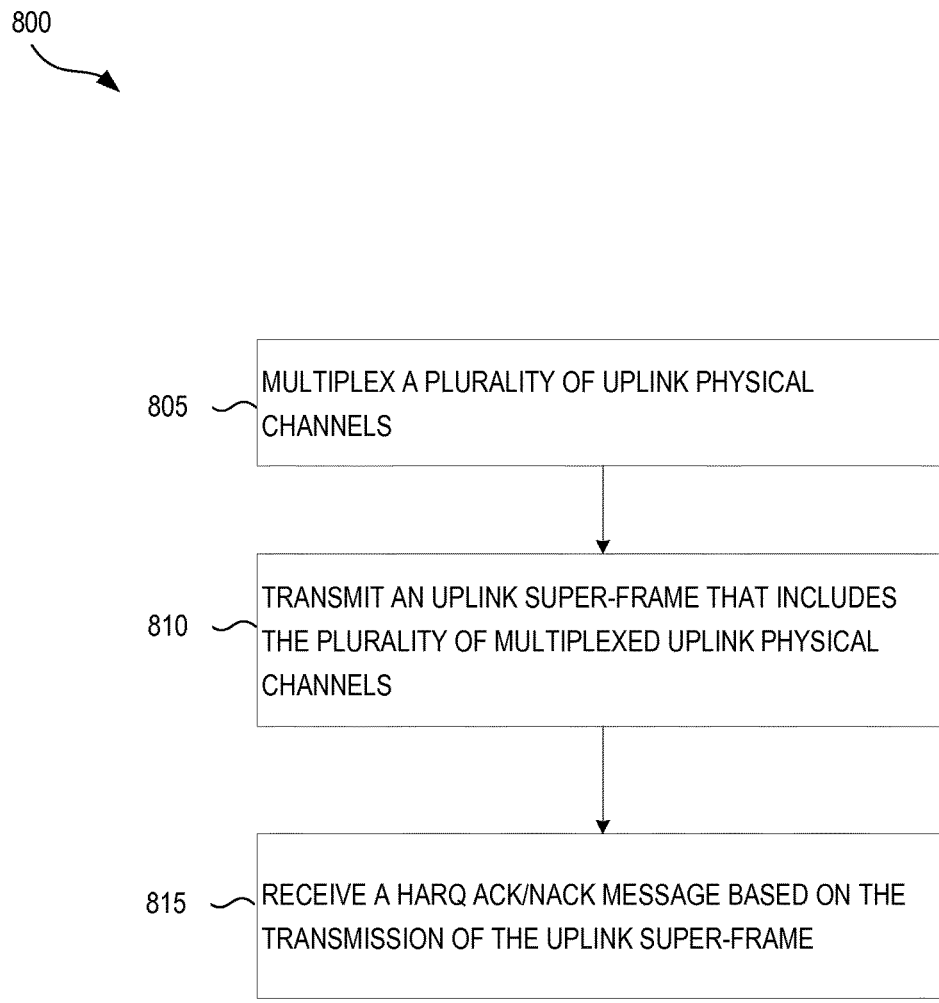
FIG. 8 illustrates a method that may be performed by a UE, in accordance with certain example embodiments.

FIGS. 7 and 8 then illustrate methods that may be performed by a UE and an associated eNB such as UE 101 and eNB 150 of FIG. 1. The method 700 may be performed by a UE such as UE 101 or any UE described herein, and may include an operation 705 for multiplexing a plurality of downlink physical channels. The plurality of physical channels may be multiplexed according to TDM or FDM.

The method 700 may further include an operation 710 for transmitting a downlink super-frame that includes the plurality of multiplexed downlink physical channels. In various embodiments, the downlink super-frame may be of a predetermined duration (e.g., comprised of a predetermined number of downlink subframes). The downlink super-frame may comprise a predetermined starting downlink subframe. The operation 710 for transmitting the downlink super-frame may be associated with a predetermined periodicity for transmission.

The method 700 may further include an operation 715 for receiving a HARQ ACK and/or NACK message based on the transmitting of the downlink super-frame. In various embodiments, the HARQ ACK and/or NACK message may be received in an uplink super-frame (e.g., a predetermined plurality of uplink subframes) according to a predetermined schedule for HARQ ACK/NACK message communication (e.g., a HARQ ACK/NACK message may be scheduled to be received in an uplink super-frame immediately following in time the transmission of the downlink super-frame). Optional operations may include retransmitting the plurality of multiplexed downlink physical channels (e.g., in another downlink super-frame according to a predetermined schedule for retransmission) if a HARQ NACK message is received based on the transmitting of the downlink super-frame.

FIG. 8 shows corresponding method 800 that may be performed by circuitry of an eNB such as eNB 150 or any eNB described herein. The method 800 may include an operation 805 for multiplexing a plurality of uplink physical channels. The plurality of uplink physical channels may be multiplexed according to TDM or FDM.

The method 800 may further include an operation 910 for transmitting an uplink super-frame that includes the plurality of multiplexed uplink physical channels. In various embodiments, the uplink super-frame may be of a predetermined duration (e.g., comprised of a predetermined number of uplink subframes). The uplink super-frame may comprise a predetermined starting uplink subframe or a starting uplink subframe that is signaled by an eNB in an information block (e.g., MIB or SIB). The operation 810 for transmitting the uplink super-frame may be associated with a predetermined periodicity for transmission, which may be predetermined or signaled by an eNB in an information block (e.g., MIB or SIB).

The method 800 may further include an operation 815 for receiving a HARQ ACK and/or NACK message based on the transmitting of the uplink super-frame. In various embodiments, the HARQ ACK and/or NACK message may be received in a downlink super-frame (e.g., a predetermined plurality of downlink subframes) according to a predetermined schedule for HARQ ACK/NACK message communication (e.g., a HARQ ACK/NACK message may be scheduled to be received in a downlink super-frame immediately following in time the transmission of the uplink super-frame). Optional operations may include retransmitting the plurality of multiplexed uplink physical channels (e.g., in another uplink super-frame according to a predetermined schedule for retransmission) if a HARQ NACK message is received based on the transmitting of the uplink super-frame.

Figure 9:
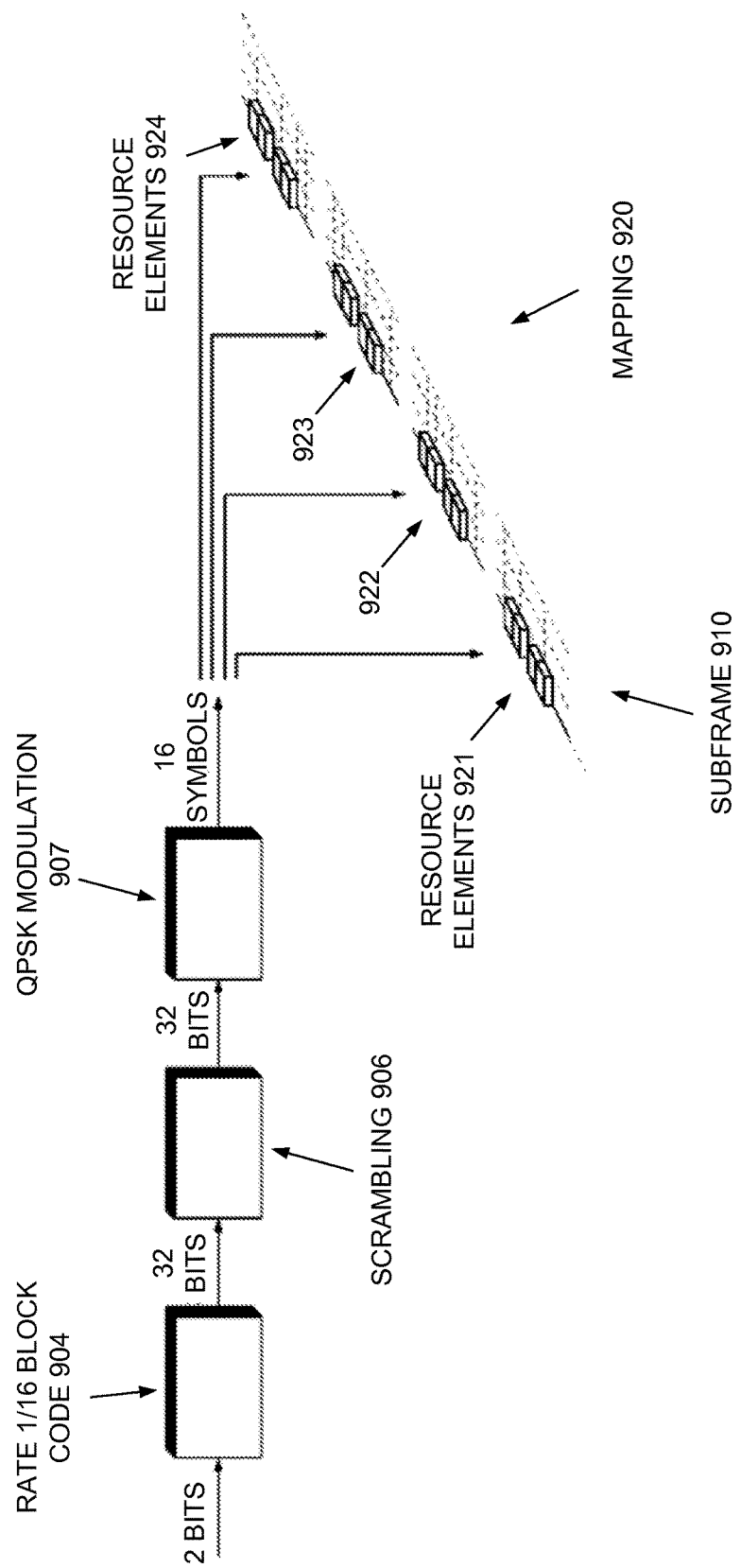
FIG. 9 illustrates aspects of physical control format indicator channel (PCFICH) design according to certain embodiments.

FIGS. 9-17 relate to embodiments for PCFICH in MTC with narrowband deployment. FIG. 9 illustrates aspects of PCFICH processing. PCFICH consists of two bits of information, corresponding to the three control-region sizes of one, two, or three OFDM symbols (two, three, or four for narrow bandwidths, e.g., 1.4 MHz), which are coded into a 32-bit codeword by rate 1/16 block code circuitry 904. The 32 resulting coded bits are scrambled by scrambling circuitry 906 with a cell- and subframe-specific scrambling code to randomize inter-cell interference. These output bits are then quadrature phase-shift key (QPSK) 907 modulated. The resulting 16 symbols are mapped to 16 resource elements as illustrated by mapping 920 as part of subframe 910. As the size of the control region is unknown until the PCFICH is decoded, the PCFICH is mapped to the first OFDM symbol of each subframe including subframe 910 in the embodiment shown.

The mapping 920 of the PCFICH to resource elements in the first OFDM symbol in the subframe is performed in groups of four resource elements, with the four groups being well separated in frequency to obtain good diversity. Four groups of four resource elements are shown in FIG. 9 as resource elements 921, 922, 923, and 924, with each group of resource elements including four resource elements as shown, for a total of 16 resource elements illustrated in FIG. 9. Furthermore, to avoid collisions between PCFICH transmissions in neighboring cells, the location of the four groups in the frequency domain depends on the physical-layer cell identity.

In the existing standard LTE systems (where CFI is used to indicate the control-region sizes in OFDM symbols), M-CFI can be used to indicate the information for M-PDCCH and M-PDSCH transmissions. In some embodiments, this information contains the number of time/frequency units (e.g., symbol, slot, subframes, PRB, etc.) used for M-PDCCH and/or M-PDSCH transmission. For instance, M-CFI can be used to indicate the number of subframes used for M-PDCCH transmission.

In other embodiments, this information contains the time/frequency locations used for M-PDCCH and/or M-PDSCH transmission. For instance, M-CFI can be used to indicate which subframes in one super-frame are allocated for M-PDCCH. In still further embodiments, this information contains a set of time/frequency locations for M-PDCCH and/or M-PDSCH transmission. In other embodiments, M-CFI can be used to indicate the M-PHICH configuration (e.g., the number of M-PHICH groups). To simplify certain implementations, the same code words for CFI can be reused as listed in the Table 1.

TABLE 1

M-CFI code words

| M-CFI | M-CFI code word $<b_0, b_1, \ldots, b_{31}>$ |
|---|---|
| $n_0$ | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| $n_1$ | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| $n_2$ | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| $n_3$ (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

As illustrated by Table 1, values ($n_0$, $n_1$, $n_2$, $n_3$) carried by the M-CFI can be predefined or configured by higher layers in certain embodiments. In some embodiments, the configuration information can be broadcast in the M-MIB conveyed in M-PBCH or broadcast in M-SIB.

In other embodiments, values ($n_0$, $n_1$, $n_2$, $n_3$) can be predefined according to the super-frame duration. For instance, in the case when M-CFI is used to indicate the number of subframes for M-PDCCH transmission: when super-frame duration spans 40 ms, we can set the number of M-PDCCH subframes to $n_0=2$, $n_1=4$, $n_2=8$, $n_3=16$. When super-frame duration spans 80 ms, we can set the ($n_0$, $n_1$, $n_2$, $n_3$) values to $n_0=4$, $n_1=8$, $n_2=16$, $n_3=32$.

In other embodiments, in the case when M-CFI is used to indicate a set of time/frequency locations for M-PDCCH transmission, $n_0$ indicates the first set (subframe #0, #1, #2, #3), $n_1$ indicates the second set (subframe #4, #5, #6), $n_2$ indicates the third set (subframe #7, #8) and $n_3$ indicates the fourth set (subframe #9). In still additional embodiments, additional numbers of codewords can be introduced to allow finer granularity for the indication of the number of subframes in the control region. In this case, the M-CFI codewords need to be redefined in the specification.

As mentioned above with respect to FIG. 9, after the channel coding, scrambling is performed in order to randomize the interference. In some M-PCFICH design embodiments, the same scrambling procedure as is used in the existing standard LTE specification used for PCFICH can be applied to M-PCFICH. In one embodiment, the same scrambling seed as defined in the LTE specification can be reused as:

$$c_{init}=(\lfloor n_s/2 \rfloor+1) \cdot (2N_{ID}^{cell}+1) \cdot 2^9 + N_{ID}^{cell} \quad (1)$$

where $n_s$ is the slot number and $N_{ID}^{cell}$ is the cell ID.

In other embodiments, the scrambling seed can be defined as a function of the cell ID only. For instance, the scrambling seed can be given as:

$$c_{init}=N_{ID}^{cell} \quad (2)$$

In additional embodiments, the scrambling seed can be defined as a function of the cell ID and super-frame number, i.e., $$c_{init}=f(n_{superframe}, N_{ID}^{cell}) \quad (3)$$

where $n_{superframe}$ is the super-frame number. For instance, the scrambling seed can be given as:

$$c_{init}=(n_{superframe}+1) \cdot (2N_{ID}^{cell}+1) \cdot 2^9 + N_{ID}^{cell} \quad (4)$$

In additional embodiments, the scrambling seed can be defined as a function of the slot number ($n_s$), the cell ID, and super-frame number. For instance, it can be given as:

$$c_{init}=(\lfloor n_s/2 \rfloor+1) \cdot (n_{superframe}+1) \cdot (2N_{ID}^{cell}+1) \cdot 2^9 + N_{ID}^{cell}, \quad ()$$

Subsequently, the same modulation scheme (e.g., QPSK as illustrated by QPSK modulation 907 of FIG. 9), layer mapping (e.g., as illustrated by mapping 920), and precoding can be reused for M-PCFICH design to simplify the implementation and maintain compatibility of certain aspects with existing LTE systems.

In various embodiments, M-PCFICH can be either located at the beginning of or distributed in the control region. In current LTE specification, a REG is defined for up to four OFDM symbols. For certain embodiment MTC systems with narrowband deployment, M-REG can be extended to one subframe to ensure adequate resources allocated for the control channel. In particular, in certain embodiments, four resource elements (REs) are mapped to the M-REG not used for reference signals (e.g., Cell-specific Reference Signal (CRS) or other MTC related reference signals if applicable) in the increasing order of first subcarrier and then OFDM symbol.

Figure 10B:
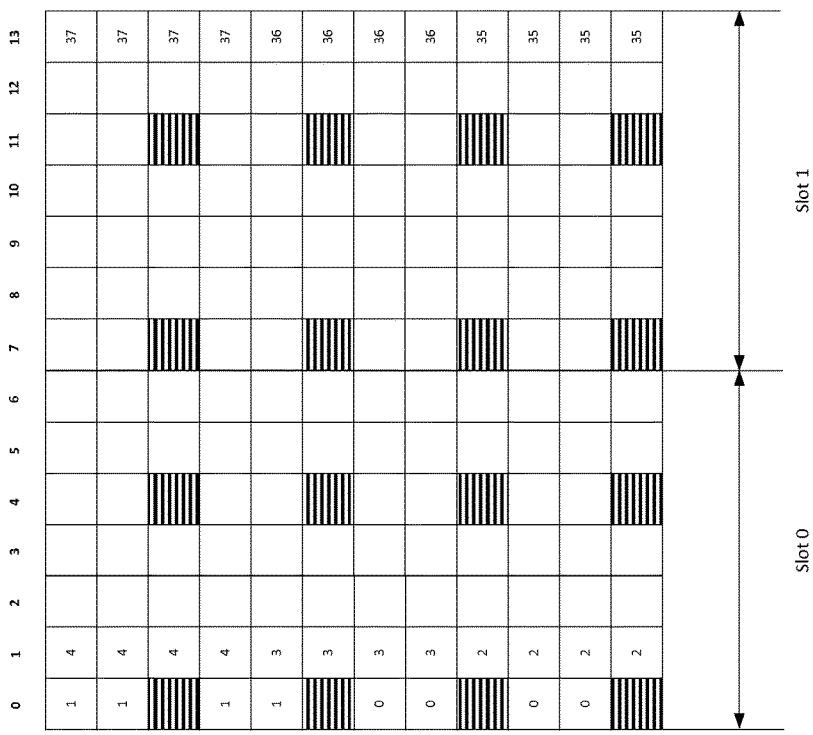
FIG. 10B illustrates aspects of REG mapping according to some embodiments.
Figure 10A:
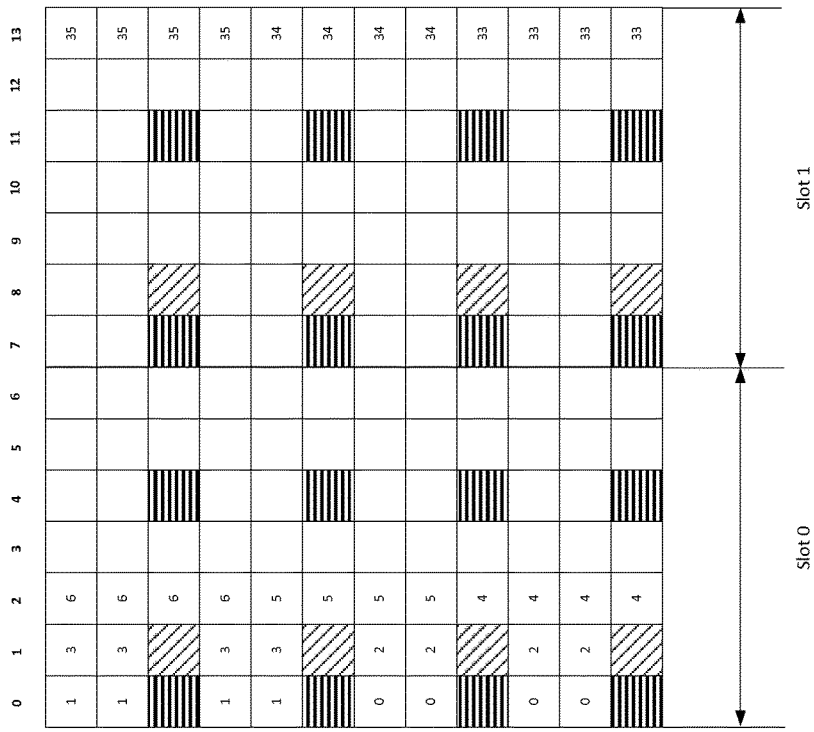
FIG. 10A illustrates aspects of resource element group (REG) mapping according to some embodiments.

FIGS. 10A and 10B illustrate M-REG mapping patterns. In different embodiments, different mapping patterns with one subframe and one, two, or four antenna ports in the case of normal CP may be used. As illustrated, 38 M-REGs are available in one subframe with one or two antenna ports in the case of normal CP, as shown by FIG. 10A, and 36 M-REGs are available in one subframe in the case of normal CP with four antenna ports as shown by FIG. 10B. It will be apparent that the same design principle can be applied to extended CP to generate an equivalent mapping pattern to match the extended CP case. In this case, the total number of available M-REGs in one subframe is reduced to 32 and 30 with one, two, or four antenna ports, respectively.

In the examples shown below, an M-REG mapping rule is designed based on CRS pattern. It can be easily extended to other reference signal patterns (e.g., dedicated MTC DL reference signal (M-RS)).

Figure 11B:
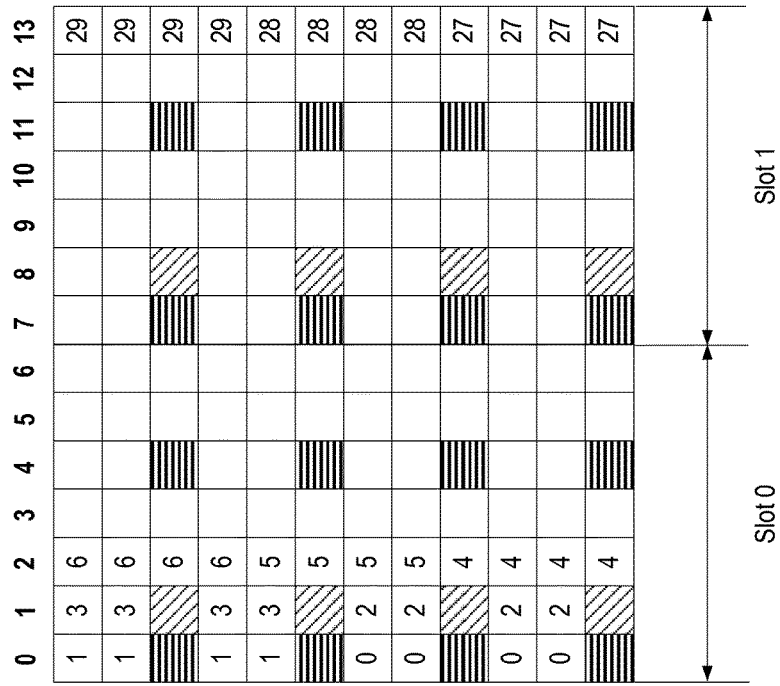
FIG. 11B illustrates aspects of REG mapping according to some embodiments.
Figure 11A:
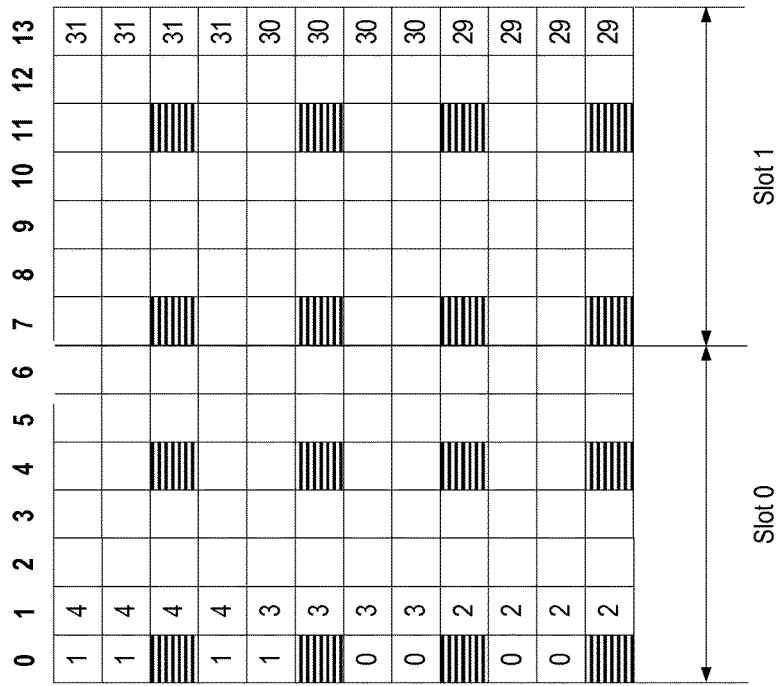
FIG. 11A illustrates aspects of REG mapping according to some embodiments.
Figure 30:
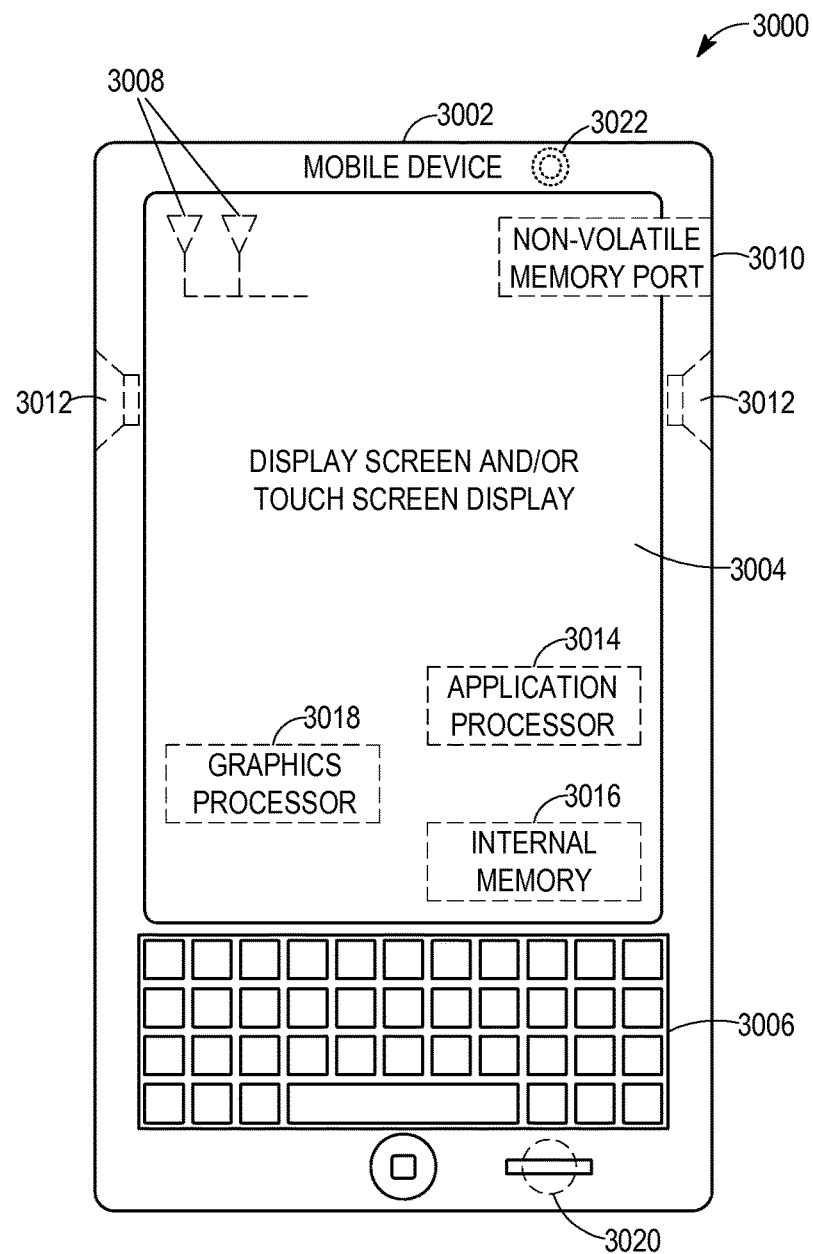
FIG. 30 illustrates aspects of a UE, in accordance with some example embodiments.

FIGS. 11A and 11B show M-REG mapping patterns for additional embodiments. In the embodiments illustrated by FIGS. 11A and 11B, OFDM symbols 3 and 10 are not used for M-REG resource mapping in the case of normal CP. Note that these two symbols can be used for M-PDCCH transmission. FIGS. 11A and 11B illustrate the M-REG mapping pattern in one subframe with one, two, or four antenna ports in the case of normal CP in such an alternate embodiment. As shown by FIG. 11A, 32 M-REGs are available in one subframe with one-half of the antenna ports in the case of normal CP, and as shown by FIG. 11B, 30 M-REGs are used for four antenna ports in the case of normal CP.

The embodiments of FIGS. 11A and 11B can allow unified M-REG mapping design between normal and extended CP cases as well as lattice-type pattern design for M-PCFICH resource mapping. Such embodiments may operate where:

$$z^{(p)}(i)=\langle y^{(p)}(4i), y^{(p)}(4i+1), y^{(p)}(4i+2), y^{(p)}(4i+3) \rangle \quad (6)$$

denotes symbol quadruplet i for antenna port p for M-PCFICH transmission, where $y^{(p)}(k)$, $k=0, \ldots, 15$ represents the M-PCFICH signal for antenna port p, and where $p=0, \ldots, P-1$ and the number of antenna ports for cell-specific reference signals $P\varepsilon\{1, 2, 4\}$ In such embodiments, the M-PCFICH is being transmitted on the same set of antenna ports as the M-PBCH. According to these two M-REG mapping patterns, several options can be considered for M-PCFICH resource mapping.

Figure 12B:
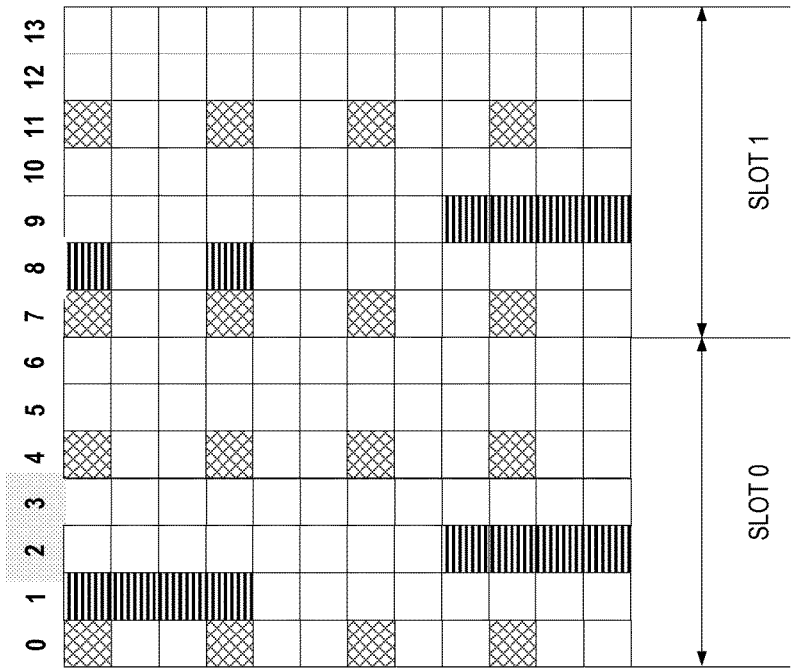
FIG. 12B illustrates aspects of PCFICH resource mapping for certain REG mapping patterns, antenna port, and CP options according to certain embodiments.
Figure 12A:
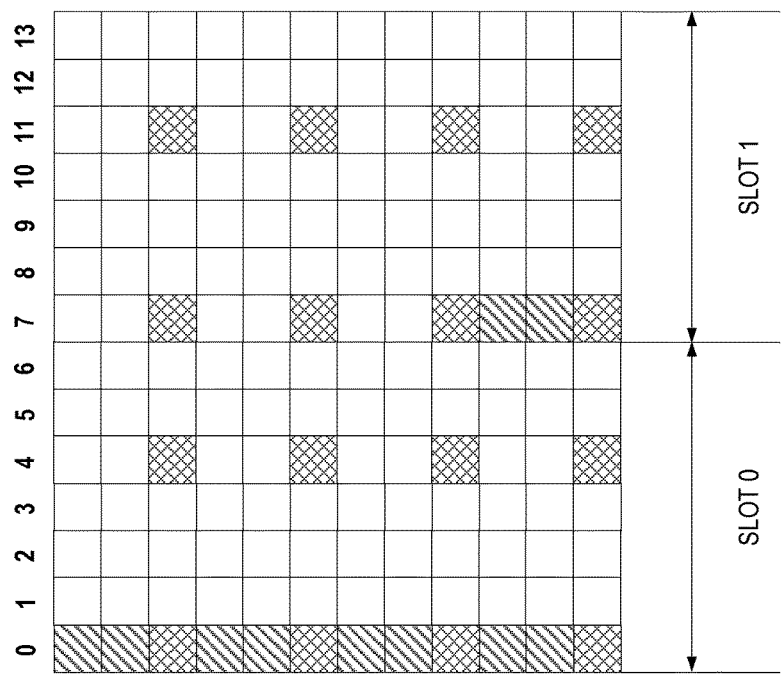
FIG. 12A illustrates aspects of PCFICH resource mapping for certain REG mapping patterns, antenna port, and cyclic prefix (CP) options according to certain embodiments.

FIGS. 12A and 12B illustrate M-PCFICH resource mapping for the M-REG mapping pattern of FIG. 10A. FIG. 12A illustrates the mapping pattern in the case of cell ID 0, and FIG. 12B illustrates the mapping pattern in the case of cell ID 2. In a first such embodiment, in the case for M-REG mapping pattern illustrated by FIGS. 10A and 10B, $z^{(p)}(0)$ and $z^{(p)}(1)$ are mapped to the M-REGs in the slot 0 while $z^{(p)}(2)$ and $z^{(p)}(3)$ are mapped to the M-REGs in the slot 1. In order to reduce the risk of inter-cell M-PCFICH collisions, M-PCFICH mapping depends on the physical-layer cell identity. The M-PCFICH resource mapping rule can be defined as follows: $z^{(p)}(0)$ is mapped to the M-REG represented by $k=\bar{k}$; $z^{(p)}(1)$ is mapped to the M-REG represented by $k=\bar{k}+1$; $z^{(p)}(2)$ is mapped to the M-REG represented by $k=\bar{k}+(N_{REG}/2)$; and $z^{(p)}(3)$ is mapped to the M-REG represented by $k=\bar{k}+1+(N_{REG}/2)$; where k is the M-REG index; $\bar{k}=2 \cdot (N_{ID}^{cell} \mod \lfloor N_{REF}/4 \rfloor)$; and $N_{REG}$ is the number of M-REGs in one subframe. In the normal CP case, Nreg=32 for one or two antenna ports and Nreg=36 for four antenna ports. In the extended CP case, Nreg=32 for one or two antenna ports and Nreg=30 for four antenna ports.

According to resource mapping rules, for Cell ID 0, M=PCFICH is mapped to M-REG 0, 1, 19, and 20, and for Cell ID 2, M-PCFICH is mapped to M-REG 4, 5, 23, and 24. Nreg/4 distinct M-PCFICH resource regions for different cells can be multiplexed in one subframe in such embodiments.

FIGS. 13A and 13B illustrate M-PCFICH resource mapping for alternate embodiments where four symbol quadruplets for M-PCFICH transmission are equally spread in one subframe. In particular, the M-PCFICH resource mapping rule fur such an embodiment may be defined as follows:

$z^{(p)}(0)$ is mapped to the M-REG represented by $k=\bar{k}$
$z^{(p)}(1)$ is mapped to the M-REG represented by $k=\bar{k}+\lfloor N_{REG}/4 \rfloor$
$z^{(p)}(2)$ is mapped to the M-REG represented by $k=\bar{k}+(N_{REG}/2)$
$z^{(p)}(3)$ is mapped to the M-REG represented by $k=\bar{k}+\lfloor 3\cdot N_{REG}/4 \rfloor$, where k is the M-REG index; $\bar{k}=N_{ID}^{cell} \mod \lfloor N_{REG}/4 \rfloor$; and $N_{REG}$ is the number of M-REGs in one subframe. In the normal CP case, $N_{REG}=38$ for one or two antenna ports and $N_{REG}=36$ for four antenna ports. In the extended CP case, $N_{REG}=32$ for one or two antenna ports and $N_{REG}=30$ for four antenna ports.

FIG. 13A illustrates this mapping pattern for M-REG mapping patterns as illustrated in FIG. 10A with one or two antenna ports in the case of normal CP for cell ID 0, and FIG. 13B illustrates the corresponding mapping for cell ID 2. According to this resource mapping, for cell ID 0, M-PCFICH is mapped to M-REG 0, 9, 18, and 28, and for cell ID 2 M-PCFICH is mapped to M-REG 2, 10, 20, and 30.

Figure 14B:
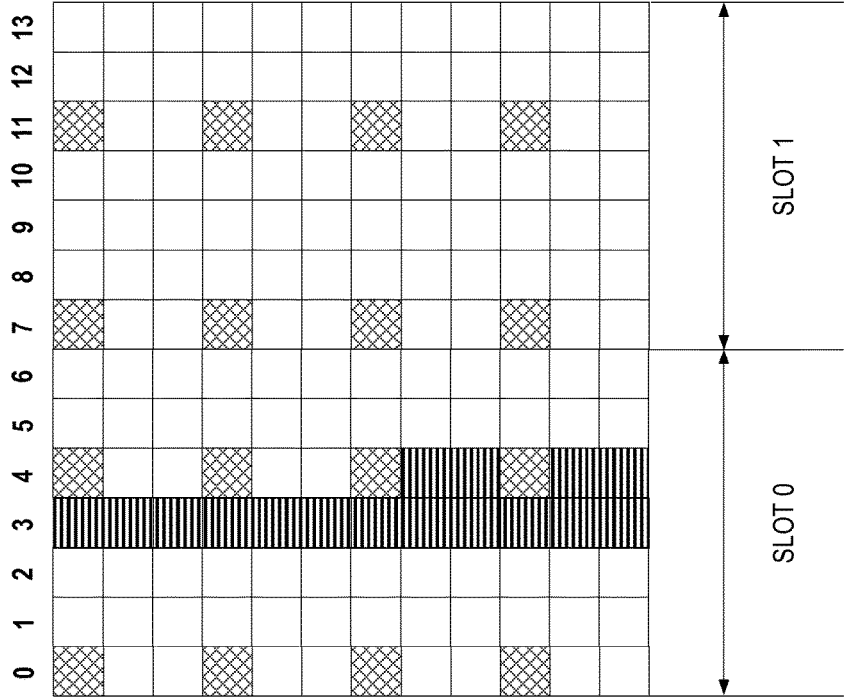
FIG. 14B illustrates aspects of PCFICH resource mapping for certain REG mapping patterns, antenna port, and CP options according to certain embodiments.
Figure 14A:
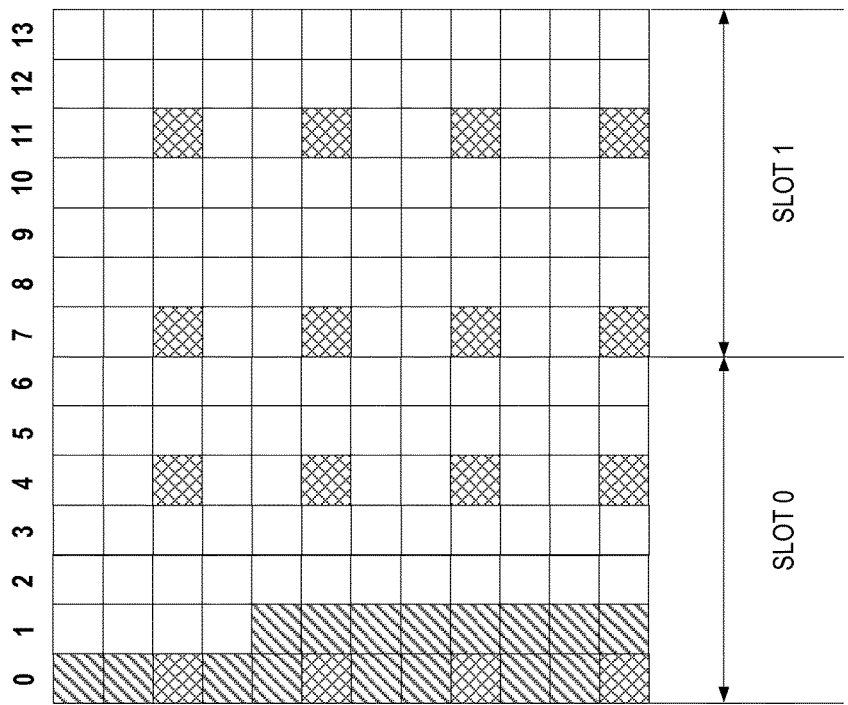
FIG. 14A illustrates aspects of PCFICH resource mapping for certain REG mapping patterns, antenna port, and CP options according to certain embodiments.

FIGS. 14A and 14B illustrate another embodiment where four symbol quadruplets for M-PCFICH transmission can be allocated in contiguous M-REGs, with the starting position derived from the physical cell identity. The M-PCFICH resource mapping rule can be defined as follows:

$z^{(p)}(0)$ is mapped to the M-REG represented by $k=\bar{k}$
$z^{(p)}(1)$ is mapped to the M-REG represented by $k=\bar{k}+1$
$z^{(p)}(2)$ is mapped to the M-REG represented by $k=\bar{k}+2$
$z^{(p)}(3)$ is mapped to the M-REG represented by $k=\bar{k}+3$, where k is the M-REG index; $\bar{k}=4\cdot(N_{ID}^{cell} \mod \lfloor N_{REG}/4 \rfloor)$; and $N_{REG}$ is the number of M-REGs in one subframe. In the normal CP case, $N_{REG}=38$ for one or two antenna ports and $N_{REG}=36$ for four antenna ports. In the extended CP case, $N_{REG}=32$ for one or two antenna ports and $N_{REG}=30$ for four antenna ports.

FIG. 14A illustrates the M-PCFICH resource mapping of these rules for M-REG mapping pattern of FIG. 10A with one or two antenna ports in the case of normal CP. According to this third embodiment of a resource mapping rule, for Cell ID 0, M-PCFICH is mapped to M-REG 0, 1, 2, and 3. Similarly, for Cell ID 2, M-PCFICH is mapped to M-REG 8, 9, 10, and 11.

The above shows application of three resource mapping rules to the first M-REG mapping pattern illustrated by FIG. 10A. Similar additional embodiments of resource mapping rules may be applied to the second M-REG mapping pattern illustrated by FIGS. 11A and 11B. In these additional embodiments for the second M-REG mapping pattern, each slot in one subframe is divided into two sub-regions. In the case of normal CP, symbols 0-2 and 7-9 are located in the first sub-region in the slot 0 and 1, respectively, while symbols 4-6 and 11-13 are in the second sub-region in the slot 0 and 1, respectively. In the case of extended CP, symbols 0-2 and 6-8 are located in the first sub-region in the slot 0 and 1, respectively, while symbols 3-5 and 9-11 are in the second sub-region in the slot 0 and 1, respectively.

In various such embodiments, each symbol quadruplet for M-PCFICH transmission is mapped into one of the sub-regions. More specifically, $z^{(p)}(0)$ and $z^{(p)}(1)$ are mapped to the M-REGs in the sub-region 0 and sub-region 1 of the slot 0, respectively; while $z^{(p)}(2)$ and $z^{(p)}(3)$ are mapped to the M-REGs in the sub-region 0 and sub-region 1 of the slot 1, respectively.

FIGS. 15A and 15B illustrate a first resource mapping for the M-REG mapping pattern of FIG. 11A. In such an embodiment, the M-REG location used for M-PCFICH transmission is the same across slots and sub-regions. Similarly, M-PCFICH mapping in such embodiments depends on the physical-layer cell identity to reduce the risk of inter-cell M-PCFICH collisions. The M-PCFICH resource mapping rule can be defined as follows:

$z^{(p)}(0)$ is mapped to the M-REG represented by $k=\bar{k}$
$z^{(p)}(1)$ is mapped to the M-REG represented by $k=\bar{k}+\lfloor N_{REG}/4 \rfloor$
$z^{(p)}(2)$ is mapped to the M-REG represented by $k=\bar{k}+(N_{REG}/2)$
$z^{(p)}(3)$ is mapped to the M-REG represented by $k=\bar{k}+\lfloor 3\cdot N_{REG}/4 \rfloor$, where k is the M-REG index; $\bar{k}=N_{ID}^{cell} \mod \lfloor N_{REG}/4 \rfloor$; and $N_{REG}$ is the number of M-REGs in one subframe. $N_{REG}=32$ for one or two antenna ports and $N_{REG}=30$ for four antenna ports.

FIG. 15A illustrates this M-PCFICH resource mapping option for the M-REG mapping pattern illustrated by FIG. 11A with ½ antenna ports in the case of normal CP with cell ID 0. FIG. 15B illustrates the corresponding mapping with cell ID 2. According to this resource mapping rule, for Cell ID 0, M-PCFICH is mapped to M-REG 0, 8, 16, 24. For Cell ID 2, M-PCFICH is mapped to M-REG 2, 10, 18, 26.

FIGS. 16A and 16B illustrate an embodiment with RE hopping between two sub-regions in the same slot. FIG. 16A illustrates such an embodiment of M-PCFICH resource mapping with the M-REG mapping pattern illustrated by FIG. 11A with 1/2 antenna ports in the case of normal CP and cell ID 0. FIG. 16B illustrates the corresponding mapping with cell ID 2. Resource mapping with RE hopping between two sub-regions in the same slot results in resource mapping for cell ID 0 where M-PCFICH is mapped to M-REG 0, 9, 16, 25. Similarly, for Cell ID 2, M-PCFICH is mapped to M-REG 2, 11, 18, 27.

In still further embodiments of M-PCFICH resource mapping, M-REG can be extended to K subframes, where K can be predefined or configured by higher layer. The same design principle for the two M-REG mapping patterns illustrated by FIGS. 10A and 10B and FIGS. 11A and 11B can be extended to K subframes. Furthermore, the patterns illustrated can be easily extended to the case when M-PCFICH spans K subframes. Such embodiments increase the capacity for multiplexing more cells with distinct M-PCFICH resources. However, as M-PCFICH spans multiple subframes, MTC UEs may store multiple subframes to decode the M-CFI contents, which may increase the decoding latency for control channel. Additionally, for such embodiments, the scrambling seed may not be defined as a function of the subframe number. Instead, the scrambling seed may be defined as a function of either a physical cell ID or a super-frame number or a combination of these two parameters as proposed above.

In some embodiments, an MTC region can be defined in order to coexist with current LTE system. In particular, the starting OFDM symbols of MTC regions in each subframe can be predefined or configured by a higher layer. In additional embodiments, M-REG can be defined within the MTC region. For instance, if the starting symbol for the MTC region is configured as 3, then M-REG can be defined from symbol 3 to symbol 13 in one subframe or in each subframe of K subframes. In such embodiments, the same design principle as illustrated above for FIGS. 10-16 can be applied for M-PCFICH resource mapping.

Figure 17:
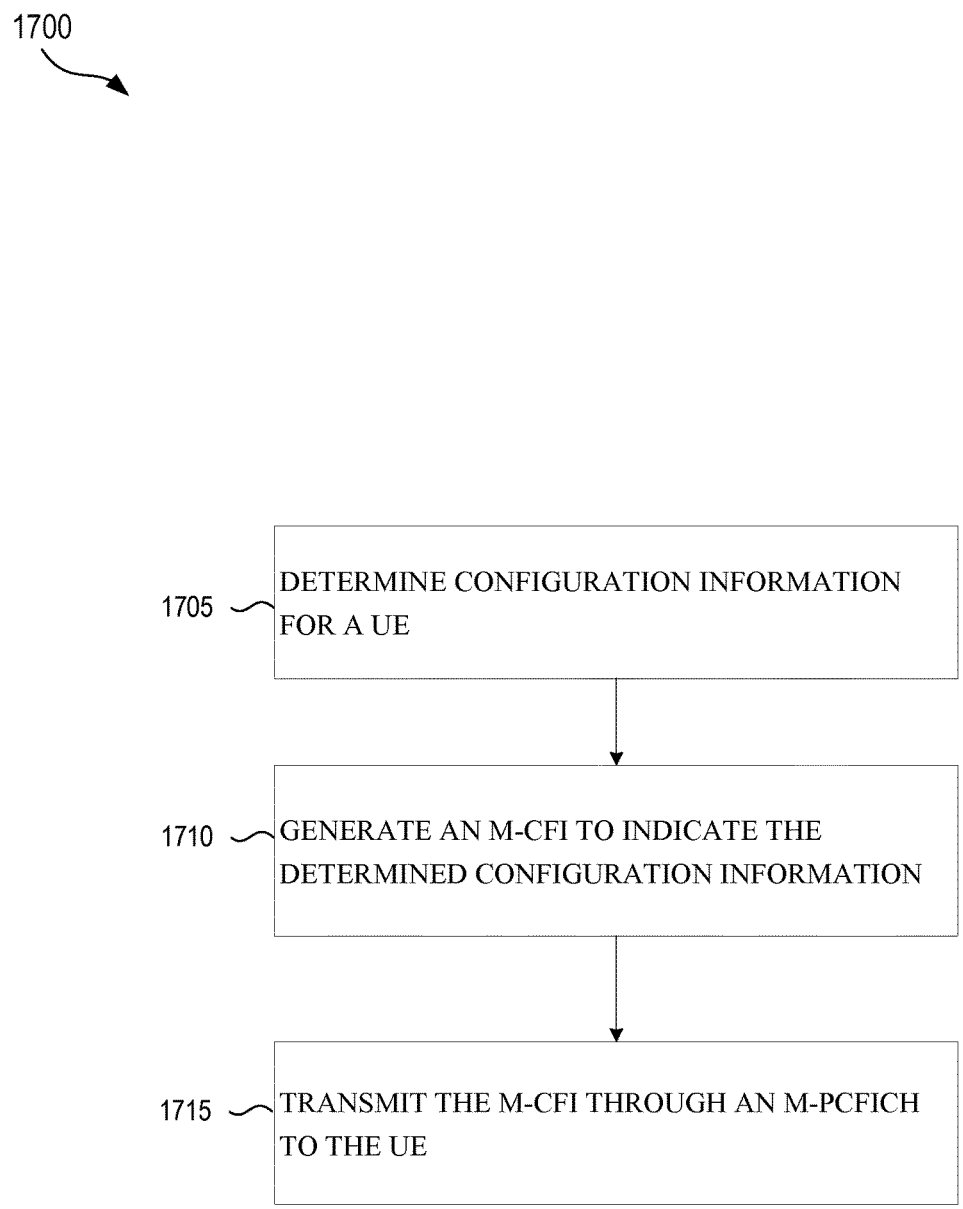
FIG. 17 illustrates a method, according to some example embodiments.

FIG. 17 describes a method 1700 for PCFICH operation. In various embodiments, method 1700 may be performed by circuitry of an eNB such as eNB 150. Circuitry of such an eNB may be adapted to determine configuration information associated with wireless communication within the narrow system bandwidth, such as MTC. This configuration information may be associated with one or more of an M-PDCCH, an M-PDSCH, and/or an M-PHICH. The control circuitry may generate an M-CFI to indicate the determined configuration information to a UE. In various embodiments, the control circuitry may be adapted to map resource elements to one or more M-REGs for transmission through an M-PCFICH. Within the narrow system bandwidth, the transmit circuitry of an eNB may transmit the generated M-CFI through the M-PCFICH to a UE. Accordingly, the receive circuitry may be adapted to receive data from the UE based on the configuration information for MTC within the narrow system bandwidth. The method 1700 may include an operation 1705 for determining configuration information associated with MTC within a narrow system bandwidth. This configuration information may be associated with one or more of an M-PDCCH, an M-PDSCH, and/or an M-PHICH.

The method 1700 may further include an operation 1710 for generating an M-CFI to indicate the determined configuration information.

Operation 1715 then involves transmitting the generated M-CFI through an M-PCFICH to a UE. In various embodiments, operation 1715 may include operations associated with mapping resource elements to one or more M-REGs for transmission through the M-PCFICH. Accordingly, the UE communicating with the eNB may use the configuration information indicated by the M-CFI for MTC within narrow system bandwidth.

Figure 18:
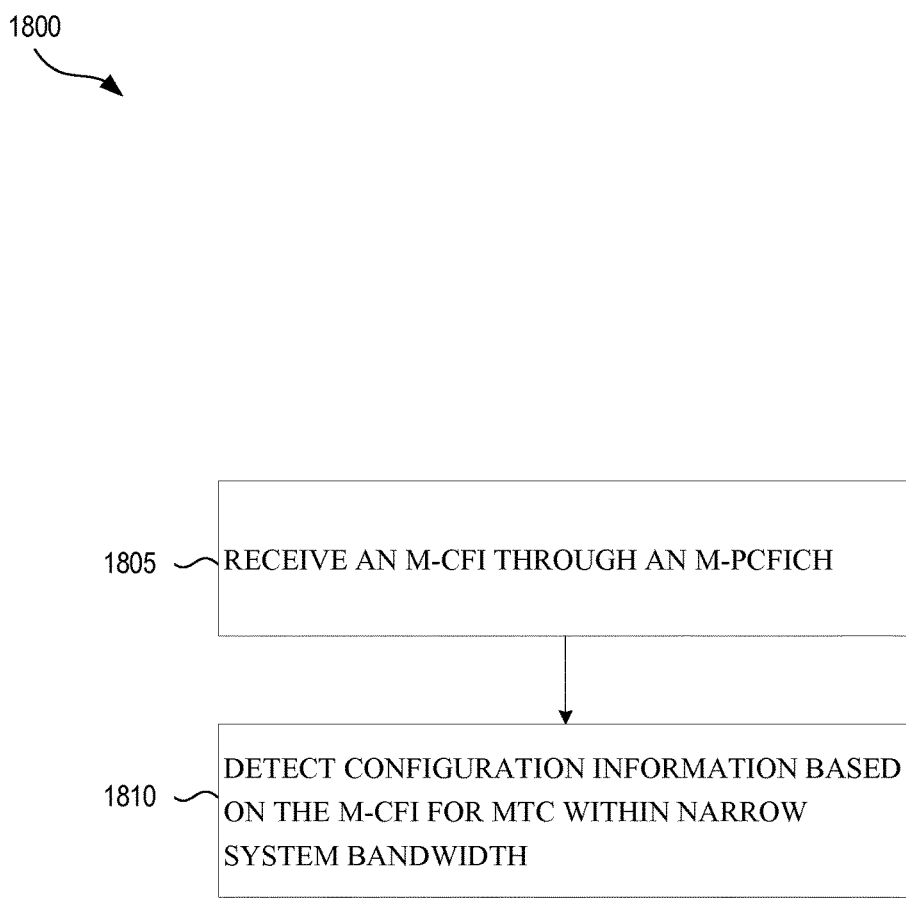
FIG. 18 illustrates a method, according to some example embodiments.

FIG. 18 describes a method 1800. Method 1800 may be performed by a UE such as UE 101 of FIG. 1. Within the narrow system bandwidth, the receive circuitry of such a UE may be configured to receive an M-CFI through an M-PCFICH from an eNB. Based on the M-CFI, the control circuitry of the UE may be adapted to detect configuration information associated with wireless communication within the narrow system bandwidth, such as MTC. This configuration information may be associated with one or more of an M-PDCCH, M-PDSCH, and/or an M-PHICH. Transmit circuitry of the UE may be adapted to transmit data from the UE within the narrow system bandwidth.

The UE circuitry may then perform method 1800 which may include an operation 1805 for receiving an M-CFI through an M-PCFICH from an eNB. Operation 1810 then includes detecting configuration information based on the M-CFI for MTC within narrow system bandwidth. The detected configuration information be associated with one or more of an M-PDCCH, an M-PDSCH, and/or an M-PHICH. For example, the detected configuration information may indicate one or more time and/or frequency units (e.g., symbols, clots, subframes, physical resource blocks, etc.) that are to be used for MTC within narrow system bandwidth through one or more of the M-PDCCH, M-PDSCH, and/or M-PHICH.

FIGS. 19-25 relate to embodiments for PHICH design in MTC with narrowband deployment. Certain such embodiments as described herein use scrambling on M-PHICH based on a super-frame number, as well as M-PHICH resource allocation based on a super-frame definition for a particular embodiment. Additionally, embodiments describe M-PHICH locations and mapping rules in conjunction with M-REG for MTC narrowband systems.

Figure 19:
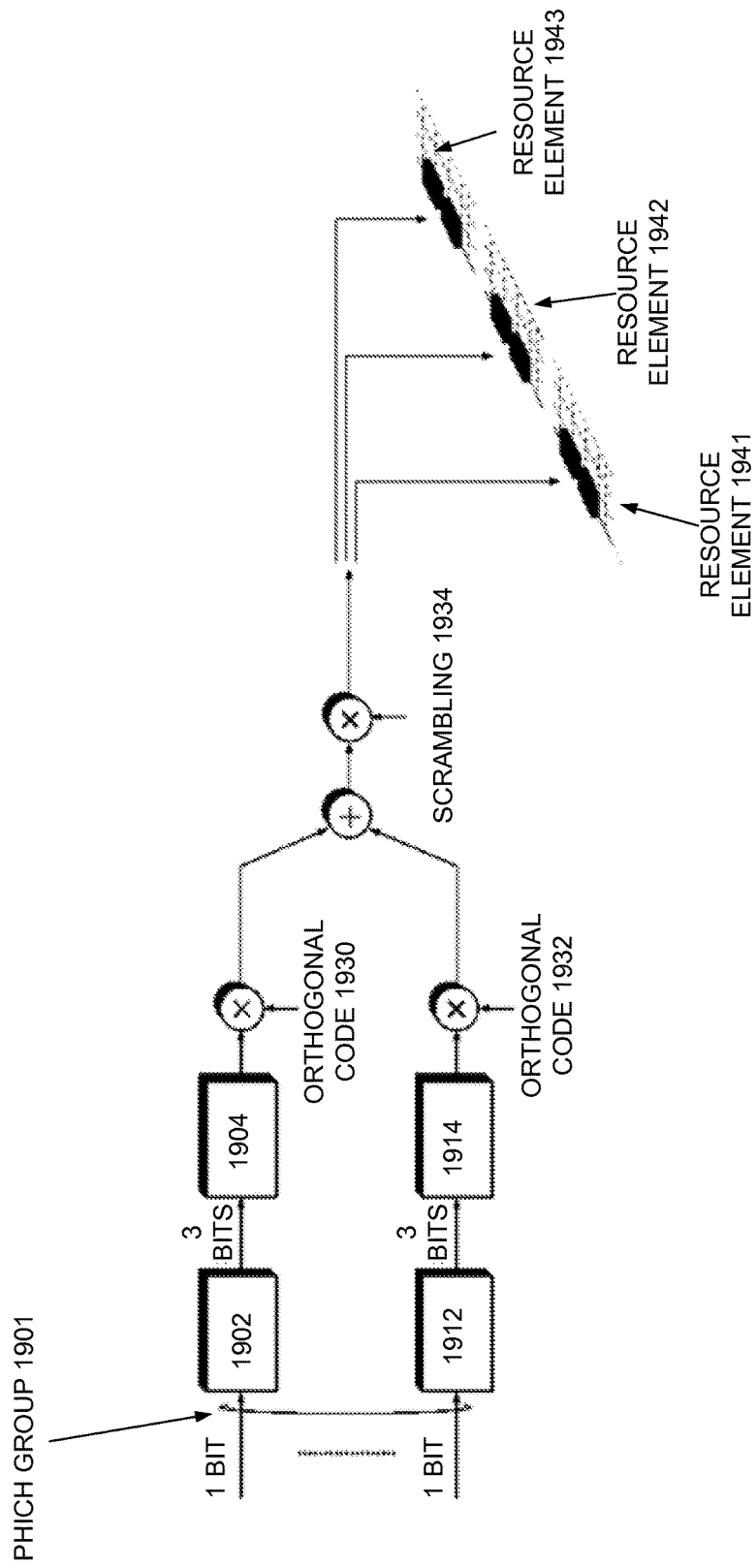
FIG. 19 illustrates aspects of physical HARQ indicator channel (PHICH) design according to certain embodiments.

FIG. 19 illustrates aspects of PHICH processing. The PHICH carries the HARQ ACK/NACK which indicates whether an eNB such as eNB 150 has correctly received a transmission on the PUSCH. The HARQ indicator, which is a single bit of information per transport block, is repeated three times using repetition circuitry 1902, 1912 for each PHICH in a PHICH group 1901, followed by binary phase shift key (BPSK) modulation circuitry 1904 and 1914 for each PHICH. Multiple PHICHs are mapped to the same set of resource elements, as illustrated in FIG. 19. These constitute a PHICH group, shown as PHICH group 1901, where different PHICHs within the same PHICH group 1901 are separated through different complex orthogonal codes 1930 and 1932 (e.g., Walsh sequences). The sequence length is four for the normal CP (or two in the case of the extended CP). After forming the composite signal representing the PHICHs in a group, cell-specific scrambling 1934 is applied and the 12 scrambled symbols are mapped to three resource-element groups 1941, 1942, 1943, separated by approximately one-third of the downlink cell bandwidth. Note that a PHICH resource 1941, 1942, 1943 is identified by the index pair ($n_{PHICH}^{group}$, $n_{PHICH}^{seq}$), where $n_{PHICH}^{group}$ is the PHICH group number and $n_{PHICH}^{seq}$ is the orthogonal sequence index within the group. The PHICH index is implicitly associated with the index of the lowest uplink resource block used for the corresponding PUSCH transmission. In addition, cyclic shifts of the uplink demodulation reference signals configured for the different UEs are used to derive the PHICH index.

The number of PHICH groups such as PHICH group 1901 for M-PHICH transmission can be predefined or configured by the eNB, such as eNB 150. In one embodiment, the configuration information can be broadcast in the M-MIB conveyed in the M-PBCH or broadcast in M-SIB.

In additional embodiments, the number of PHICH groups can be predefined or configured depending on the superframe duration. For instance, similar to the existing LTE specification, the number of the PHICH groups $n_{PHICH}^{group}$ is constant in all super-frames and given by $$N_{PHICH}^{group} = \begin{cases} \lceil N_g(N_{SuperFrame}/8) \rceil & \text{for normal cyclic prefix} \\ 2 \cdot \lceil N_g(N_{SuperFrame}/8) \rceil & \text{for extended cyclic prefix} \end{cases} \quad (7)$$

where $N_g$ is provided by higher layers, and $N_{SuperFrame}$ is the duration of super-frame. For instance, $N_g \varepsilon$ {1/6, 1/2, 1, 2}.

For M-PHICH processing in various embodiments, channel coding as used in the existing (high-bandwidth) LTE specification can be applied with ACK/NACK repeated three times. Furthermore, similar modulation mapping, orthogonal sequences, and procedures to generate a sequence of modulation symbols d(0), . . . , d($M_{symb}$−1) can be reused as in the current LTE standard, where $M_{symb}$ is the number of symbols for M-PHICH transmission.

Additionally, in some embodiments, the same scrambling seed as defined in the LTE specification can be reused, which may be:

$$c_{init} = (\lfloor n_s/2 \rfloor + 1) \cdot (2N_{ID}^{cell} + 1) \cdot 2^9 + N_{ID}^{cell}, \quad (8)$$

where $n_s$ is the slot number and $N_{ID}^{cell}$ is the cell ID.

In additional embodiments, the scrambling seed can be defined as a function of the cell ID only. For instance, the scrambling seed can be given as cell $$c_{init} = N_{ID}^{cell} \quad (9)$$

In still further such embodiments, the scrambling seed can be defined as a function of the cell ID and super-frame number, i.e., $$c_{init} = f(n_{superframe}, N_{ID}^{cell}), \quad (10)$$

where $n_{superframe}$ is the super-frame number. For instance, the scrambling seed can be given as $$c_{init} = (n_{superframe}+1) \cdot (2N_{ID}^{cell}+1) \cdot 2^9 + N_{ID}^{cell}, \quad (11)$$

In still further embodiments, the scrambling seed can be defined as a function of the slot number ($n_s$), the cell ID, and super-frame number. For instance, it can be given as $$c_{init} = (\lfloor n_s/2 \rfloor+1) \cdot (n_{superframe}+1) \cdot (2N_{ID}^{cell}+1) \cdot 2^9 + N_{ID}^{cell}. \quad (12)$$

In these various embodiments, the resource group alignment, layer mapping, and precodings as used in accordance with standard LTE systems may be used for M-PHICH design as merged with the super-frame design of the embodiments described herein for simplicity in integration with such existing systems. As discussed above, various M-PHICH resource mappings may be used and allocated in either the control region or data region. Examples discussed above include a first embodiment where M-PHICH is allocated in the last $K_0$ subframes of the control region where $K_0 \leq (N_{control}-1)$, and $N_{control}$ is the number of subframes allocated for control channel. Embodiments include a second embodiment where M-PHICH is located in the $K_1$ subframes of the data region, where $K_1 \leq N_{data}$, and $N_{data}$ is the number of subframes allocated for the data region. Embodiments discussed above include a third embodiment where M-PHICH is located in the first $K_2$ subframes within a super-frame. As a special case of the third embodiment, $K_2 = 1$.

In the embodiments discussed below in FIGS. 20-25, continuous resource allocations are considered for MTC control regions. Distributed resource allocation for the MTC control region may be extended in various additional embodiments not particularly described, but which will be apparent based on the descriptions herein.

Let $$z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle, \quad (13)$$

where i=0, 1, 2 denotes symbol quadruplet i for antenna port p, and where $\tilde{y}^{(p)}(n)$ is the M-PHICH mapping unit from an M-PHICH group. Although the examples shown below consider the case that all the OFDM symbols are allocated for the M-REG resource mapping, similar design principles can be easily extended to the case where OFDM symbols in the MTC region as are allocated for the M-REG resource mapping as described above for PCFICH design. For instance, if the starting symbol for MTC region is configured as 3, then M-REG can be defined from symbol 3 to symbol 13 in one subframe or in each subframe of K subframes.

As discussed above, M-REG can be defined and extended from an existing REG for one or more subframes for control channel design. In particular, four REs may be mapped to the M-REG) not used for reference signals (e.g., CRS or other MTC related reference signals if applicable) in the increasing order of first subcarrier and then OFDM symbol. In certain embodiments discussed below, M-REG mapping rules are designed based on CRS patterns. It will be apparent that additional embodiments may be derived from other reference signal patterns (e.g., dedicated M-RS).

Figure 20:
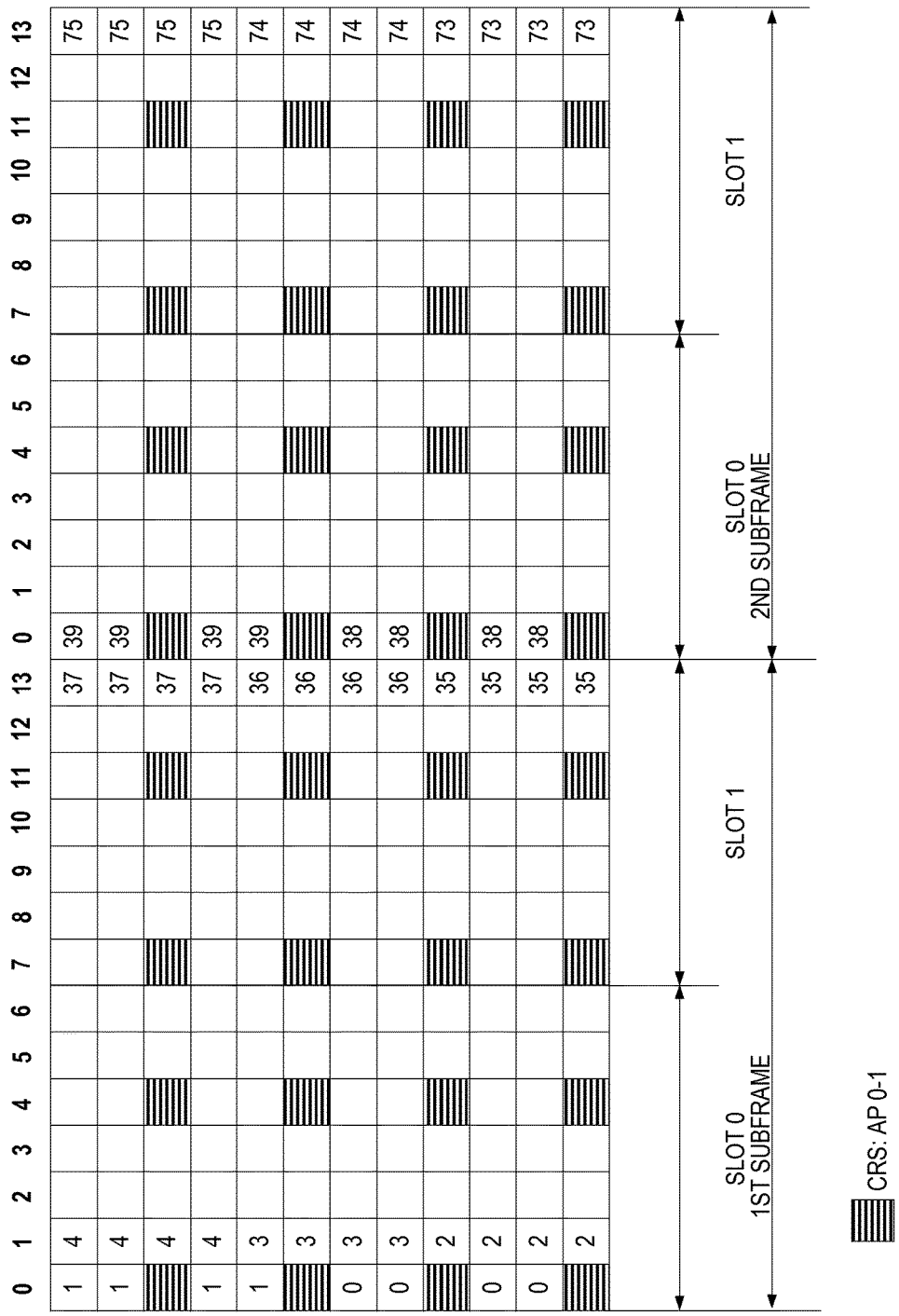
FIG. 20 illustrates aspects of REG resource mapping for two subframes according to certain embodiments.

Error! Reference source not found. FIG. 20 illustrates the M-REG resource mapping for two subframes with one or two antenna ports in the case of normal CP. The same design principle can be applied for four antenna ports and/or extended CP in multiple various different embodiments. In the embodiment illustrated by FIG. 20, Nreg is defined as the number of M-REGs in one subframe. According to the M-REG resource mapping pattern, in the normal CP case, Nreg=38 for one or two antenna ports and Nreg=36 for four antenna ports. In the extended CP case, Nreg=32 for one or two antenna ports and Nreg=30 for four antenna ports.

For $K^{th}$ subframe, the starting M-REG index is $(K-1) \cdot N_{REG}$ and the last M-REG index is $K \cdot N_{REG}-1$. For instance, as shown in FIG. 20, the starting and last M-REG index for the $2^{nd}$ subframe is 38 and 75 with one or two antenna ports in the case of normal CP, respectively.

In some embodiments, M-PHICH is equally distributed in the last $K_0$ subframes of the control region, where $K_0 \leq (N_{control}-1)$. $K_0$ can be predefined or configured by higher layers. For instance, M-PHICH can be allocated from the second subframe to the last subframe of the control region. In another example embodiment, M-PHICH can be allocated in the last two subframes of the control region, which may help to alleviate the uplink processing timing issue when the number of HARQ processes is small.

In various embodiments described herein for M-PHICH resource mapping, then, three symbol quadruplets in one M-PHICH group are separated by approximately one-third of the $K_0$ subframes, with the starting position derived from the physical cell identity. This resource mapping scheme can help exploit the benefits of time diversity and reduce the risk of inter-cell M-PHICH collisions. The M-PHICH resource mapping rule for option 1 can be defined as follows: Mapping to resource elements for M-PHICH transmission is defined in terms of symbol quadruplets according to steps 1-7 below:

1) Let $n_c$ denote the number of resource element groups in $K_0$ subframes.
2) Number the resource-element groups from 0 to $n_c-1$, starting from the resource-element group with the lowest frequency-domain index and then the time domain index.
3) Initialize m=0 (M-PHICH mapping unit number).
4) For each value of i=0, 1, 2 symbol-quadruplet $z^{(p)}(i)$ from M-PHICH mapping unit m' is mapped to the resource-element group represented by the M-REG index k according to the M-REG resource mapping pattern as defined above, where k is given by $$k_i = \begin{cases} (N_{ID}^{cell} + m') \bmod n_c & i = 0 \\ (N_{ID}^{cell} + m' + \lfloor n_c/3 \rfloor) \bmod n_c & i = 1 \\ (N_{ID}^{cell} + m' + \lfloor 2n_c/3 \rfloor) \bmod n_c & i = 2 \end{cases}$$

5) Increase m' by 1.
6) Repeat from step 4 until all M-PHICH mapping units have been assigned.

Figure 21:
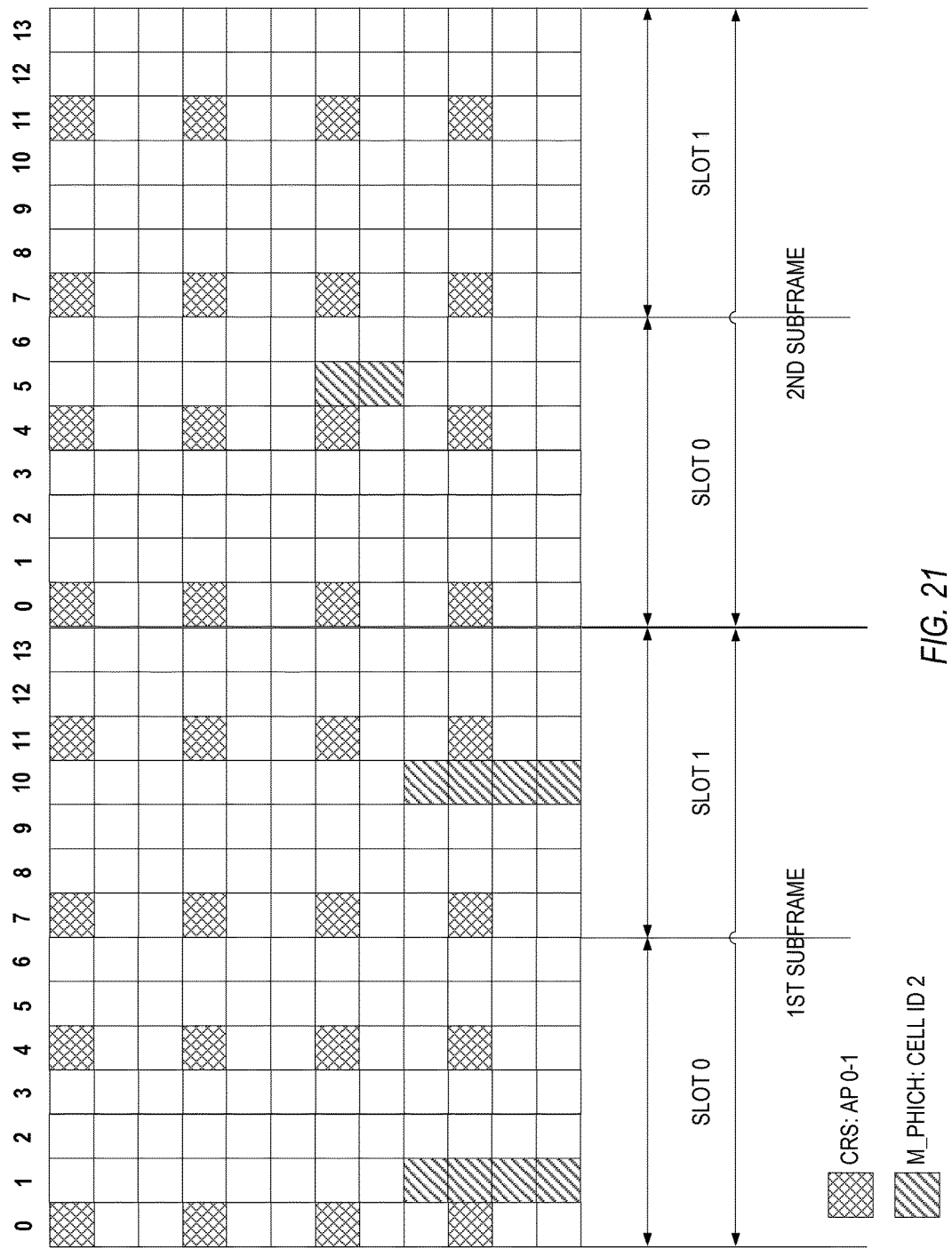
FIG. 21 illustrates aspects of PHICH resource mapping according to certain embodiments.

FIG. 21 illustrates one example of M-PHICH resource mapping, according to the above described embodiment with two subframes and ½ antenna ports in the case of normal CP. In the example, $N_{ID}^{cell}=2$ and $N_{PHICH}^{group}=1$. From the figure, it can be seen that the total number of M-REG $n_c$ is 76 and M-PHICH is transmitted in the M-REG 2, 27, and 52.

Figure 22:
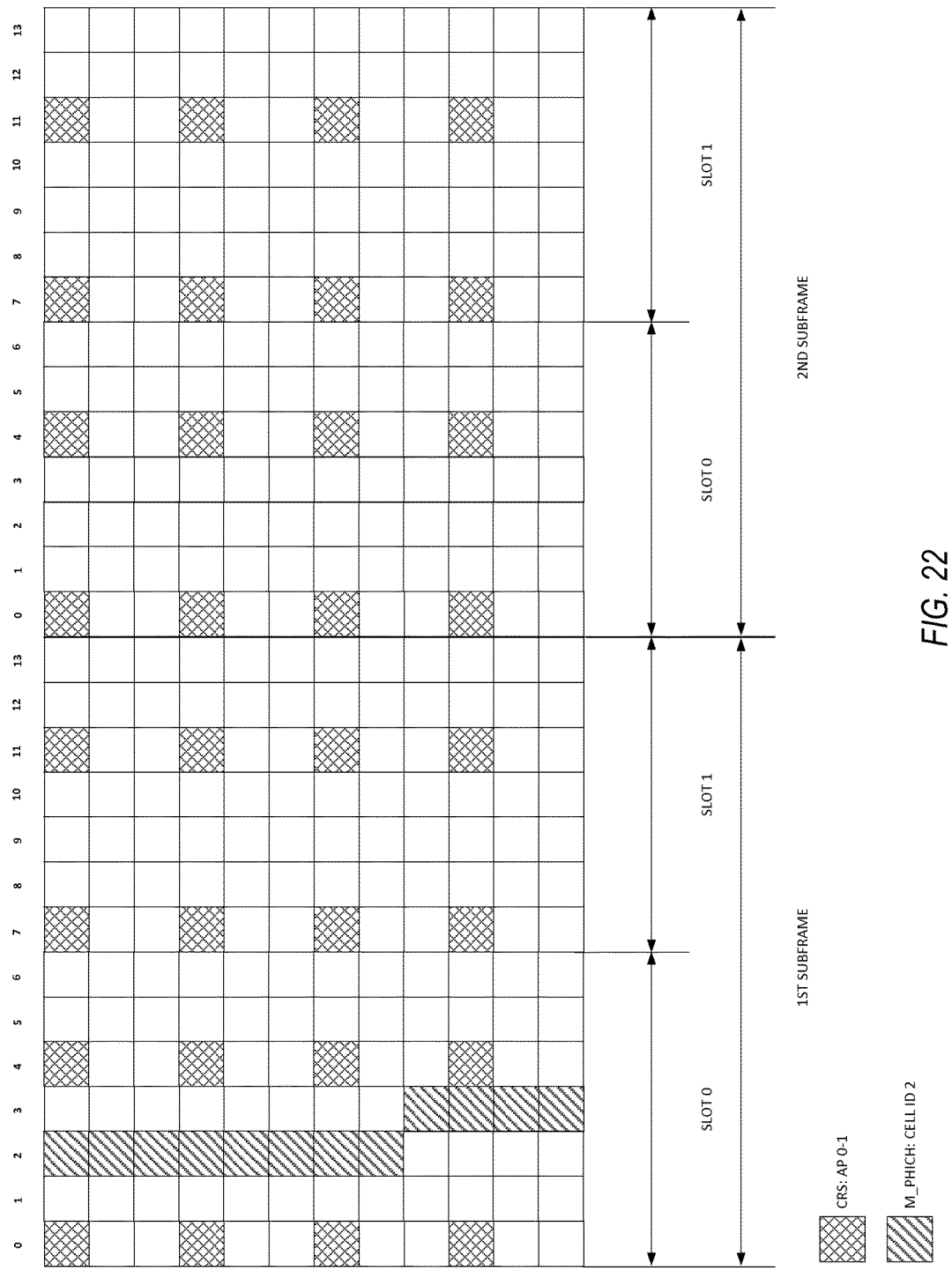
FIG. 22 illustrates aspects of PHICH resource mapping according to certain embodiments.

FIG. 22 describes alternative embodiments using different resource mapping. In such alternate embodiments, three symbol quadruplets in one M-PHICH group are allocated in the contiguous M-REGs, with the starting position derived from the physical cell identity. The alternative M-PHICH resource mapping rule for can be defined as follows:

Mapping to resource elements for M-PHICH transmission is defined in terms of symbol quadruplets according to steps 1-7 below:

1) Let $n_e$ denote the number of resource element groups in $K_0$ subframes.
2) Number the resource-element groups from 0 to $n_c-1$, starting from the resource-element group with the lowest frequency-domain index and then the time domain index.
3) Initialize m'=0 (M-PHICH mapping unit number).
4) For each value of i=0, 1, 2 symbol-quadruplet $z^{(p)}(i)$ from M-PHICH mapping unit m' is mapped to the resource-element group represented by the M-REG index $k_i$ according to the M-REG resource mapping pattern as defined above, where $k_i$ is given by $$k_i = \begin{cases} (3 \cdot N_{ID}^{cell} + 3 \cdot m') \bmod n_c & i = 0 \\ (3 \cdot N_{ID}^{cell} + 3 \cdot m' + 1) \bmod n_c & i = 1 \\ (3 \cdot N_{ID}^{cell} + 3 \cdot m' + 2) \bmod n_c & i = 2 \end{cases}$$

5) Increase m' by 1.
Repeat from step 4 until all M-PHICH mapping units have been assigned.

FIG. 22 illustrates one example of alternative M-PHICH resource mapping just above for two subframes with one or two antenna ports in the case of normal CP. In the example, $N_{ID}^{cell}=2$ and $N_{PHICH}^{group}=1$. From FIG. 22, it can be seen that the total number of M-REG $n_e$ is 76 and M-PHICH is transmitted in the M-REG 6, 7, and 8.

Figure 23:
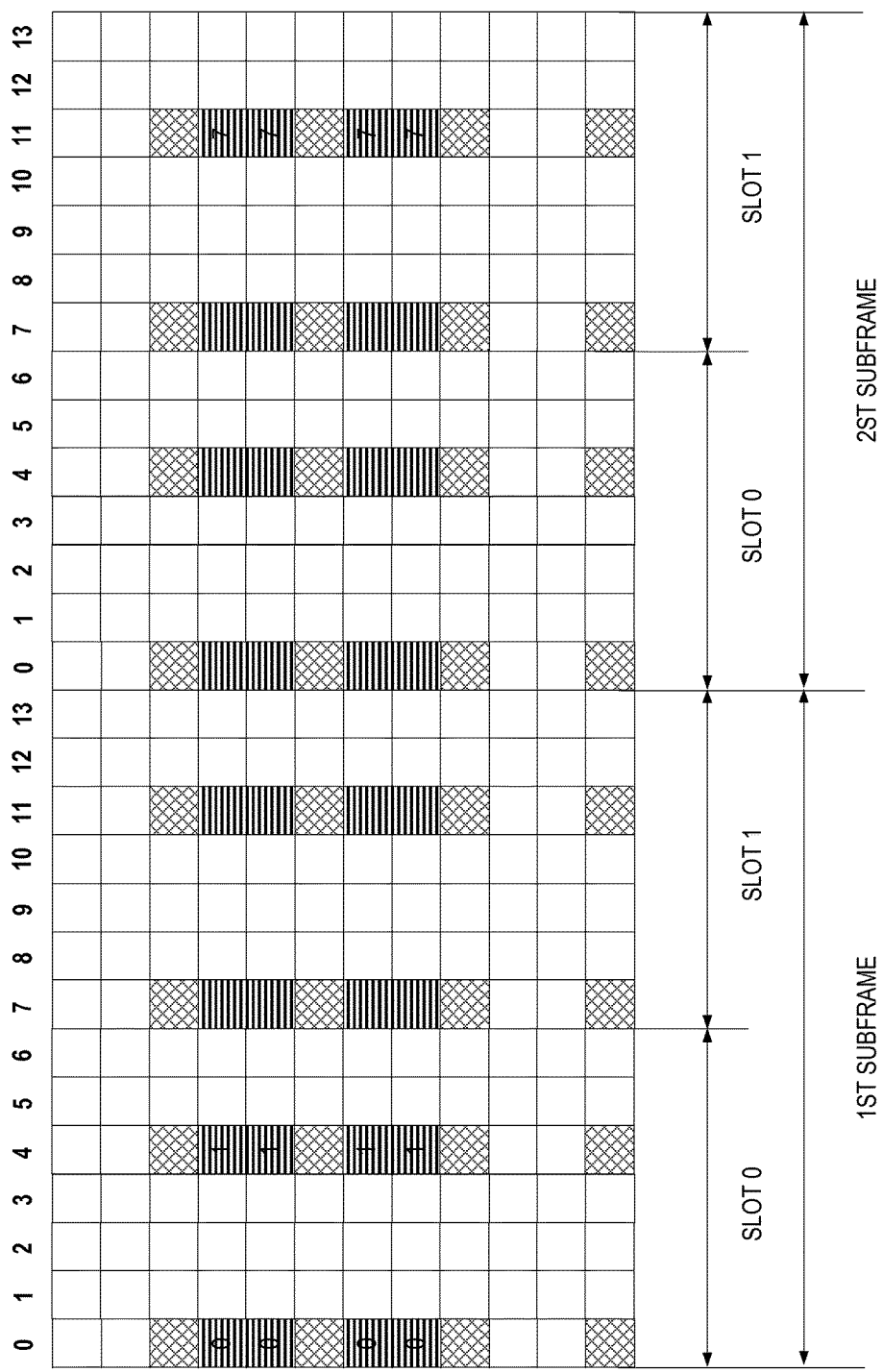
FIG. 23 illustrates aspects of REG resource mapping for two subframes according to certain embodiments.
Figure 24:
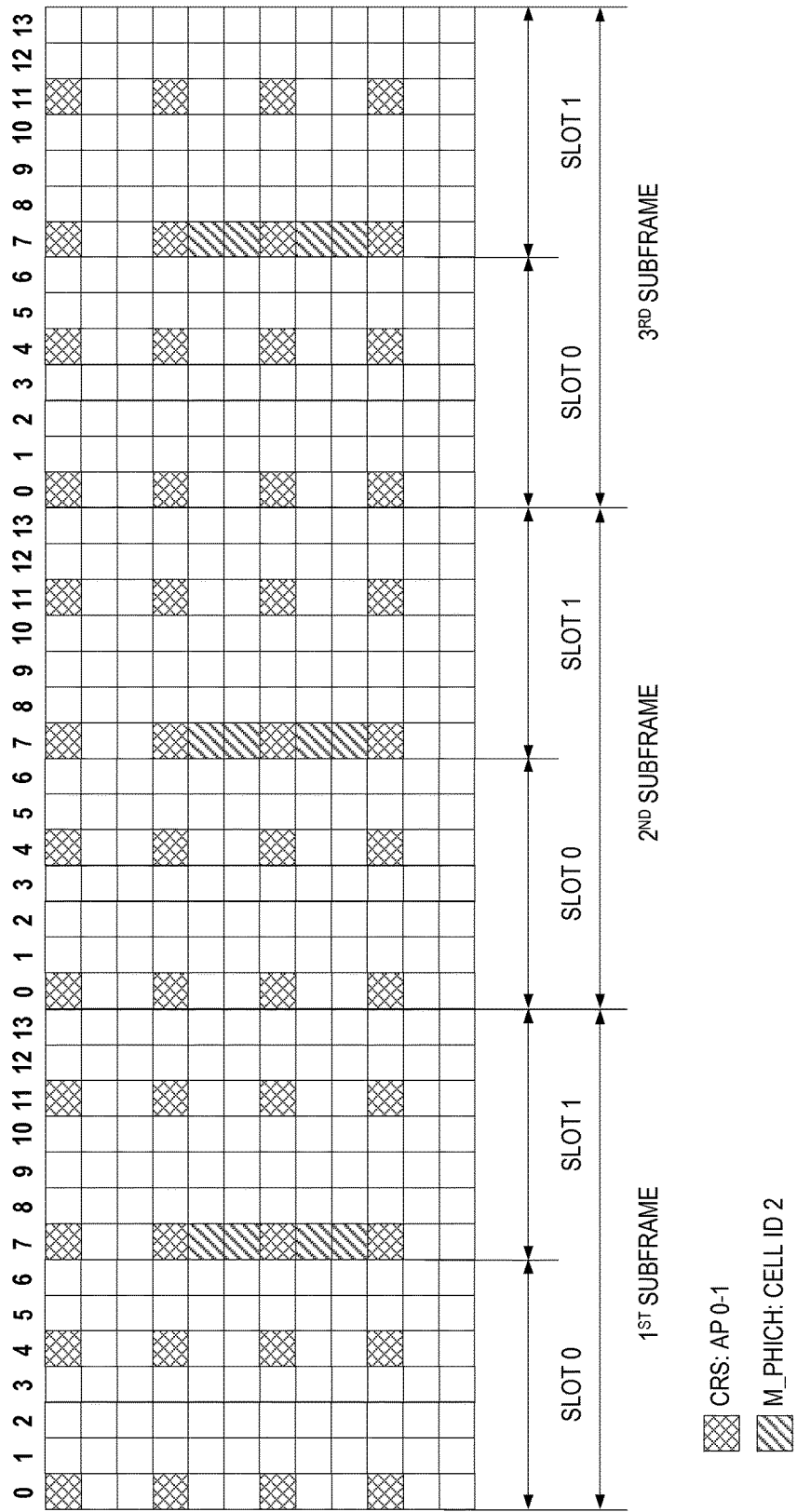
FIG. 24 illustrates aspects of PHICH resource mapping according to certain embodiments.
Figure 25:
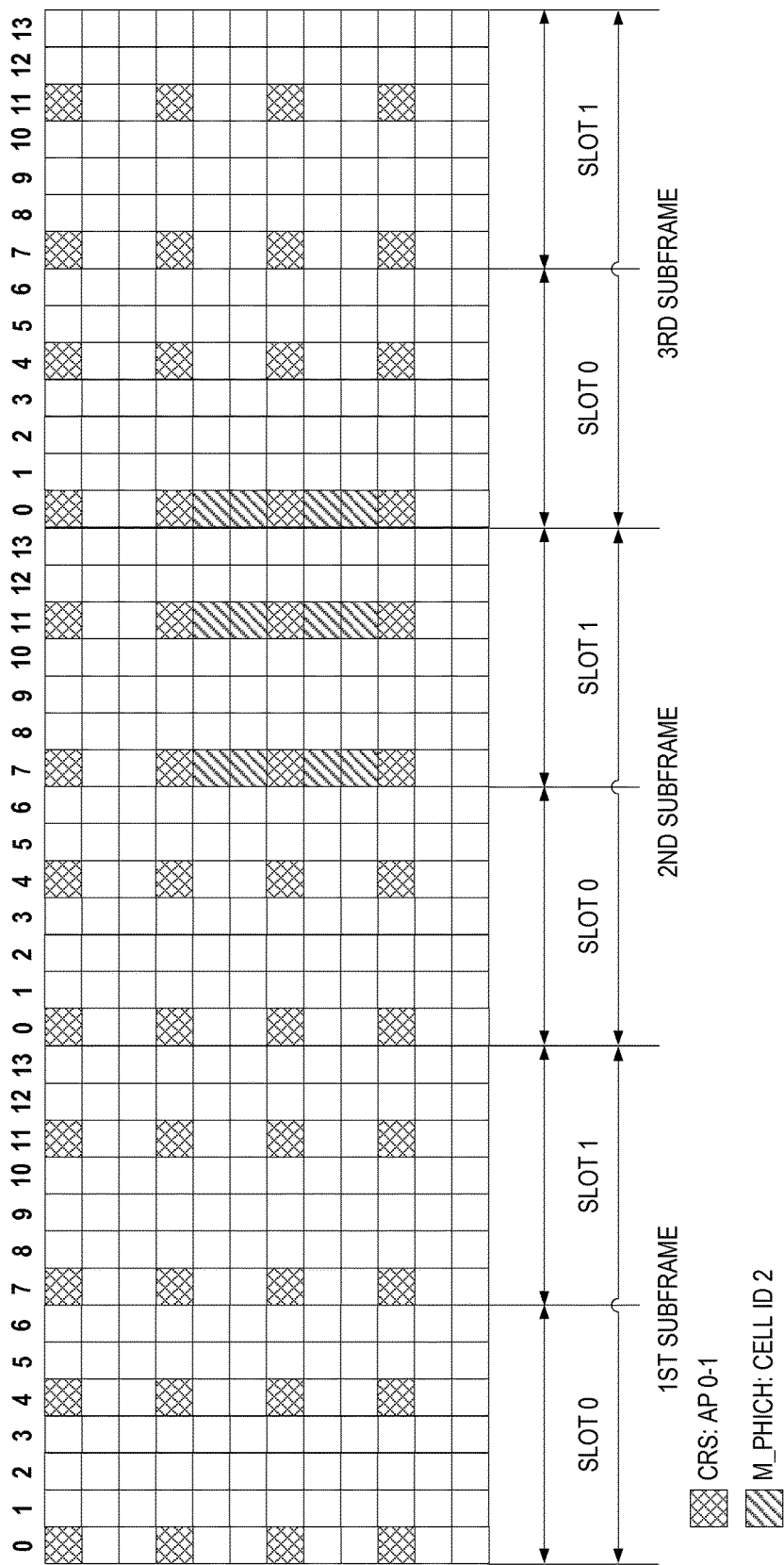
FIG. 25 illustrates aspects of PHICH resource mapping according to certain embodiments.

FIGS. 23-25 describe an additional alternative set of embodiments. In such embodiments, M-PHICH is allocated in the data region. More specifically, three symbol quadruplets can be either separated by approximately one-third of the $K_1$ subframes or allocated in the contiguous M-REGs in the data region, with the starting position derived from the physical cell identity. $K_1$ can be either predefined or configured by the higher layers.

In one embodiment, the same rule for M-REG and M-PHICH resource mapping as discussed above for FIG. 20 can be applied for the data region. In this case, M-PDSCH transmission is punctured or rate-matched around the REs allocated for M-PHICH transmission.

In certain other embodiments, M-PHICH is located in the REs near the reference signal, (e.g., CRS or dedicated M-RS), in order to improve the channel estimation performance for M-PHICH transmission. For instance, 4 REs in the center of 12 subcarriers that are assigned for CRS transmission can be grouped as an M-REG. FIG. 23 illustrates the M-REG resource mapping for two subframes with one or two antenna ports in the case of normal CP. In the example, M-REG is located in the center four REs in OFDM symbol #0, #4, #7, #11 in each subframe in the case of normal CP and one or two antenna ports. In addition, the number of M-REGs in two subframes is eight.

Based on the proposed M-REG resource mapping pattern in the data region, M-PHICH resource mapping can follow the same principle as in option 1 (i.e., three symbol quadruplets in one M-PHICH group are separated by approximately one-third of $K_1$ subframes in the data region). Further, the same M-PHICH resource mapping rule can be applied for this option based on the proposed M-REG pattern. In such embodiments, M-PDSCH transmission is punctured or rate-matched around the REs allocated for M-PHICH transmission.

FIG. 24 illustrates the M-PHICH resource mapping as described in FIG. 23 for three subframes in the data region with one or two antenna ports in the case of normal CP. In such embodiments, $N_{ID}^{cell}=2$ and $N_{PHICH}^{group}=1$. In FIG. 24, it can be seen that the total number of M-REG $n_c$ is 12 and M-PHICH is transmitted in the M-REG #2, #6 and #10, which are allocated in the center four REs of the OFDM symbol #7 in the first, second, and third subframe, respectively.

FIG. 25 describes additional embodiments, where M-PHICH is allocated in the increasing order of M-REGs, with the starting index derived from the physical cell ID. Similarly, M-PDSCH transmission is punctured or rate-matched around the REs allocated for M-PHICH transmission.

FIG. 25 illustrates the alternative M-PHICH resource mapping for three subframes in the data region with one or two antenna ports in the case of normal CP. In the example, $N_{ID}^{cell}=2$ and $N_{PHICH}^{group}=1$. From FIG. 24, it can be seen that the total number of M-REG $n_c$ is 12 and M-PHICH is transmitted in the M-REG #6, #7 and #8.

In addition to the embodiments above describing first and second options for M-PHICH resource mapping, in a third set of additional embodiments, M-PHICH is located in the first $K_2$ subframes within a super-frame. In certain embodiments, $K_2=1$. A similar M-PHICH resource mapping mechanism as described above for FIGS. 20-22 can be applied for such embodiments. More specifically, M-PHICH can be equally distributed or allocated in the contiguous M-REGs in the first $K_2$ subframes within a super-frame.

As discussed above, particularly with respect to FIGS. 5A, 5B, 6A, and 6B, a DL/UL HARQ procedure with various numbers of HARQ processes is proposed based on a super-frame structure. More specifically, for UL HARQ procedure with 2×M HARQ processes, the gap between the M-PUSCH transmission and the ACK/NACK feedback in M-PHICH is M super-frames. According to such embodiments, for M-PUSCH transmissions scheduled from serving cell c in super-frame n, a UE shall determine the corresponding M-PHICH resource of serving cell c in super-frame n+M. Similar to the existing LTE specification, M-PHICH resources can be identified by the index pair ($N_{PHICH}^{group}$, $N_{PHICH}^{seq}$), where $n_{PHICH}^{group}$ is the M-PHICH group number and $N_{PHICH}^{seq}$ is the orthogonal sequence index within the group. In one embodiment, the M-PHICH resource index can be defined as:

$$N_{PHICH}^{group} = (I_{PRB\_RA} + n_{DMRS}) \bmod N_{PHICH}^{group}$$

$$N_{PHICH}^{seq} = (\lfloor I_{PRB\_RA} / N_{PHICH}^{group} \rfloor + n_{DMRS}) \bmod 2N_{SF}^{PHICH}, \quad (14)$$

where $n_{DMRS}$ is mapped from the cyclic shift for DMRS field; $N_{SF}^{PHICH}$ is the spreading factor size used for M-PHICH modulation; $N_{PHICH}^{group}$ is the number of M-PHICH groups configured by higher layers; and $I_{PRB\_RA}$ is the resource index of the corresponding M-PUSCH transmission as described by LTE standards. $I_{PRB\_RA}$ can be defined as a function of either time or frequency locations, (e.g., symbol, slot, subframes, PRB, etc.) of the corresponding M-PUSCH transmission, or a function of any combinations of these parameters. For instance, in some embodiments, if TDM is considered for the UL data transmission, $I_{PRB\_RA}$ can be defined as the starting subframe of the corresponding M-PUSCH transmission. In additional such embodiments, a M-PHICH resource index can be defined as:

$$N_{PHICH}^{group} = I_{PRB\_RA} \bmod N_{PHICH}^{group}$$

$$N_{PHICH}^{seq} = \lfloor I_{PRB\_RA}/N_{PHICH}^{group} \rfloor \bmod 2N_{SF}^{PHICH}. \quad (15)$$

In embodiments according to (15), the cyclic shift index is not used when deriving the M-PHICH resource index.

Figure 26:
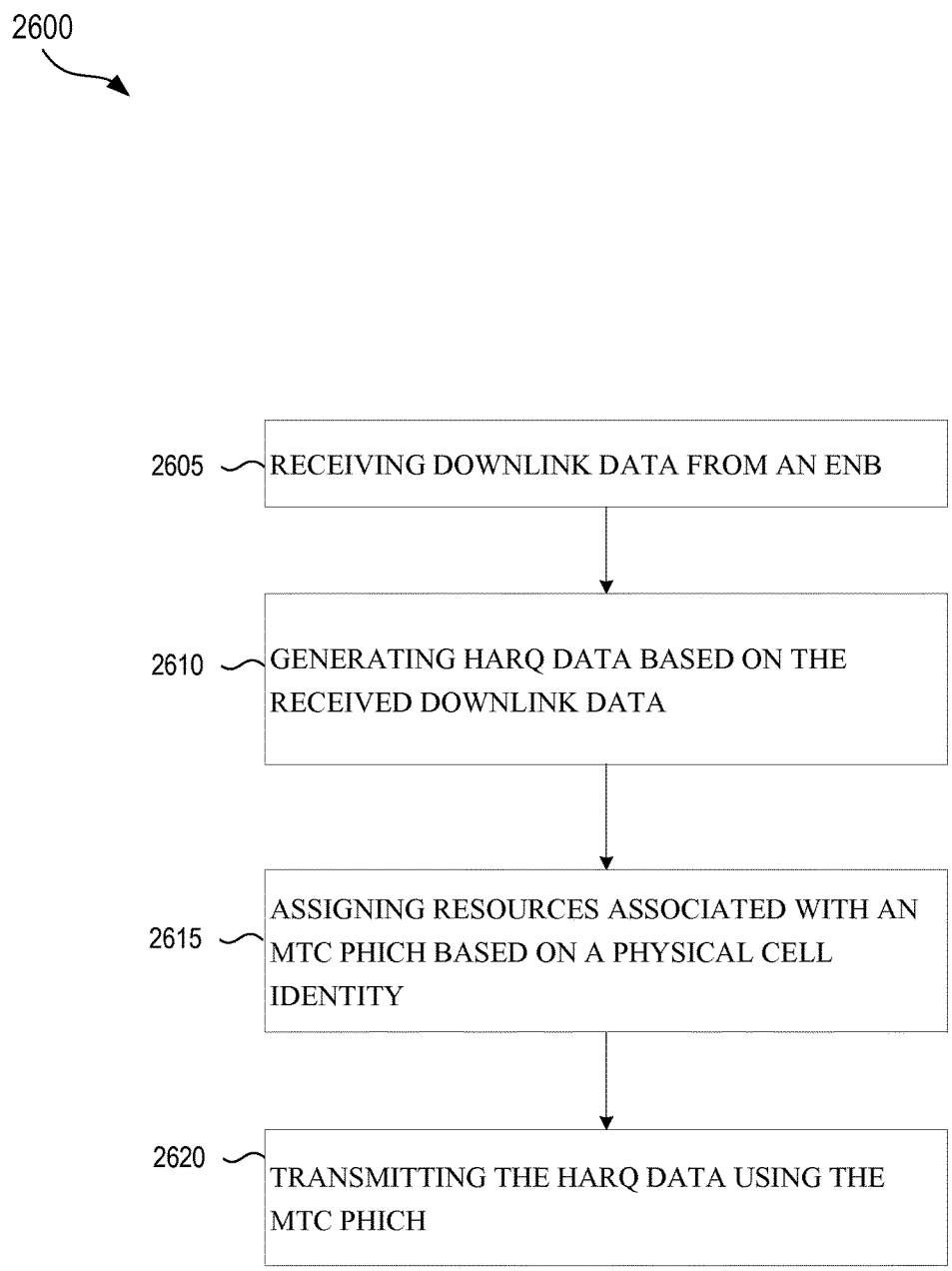
FIG. 26 illustrates a method according to certain embodiments.

FIG. 26 describes a method 2600 that may be performed by an UE such as UE 101 of FIG. 1. Circuitry of such an UE may be configured to transmit HARQ data based on the received downlink data. For example, the transmit circuitry may transmit HARQ data using a MTC PHICH. The control circuitry of such a UE may perform various operations such as those described elsewhere in this disclosure. The control circuitry may be adapted to generate the HARQ data based on the received downlink data and to assign resources associated with an MTC PHICH based on a physical cell identity.

The method 2600 includes operation 2605 for receiving a downlink transmission from an eNB, and operation 2610 for generating HARQ data based on the received downlink data. Operation 2615 involves assigning resources associated with an MTC PHICH based on a physical cell identity, and operation 2620 includes transmitting the HARQ data using the MTC PHICH.

Figure 27:
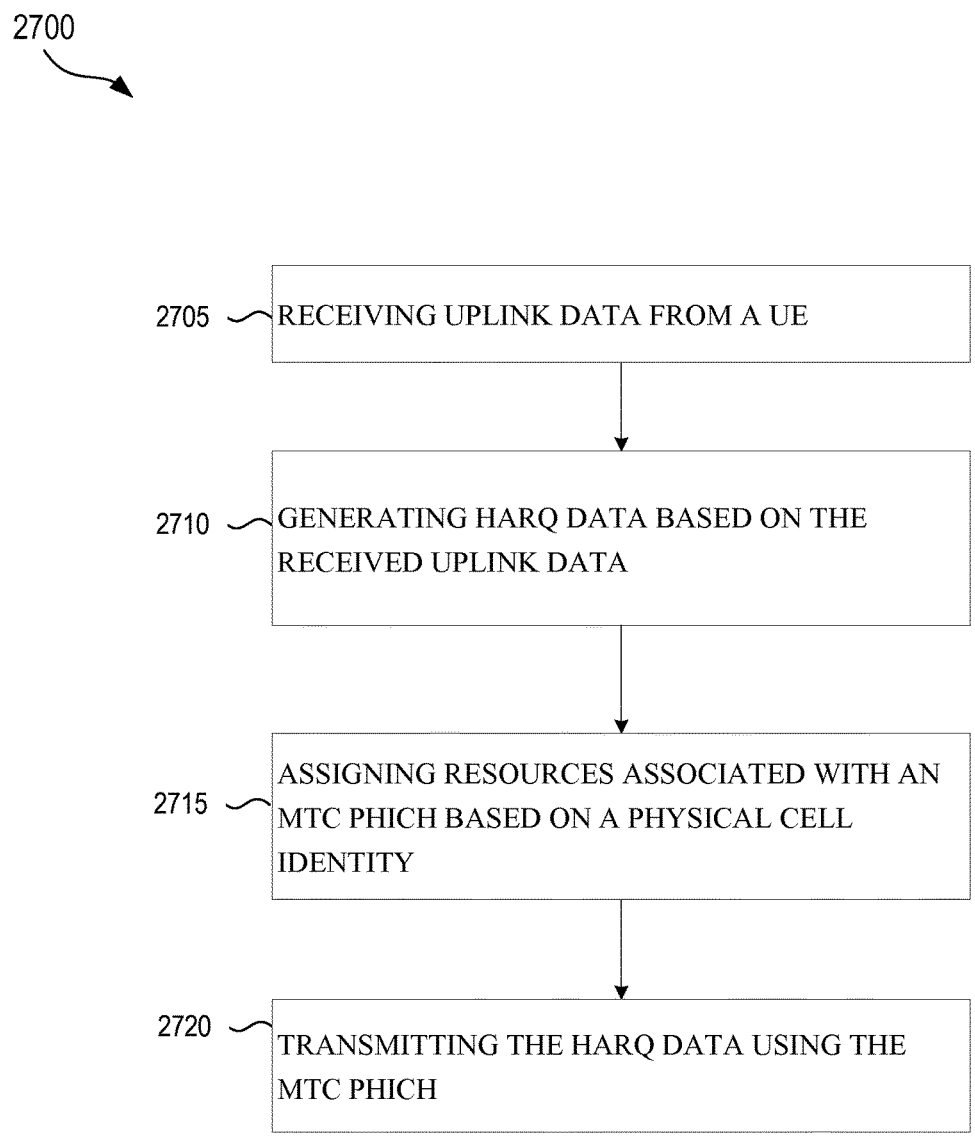
FIG. 27 illustrates a method according to certain embodiments.

FIG. 27 describes a method 2700 that may be performed by an eNB such as eNB 150 of FIG. 1. Circuitry of such an eNB may be adapted to receive uplink transmissions, for example, from a UE performing method 2600. In various embodiments, transmit circuitry of such an eNB may transmit HARQ data based on the received uplink data. Such transmit circuitry may be configured to transmit HARQ data using a MTC PHICH. The control circuitry of such an eNB may perform various operations such as those described elsewhere in this disclosure. The control circuitry may be adapted to generate the HARQ data based on the received uplink data and to assign resources associated with an MTC PHICH based on a physical cell identity.

Method 2700 includes an operation 2705 for receiving an uplink transmission from a UE. In the embodiment of method 2700, this is followed by operation 2710 for generating HARQ data based on the received uplink data, and then operation 2715 for assigning resources associated with an M-PHICH based on a physical cell identity. Operation 2720 then includes transmitting the HARQ data using the M-PHICH.

Figure 28:
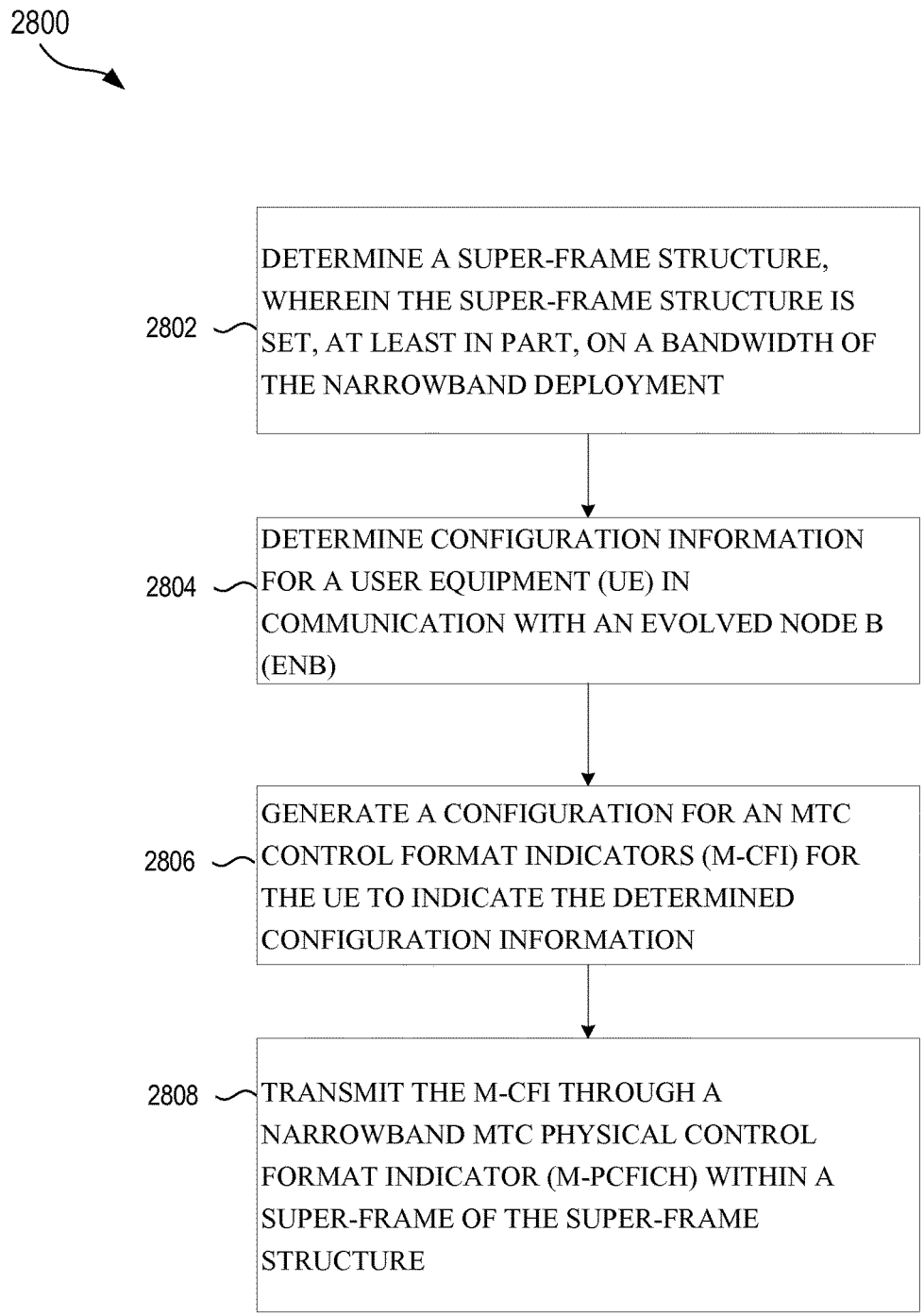
FIG. 28 illustrates a method according to certain embodiments.

FIG. 28 describes another method 2800. In operation 2802, a super frame structure is determined, with the super-frame structure set, at least in part, based on a bandwidth of the narrowband deployment. This setting may be an adjustable setting controlled by system values or targets as described above. In other embodiments, this may be set as a fixed structure of the system based on system hardware. Configuration information for a UE is then determined in communication with an ENB in operation 2804. A configuration for an M-CFI for the UE is generated to indicate the determined configuration information in operation 2806, and in operation 2808, the M-CFI is transmitted through an M-PCFICH within a super-frame of the super-frame structure.

In these methods and any methods described herein, operations may be performed in various orders or may include intervening steps in accordance with various embodiments.

An additional embodiment may be an apparatus of an evolved nodeB (eNB) for machine-type communications (MTC) with narrowband deployment comprising. This apparatus may be, for example, an integrated circuit, a board assembly with integrated circuits, a system on a chip, or any other such apparatus. Such an apparatus embodiment includes control circuitry configured to determine a super-frame structure, wherein the super-frame structure is set, at least in part, on a bandwidth of the narrowband deployment; determine configuration information for a user equipment (UE) in communication with the eNB; and generate a configuration for an MTC control format indicator (M-CFI) for the UE to indicate the determined configuration information; and transmit circuitry configured transmit the M-CFI through a narrowband MTC Physical Control Format Indicator Channel (M-PCFICH) within a super-frame of the super-frame structure.

Additional embodiments may operate where the M-CFI indicates resource information for an MTC Physical Downlink Control Channel (M-PDCCH) or MTC Physical Downlink Shared Channel (M-PDSCH) transmission.

Additional embodiments may operate where the M-PDCCH comprises a number of symbol, slot, subframes, subcarrier, and physical resource blocks (PRB) for the M-PDCCH.

Additional embodiments may operate further comprising MTC physical broadcast channel (M-PBCH) circuitry comprising: block code circuitry configured to generate a codeword; scrambling circuitry coupled to the block code circuitry and configured to scramble the codeword; and modulation circuitry configured to generate a plurality of symbols from the scrambled codeword.

Additional embodiments may operate where the M-PCFICH is determined from a plurality of symbols by an M-PCFICH mapping of resource elements associated with the symbols onto one or more subframes of the superframe structure.

Additional embodiments may operate where the scrambling circuitry is configured to scramble the codeword using a scrambling sequence based on a function of a super-frame number associated with the super-frame.

Additional embodiments may operate where an MTC resource element group (M-REG) is defined for transmission of the M-PCFICH, wherein a plurality of resource elements (REs) are mapped to the M-REG where the M-REG is not used for reference signals.

Additional embodiments may operate where the plurality of REs are mapped based at least in part on a first subcarrier and an orthogonal frequency division multiplexing symbol associated with the M-REG.

Additional embodiments may operate where the M-REGs are allocated over one or more partial subframes of the super-frame Additional embodiments may operate where the M-REGs are allocated over one or more contiguous or non-contiguous full subframes of the super-frame.

Additional embodiments may operate where the eNB further comprises circuitry to map M-PCFICH symbols on the indicated M-REGs, with the starting position in accordance with a physical cell identity.

Additional embodiments may operate where the eNB is arranged to map the M-PCFICH symbols using $$z^{(p)}(i) = \langle y^{(p)}(4i), y^{(p)}(4i+1), y^{(p)}(4i+2), y^{(p)}(4i+3) \rangle$$

to denote a symbol quadruplet i for an antenna port p for M-PCFICH transmission, where $y^{(p)}(k)$, k=represents an M-PCFICH signal for antenna port p and where p=0, ..., p−1 represents a number of antenna ports for cell-specific reference signals P$\varepsilon$\{1, 2, 4\};

wherein:
$z^{(p)}(0)$ is mapped to the M-REG represented by $k=\bar{k}$;
$z^{(p)}(1)$ is mapped to the M-REG represented by $k=\bar{k}+1$;
$z^{(p)}(2)$ is mapped to the M-REG represented by $k=\bar{k}+(N_{REG}/2)$; and
$z^{(p)}(3)$ is mapped to the M-REG represented by $k=\bar{k}+1+(N_{REG}/2)$; and
wherein:
k is and M-REG index;
$\bar{k}=2\cdot(N_{ID}^{cell} \bmod \lfloor N_{REG}/4 \rfloor)$; and
$N_{REG}$ is a number of M-REGs in one subframe of the superframe.

Additional embodiments may operate where the UE comprises four antenna ports; wherein a cyclic prefix associated with the super-frame is an extended cyclic prefix; and wherein:

$$N_{REG}=38$$

Additional embodiments may operate where the eNB is arranged to map the M-PCFICH symbols using $$z^{(p)}(i)=\langle y^{(p)}(4i),y^{(p)}(4i+1),y^{(p)}(4i+2),y^{(p)}(4i+3)\rangle$$

to denote a symbol quadruplet i for an antenna port p for M-PCFICH transmission, where $y^{(p)}(k)$, $k=0, \ldots, 15$ represents an M-PCFICH signal for antenna port p and where $p=0, \ldots, P-1$ represents a number of antenna ports for cell-specific reference signals $P\varepsilon\{1, 2, 4\}$;
wherein:
$z^{(p)}(0)$ is mapped to the M-REG represented by $k=\bar{k}$;
$z^{(p)}(1)$ is mapped to the M-REG represented by $k=\bar{k}+\lfloor N_{REG}/4 \rfloor$;
$z^{(p)}(2)$ is mapped to the M-REG represented by $k=\bar{k}+(N_{REG}/2)$;
$z^{(p)}(3)$ is mapped to the M-REG represented by $k=\bar{k}+\lfloor 3\cdot N_{REG}/4 \rfloor$;
wherein k is an M-REG index;
$\bar{k}=N_{ID}^{cell} \bmod \lfloor N_{REG}/4 \rfloor$; and
$N_{REG}$ is a number of M-REGs in one subframe of the super-frame.

Additional embodiments may operate where the eNB is arranged to map the M-PCFICH symbols using $$z^{(p)}(i)=\langle y^{(p)}(4i),y^{(p)}(4i+1),y^{(p)}(4i+2),y^{(p)}(4i+3)\rangle$$

to denote a symbol quadruplet i for an antenna port p for M-PCFICH transmission, where $y^{(p)}(k)$, $k=0, \ldots, 15$ represents an M-PCFICH signal for antenna port p and where $p=0, \ldots, P-1$ represents a number of antenna ports for cell-specific reference signals $P\varepsilon\{1, 2, 4\}$;
wherein:
$z^{(p)}(0)$ is mapped to the M-REG represented by $k=\bar{k}$;
$z^{(p)}(1)$ is mapped to the M-REG represented by $k=\bar{k}+1$;
$z^{(p)}(2)$ is mapped to the M-REG represented by $k=\bar{k}+2$;
$z^{(p)}(3)$ is mapped to the M-REG represented by $k=\bar{k}+3$;
wherein k is an M-REG index;
$\bar{k}=N_{ID}^{cell} \bmod \lfloor N_{REG}/4 \rfloor$; and
$N_{REG}$ is a number of M-REGs in one subframe of the super-frame.

An additional embodiment is method performed by circuitry of an evolved nodeB (eNB) for machine-type communications (MTC) with narrowband deployment comprising: determining a super-frame structure, wherein the super-frame structure is set, at least in part, on a coverage enhancement target; determining configuration information for a user equipment (UE) in communication with the eNB; and generating a configuration for an MTC Control Format Indicator (M-CFI) for the UE to indicate the determined configuration information; and transmitting circuitry configured transmit the M-CFI through a narrowband MTC Physical Control Format Indicator (M-PCFICH) within a super-frame of the super-frame structure.

Another embodiment of such a method operates where an MTC resource element group (M-REG) is defined for transmission of the M-PCFICH, wherein a plurality of resource elements (REs) are mapped to the M-REG where the M-REG is not used for reference signals; and wherein the plurality of REs are mapped based at least in part on a first subcarrier and an orthogonal frequency division multiplexing symbol associated with the M-REG.

Another embodiment of such a method operates where an MTC resource element group (M-REG) is defined for transmission of the M-PCFICH, wherein a plurality of resource elements (REs) are mapped to the M-REG where the M-REG is not used for reference signals; wherein the M-REGs are allocated over one or more contiguous or non-contiguous full subframes of the super-frame; wherein the eNB further comprises circuitry to map M-PCFICH symbols on the indicated M-REGs, with the starting position in accordance with a physical cell identity; wherein the eNB is arranged to map the M-PCFICH symbols using $$z^{(p)}(i)=\langle y^{(p)}(4i),y^{(p)}(4i+1),y^{(p)}(4i+2),y^{(p)}(4i+3)\rangle$$

to denote a symbol quadruplet i for an antenna port p for M-PCFICH transmission, where $y^{(p)}(k)$, $k=0, \ldots, 15$ represents an M-PCFICH signal for antenna port p and where $p=0, \ldots P-1$ represents a number of antenna ports for cell-specific reference signals $P\varepsilon\{1, 2, 4\}$;
wherein:
$z^{(p)}(0)$ is mapped to the M-REG represented by $k=\bar{k}$;
$z^{(p)}(1)$ is mapped to the M-REG represented by $k=\bar{k}+1$;
$z^{(p)}(2)$ is mapped to the M-REG represented by $k=\bar{k}+(N_{REG}/2)$; and
$z^{(p)}(3)$ is mapped to the M-REG represented by $k=\bar{k}+\lfloor 3\cdot N_{REG}/4 \rfloor$; and
wherein:
k is and M-REG index;
$\bar{k}=2\cdot(N_{ID}^{cell} \bmod \lfloor N_{REG}/4 \rfloor)$; and
$N_{REG}$ is a number of M-REGs in one subframe of the superframe.

Another embodiment is a non-transitory computer readable medium comprising instructions that, when executed by one or more processors, configure an evolved nodeB (eNB) for machine-type communications (MTC) with narrowband deployment comprising determining a super-frame structure, wherein the super-frame structure is set, at least in part, on a coverage enhancement target; determining configuration information for a user equipment (UE) in communication with the eNB; generating a configuration for an MTC Control Format Indicator (M-CFI) for the UE to indicate the determined configuration information; and transmitting circuitry configured transmit the M-CFI through a narrowband MTC Physical Control Format Indicator (M-PCFICH) within a super-frame of the super-frame structure; wherein the M-CFI indicates resource information for an MTC Physical Downlink Control Channel (M-PDCCH) or MTC Physical Downlink Shared Channel (M-PDSCH) transmission.

Additional embodiments may operate where an MTC resource element group (M-REG) is defined for transmission of the M-PCFICH, wherein a plurality of resource elements (REs) are mapped to the M-REG where the M-REG is not used for reference signals; and wherein the M-REGs are allocated over one or more partial subframes of the super-frame.

Additional embodiments may operate where the instructions further configure MTC physical broadcast channel (M-PBCH) circuitry to generate a codeword, scramble the codeword, and generate a plurality of symbols from the codeword; wherein the M-CFI indicates resource information for an MTC Physical Downlink Control Channel (M-PDCCH) or MTC Physical Downlink Shared Channel (M-PDSCH) transmission.

Another embodiment may be apparatus of a user equipment (UE) for machine-type communications (MTC) with narrowband deployment comprising receive circuitry configured to receive a MTC control format indicator (M-CFI) through a narrowband MTC physical control format indicator channel (M-PCFICH) from an enhanced node B (eNB) within a super-frame of the super-frame structure; control circuitry configured to: detect configuration information associated with the super-frame structure based on the M-CFI, wherein the detected super frame structure is based, at least in part, on a coverage enhancement target.

Additional embodiments may operate where the coverage enhancement target comprises a link budget improvement associated with a periodicity of the super-frame structure.

Additional embodiments may operate with the apparatus further comprising transmit circuitry configured to transmit hybrid automatic repeat request (HARQ) data using an MTC Physical HARQ Indicator Channel (M-PHICH); wherein the receive circuitry is further configured to receive downlink data from the eNB; and wherein the control circuitry is further configured to generate HARQ data based on the received downlink data and assign resources associated with an M-PHICH based on a physical cell identity An additional first set of additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 may include an eNB)/UE operable for MTC within a narrow system bandwidth, with the eNB having computer circuitry comprising: a super-frame structure wherein DL and UL physical channels are multiplexed in a TDM) manner; a super-frame structure wherein DL and UL physical channels are multiplexed in a FDM manner; and a predefined HARQ procedure.

Example 2 may include the computer circuitry of example 1, wherein the eNB is configured to transmit at least one of the physical channels in the downlink: M-SCH, M-PBCH, MTC control channel, M-PDSCH, M-PMCH, wherein the eNB is configured to receive at least one of the physical channels in the uplink: M-PUSCH, M-PRACH, M-PUCCH.

Example 3 may include the computer circuitry of example 1, wherein the super-frame configuration including the starting subframe and periodicity is predetermined, wherein the super-frame configuration includes starting subframe and periodicity being configured by the higher layers.

Example 4 may include the computer circuitry of example 1, wherein the MTC control channel and M-PDSCH are transmitted in one DL super-frame; wherein the M-SCH, M-PBCH, MTC control channel, and M-PDSCH are transmitted in one DL super-frame.

Example 5 may include the computer circuitry of example 4, wherein in the DL super-frame, M-PBCH follows M-SCH transmission in time, wherein M-PDSCH follows MTC control channel transmission in time.

Example 6 may include the computer circuitry of example 4, wherein in the UL super-frame, M-PUCCH and M-PUSCH are transmitted after M-PRACH.

Example 7 may include the computer circuitry of example 6, wherein M-PRACH and M-PUCCH transmission configuration is predefined or wherein M-PRACH and M-PUCCH transmission configuration is configured by the eNB.

Example 8 may include the computer circuitry of example 1, wherein MTC region is defined.

Example 9 may include the computer circuitry of example 8, wherein the starting OFDM symbols of MTC region in each subframe is predetermined or wherein the starting OFDM symbols of MTC region in each subframe is configured by the higher layers.

Example 10 may include the computer circuitry of example 1, wherein subframe offsets between DL and UL super-frame are configured.

Example 11 may include the computer circuitry of example 2, wherein M-PHICH is supported in the MTC control channel, or wherein M-PHICH is not supported in the MTC control channel.

Example 12 may include the computer circuitry of example 2, wherein M-PCFICH is supported in the MTC control channel, or wherein M-PCFICH is not supported in the MTC control channel.

Example 13 may include the computer circuitry of example 2, wherein M-PCFICH and M-PHICH are supported in the MTC control channel, wherein M-PCFICH is located in the first $K_0$ subframes of the control region while M-PHICH is allocated in the last $K_1$ subframes of the control region, and wherein M-PDCCH is allocated in the resource elements which are not assigned for M-PCFICH and M-PHICH in the control region.

Example 14 may include the computer circuitry of example 2, wherein M-PCFICH and M-PHICH are supported in the MTC control channel, wherein M-PCFICH is located in the first $M_0$ subframes of the control region while M-PHICH is located in the $M_1$ subframes of the data region, wherein M-PDCCH and M-PDSCH are allocated in the resource elements which are not assigned for M-PCFICH in the control region and M-PHICH in the data region, respectively.

Example 15 may include the computer circuitry of example 1, wherein the delay between data transmission and ACK/NACK feedback is one super-frame; and wherein the delay between ACK/NACK feedback and data retransmission is one super-frame.

Example 16 may include the computer circuitry of example 1, wherein the delay between data transmission and ACK/NACK feedback is two super-frames; and wherein the delay between ACK/NACK feedback and data retransmission is two super-frames.

Example 17 may include the computer circuitry of example 1, wherein the delay between the transmission of M-PDSCH and M-PUCCH transmission is three super-frames; and wherein the delay between the transmission of M-PUCCH and M-PDSCH retransmission is one super-frame.

Example 18 may include the computer circuitry of example 1, wherein the delay between the transmission of M-PUSCH and M-PHICH transmission is one super-frame; and wherein the delay between the transmission of M-PHICH and M-PUSCH retransmission is three super-frames.

Example 19 may include the computer circuitry of example 1, wherein multiple HARQ processes are configured in one super-frame, wherein multiple M-PDCCHs schedule multiple M-PDSCHs and/or M-PUSCHs in one super-frame.

Example 20 may include an eNB adapted for MTC within narrow system bandwidth, the eNB comprising: control circuitry to multiplex a plurality of downlink physical channels for downlink transmission to a UE and to process a plurality of multiplexed uplink physical channels received from the UE; transmit circuitry, coupled with the control circuitry, to transmit a DL super-frame to the UE that includes the multiplexed plurality of DL physical channels, the DL super-frame comprising a plurality of DL subframes; and receive circuitry, coupled with the control circuitry, to receive an UL super-frame that includes the plurality of multiplexed UL physical channels from the UE, the UL super-frame comprising a plurality of uplink subframes.

Example 21 may include the eNB of example 20, wherein the control circuitry is to multiplex the plurality of downlink physical channels according to time-division multiplexing ("TDM") or frequency-division multiplexing ("FDM").

Example 22 may include the eNB of example 20, wherein the receive circuitry is further to receive, in an UL super-frame from the UE, a HARQ ACK or NACK message associated with the DL super-frame, further wherein control circuitry is to cause the transmit circuitry to re-transmit the multiplexed plurality of DL physical channels in another DL super-frame if the receive circuitry receives the HARQ NACK.

Example 23 may include the eNB of any of examples 20-22, wherein the respective starting subframes of the UL and DL super-frames are predetermined.

Example 24 may include the eNB of any of examples 20-22, wherein a first periodicity associated with DL transmission of the plurality of multiplexed DL physical channels and a second periodicity associated with UL reception of the plurality of multiplexed UL physical channels are predetermined.

Example 25 may include the eNB of any of examples 20-22, wherein the plurality of downlink physical channels includes at least one of an M-SCH, an M-PBCH, an MTC control channel, an M-PDSCH, or an M-PMCH and the plurality of multiplexed UL physical channels received from the UE includes at least one of an M-PUSCH, an M-PRACH, or an M-PUCCH.

Example 26 may include the eNB of example 25, wherein the MTC control channel includes an M-PCFICH and an M-PHICH, and further wherein the control circuitry is to allocate at least one subframe of the DL super-frame to the M-PCFICH and at least one other subframe of the DL super-frame to the M-PHICH.

Example 27 may include the eNB of example 26, wherein the transmit circuitry is to transmit the at least one subframe allocated to the M-PCFICH and the at least one other subframe allocated to the M-PHICH in a control region of the DL super-frame.

Example 28 may include the eNB of example 26, wherein the transmit circuitry is to transmit the at least one subframe allocated to the M-PCFICH in a control region of the DL super-frame and the at least one other subframe allocated to the M-PHICH in a data region of the DL super-frame.

Example 29 may include a method comprising: multiplexing, by an eNB, a plurality of downlink physical channels for MTC within narrow system bandwidth; transmitting, to a UE, a DL super-frame that includes the multiplexed plurality of DL physical channels, the DL super-frame comprising a plurality of DL subframes; and receiving, from the UE, at least one HARQ ACK message or at least one HARQ NACK message based on the transmitting of the DL super-frame.

Example 30 may include the method of example 29, wherein the at least one HARQ ACK message or at least one HARQ NACK message is received in an UL super-frame according to a predetermined schedule for HARQ message transmission, the UL super-frame comprised of a plurality of UL subframes.

Example 31 may include the method of example 29, further comprising: retransmitting, according to a predetermined schedule for retransmission, the multiplexed plurality of DL physical channels in a DL super-frame based on the receiving of the HARQ NACK message.

Example 32 may include the method of example 29, further comprising: transmitting, to the UE, a predetermined starting subframe and a predetermined number of subframes to be used by the UE for the UL super-frame.

Example 33 may include the method of example 32, wherein the predetermined starting subframe and the predetermined number of subframes are transmitted to the UE in a MIB or a SIB.

Example 34 may include the method of any of examples 29-32, wherein the plurality of DL physical channels includes at least one of an M-SCH, an M-PBCH, an MTC control channel, an M-PDSCH, or an M-PMCH.

Example 35 may include the method of example 34, wherein the MTC control channel includes an M-PCFICH and an M-PHICH, and the method further comprising: allocating at least one subframe of the DL super-frame to the M-PCFICH; and allocating at least one other subframe of the DL super-frame to the M-PHICH.

Example 36 may include the method of example 35, wherein the at least one subframe allocated to the M-PCFICH and the at least one other subframe allocated to the M-PHICH are associated with a control region of the DL super-frame.

Example 37 may include the method of example 35, wherein the at least one subframe allocated to the M-PCFICH is associated with a control region of the DL super-frame and the at least one other subframe allocated to the M-PHICH is associated with a data region of the DL super-frame.

Example 38 may include the method of any of examples 29-32, further comprising: receiving, from the UE, a UL super-frame that includes the plurality of multiplexed UL physical channels, the UL super-frame comprising a plurality of UL subframes and the plurality of multiplexed UL physical channels including at least one of an M-PUSCH, an M-PRACH, or M-PUCCH; and transmitting, to the UE according to a predetermined schedule for HARQ message transmission, a DL subframe that includes at least one HARQ ACK message or at least one HARQ NACK message based on the receiving of the UL super-frame.

Example 39 may include a UE adapted for MTC within narrow system bandwidth, the UE comprising: control circuitry to multiplex a plurality of UL physical channels for UL transmission to an eNB and to process a plurality of multiplexed DL physical channels received from the eNB; transmit circuitry, coupled with the control circuitry, to transmit a UL super-frame to the eNB that includes the multiplexed plurality of UL physical channels, the UL super-frame comprising a plurality of UL subframes; and receive circuitry, coupled with the control circuitry, to receive a DL super-frame that includes the plurality of multiplexed DL physical channels from the eNB, the DL super-frame comprising a plurality of DL subframes.

Example 40 may include the UE of example 39, wherein the control circuitry is to multiplex the plurality of DL physical channels according to TDM or FDM.

Example 41 may include the UE of example 39, wherein the transmit circuitry is further to transmit, in an UL super-frame, a HARQ ACK or NACK message based on the reception of the DL super-frame.

Example 42 may include the UE of any of examples 39-41, wherein a starting subframe and a periodicity associated with UL transmission of the UL super-frame are predetermined.

Example 43 may include the UE of any of examples 39-41, wherein the receive circuitry is further to receive, from the eNB, a starting subframe and a periodicity associated with UL transmission of the UL super-frame in a MIB or a SIB.

Example 44 may include the UE of any of examples 39-41, wherein the plurality of DL physical channels includes at least one of an M-SCH, an M-PBCH, an MTC control channel, an M-PDSCH, or an M-PMCH and the plurality of multiplexed UL physical channels received from the UE includes at least one of an M-PUSCH, an M-PRACH, or an M-PUCCH.

Example 45 may include the UE of example 44, wherein the MTC control channel includes an M-PCFICH and an M-PHICH.

Example 46 may include the UE of example 45, wherein the receive circuitry is to receive at least one subframe allocated to the M-PCFICH and at least one other subframe allocated to the M-PHICH in a control region of the DL super-frame.

Example 47 may include the UE of example 45, wherein the receive circuitry is to receive at least one subframe allocated to the M-PCFICH in a control region of the DL super-frame and at least one other subframe allocated to the M-PHICH in a data region of the DL super-frame.

Example 48 may include a method comprising: multiplexing, by an UE, a plurality of UL physical channels for MTC within narrow system bandwidth; transmitting, to an eNB, an UL super-frame that includes the multiplexed plurality of UL physical channels, the UL super-frame comprising a plurality of UL subframes; and receiving, from the eNB, at least one HARQ ACK message or at least one HARQ NACK message based on the transmitting of the UL super-frame.

Example 49 may include the method of example 48, wherein the at least one HARQ ACK message or the at least one HARQ NACK message is received in a DL super-frame according to a predetermined schedule for HARQ message reception, the DL super-frame comprised of a plurality of DL subframes.

Example 50 may include the method of example 48, further comprising: retransmitting, based on a predetermined schedule for retransmission, the multiplexed plurality of UL physical channels in a UL super-frame based on the receiving of the HARQ NACK message.

Example 51 may include the method of example 48, further comprising: receiving, from the eNB, a predetermined starting subframe and a predetermined number of subframes associated with the UL super-frame.

Example 52 may include the method of example 51, wherein the predetermined starting subframe and the predetermined number of subframes are received in a MIB or a SIB.

Example 53 may include the method of any of examples 48-51, wherein the plurality of uplink physical channels includes at least one of an M-PUSCH, an M-PRACH, or an M-PUCCH.

Example 54 may include the method of any of examples 48-51, further comprising: receiving, from the eNB, a DL super-frame that includes the plurality of multiplexed DL physical channels, the DL super-frame comprising a plurality of DL subframes and the plurality of multiplexed DL physical channels including at least one of an M-SCH, an M-PBCH, an MTC control channel, an M-PDSCH, or an M-PMCH; and transmitting, to the eNB, a UL subframe that includes at least one HARQ ACK message or at least one HARQ NACK message based on the receiving of the UL super-frame based on a predetermined schedule for HARQ message transmission.

Example 55 may include the method of example 54, wherein the MTC control channel includes an M-PCFICH and an M-PHICH, and further wherein the M-PCFICH is received in control region of the DL super-frame and the M-PHICH is received in the control region or the data region of the DL super-frame.

Example 56 may include one or more non-transitory computer-readable media comprising instructions configured to cause a UE, upon execution by one or more processors of the UE, to perform the method of any of examples 48-55.

Example 57 may include an apparatus comprising means to perform the method of any of examples 48-55.

Example 58 may include one or more non-transitory computer-readable media comprising instructions configured to cause an eNB, upon execution by one or more processors of the eNB, to perform the method of any of examples 29-38.

Example 59 may include an apparatus comprising means to perform the method of any of examples 29-38.

A second set of additional examples of the presently described method, system, and device embodiments include the following, non-limiting configurations. Each of the following non-limiting examples can stand on its own, or can be combined in any permutation or combination with any one or more of the other examples provided below or throughout the present disclosure. References to examples below refer to the particular examples of the second set of example embodiments.

Example 1 may include an eNB operable to transmit PCFICH for MTC within narrow system bandwidth, the eNB having computer circuitry configured to determine a configuration for M-CFI for transmission on indicated resources for receipt by a receiving UE.

Example 2 may include the computer circuitry of example 1, wherein the M-CFI indicates the resource information for M-PDCCH and/or M-PDSCH transmission.

Example 3 may include the computer circuitry of example 2, wherein this information contains the number of time and frequency units in the form of symbol, slot, subframes, subcarrier and PRB for M-PDCCH and/or M-PDSCH transmission.

Example 4 may include the computer circuitry of example 2, wherein this information contains the time and frequency locations for M-PDCCH and/or M-PDSCH transmission.

Example 5 may include the computer circuitry of example 2, wherein this information contains a set of time and frequency locations for M-PDCCH and/or M-PDSCH transmission.

Example 6 may include the computer circuitry of example 1, further arranged to apply channel coding on the M-CFI content.

Example 7 may include the computer circuitry of example 1, wherein after channel coding, the eNB is configured to perform bit scrambling on the coded bits in accordance with a scrambling sequence based on a function of at least one of: a physical cell ID, a slot number, a subframe number, or a super-frame number.

Example 8 may include the computer circuitry of example 1, wherein after bit scrambling, the eNB is further arranged to perform QPSK modulation, layer mapping, and precoding for transmission of the M-PCFICH.

Example 9 may include the computer circuitry of example 1, wherein the M-REG is defined for transmission of the M-PCFICH, wherein four REs are mapped to the M-REG not used for reference signals (e.g., CRS or other MTC related reference signals if applicable) in the increasing order of first subcarrier and then OFDM symbol.

Example 10 may include the computer circuitry of example 9, wherein the M-REGs are allocated over one or a plurality of contiguous or non-contiguous full subframes.

Example 11 may include the computer circuitry of example 9, wherein the M-REGs are allocated over one or a plurality of contiguous or non-contiguous partial subframes; wherein OFDM symbol 3 and 10 are not included in the case of normal CP.

Example 12 may include the computer circuitry of example 10, wherein the eNB is further arranged to map the M-PCFICH symbols on the indicated M-REGs, with the starting position in accordance with the physical cell identity; wherein the eNB is arranged to map the M-PCFICH symbols based on the resource mapping option 1, 2, or 3.

Example 13 may include the computer circuitry of example 11, wherein the eNB is further arranged to map the M-PCFICH symbols on the indicated M-REGs, with the starting position in accordance with the physical cell identity; wherein the eNB is arranged to map the M-PCFICH symbols based on the resource mapping option 1 or 2.

Example 14 may include an eNB adapted for MTC within narrow system bandwidth, the eNB comprising: control circuitry to determine configuration information for a UE and to generate an M-CFI to indicate the determined configuration information; and transmit circuitry, coupled with the control circuitry, to transmit the M-CFI in an M-PCFICH transmission to the UE.

Example 15 may include the eNB of example 14, wherein the narrow system bandwidth is 200 kilohertz (kHz).

Example 16 may include the eNB of example 14, wherein at least a part of the configuration information is signaled from Media Access Control (MAC) layer circuitry.

Example 17 may include the eNB of example 14, wherein at least a part of the configuration information is predetermined.

Example 18 may include the eNB of any of examples 14-17, wherein the configuration information is associated with at least one of an M-PDCCH or an M-PDSCH.

Example 19 may include the eNB of example 18, wherein the configuration information includes at least one of a number of symbols, a number of slots, a number of subframes, a number of subcarriers, or a number of PRBs to be used for a transmission that is transmitted by the transmitter circuitry in at least one of the M-PDCCH or the M-PDSCH.

Example 20 may include the eNB of example 18, wherein the configuration information indicates at least one of a time location or a frequency location to be used for a transmission by the transmitter circuitry in at least one of the M-PDCCH or the M-PDSCH.

Example 21 may include the eNB of any of examples 14-17, wherein the configuration information is associated with an M-PHICH.

Example 22 may include the eNB of any of examples 14-17, wherein the control circuitry is further to perform scrambling associated with the M-CFI based on at least one of a physical cell ID, a slot number, a subframe number, or a super-frame number, wherein the super-frame is to include a plurality of subframes.

Example 23 may include the eNB of any of examples 14-17, wherein the control circuitry is to map four resource elements associated with the M-PCFICH to an M-REG.

Example 24 may include the eNB of example 23, wherein the control circuitry is to map four resource elements associated with the M-PCFICH to an M-REG based on a physical cell ID.

Example 25 may include the eNB of example 23, wherein the control circuitry is to perform resource element hopping associated at least with the four resource elements mapped to the M-REG between a plurality of sub-regions of a single slot, the single slot to include the plurality of sub-regions.

Example 26 may include the eNB of any of examples 14-17, further comprising: receiving circuitry, coupled with the control circuitry, to receive data from the UE based on the configuration information.

Example 27 may include a method comprising: determining, by an eNB, configuration information associated with MTC within narrow system bandwidth; generating, by the eNB and based on the determined configuration information, an M-CFI to indicate the determined configuration information to a UE; and transmitting, by the eNB, the M-CFI in an M-PCFICH transmission to the UE.

Example 28 may include the method of example 27, wherein the configuration information is associated with at least one of an M-PDCCH or an M-PDSCH.

Example 29 may include the method of example 27, wherein the configuration information includes at least one of a number of symbols, a number of slots, a number of subframes, or a number of PRBs to be used for transmission through at least one of the M-PDCCH or the M-PDSCH.

Example 30 may include the method of example 28, wherein the configuration information indicates at least one of a time location or a frequency location to be used for a transmission in at least one of the M-PDCCH or the M-PDSCH.

Example 31 may include the method of any of examples 27-29, wherein the configuration information is associated with an M-PHICH".

Example 32 may include the method of any of examples 27-30, the method further comprising: performing, by the eNB, scrambling associated with the M-CFI based on at least one of a physical cell ID, a slot number, a subframe number, or a super-frame number, wherein the super-frame is to include a plurality of subframes.

Example 33 may include the method of any of examples 27-30, the method further comprising: mapping, by the eNB, four resource elements associated with the M-PCFICH to an M-REG.

Example 34 may include the method of example 33, wherein the mapping of the four resource elements associated with the M-PCFICH to an M-REG is based on a physical cell ID.

Example 35 may include the method of example 33, the method further comprising: performing, by the eNB, resource element hopping associated at least with the four resource elements mapped to the M-REG between a plurality of sub-regions of a single slot, the single slot to include the plurality of sub-regions.

Example 36 may include UE adapted for MTC within narrow system bandwidth, the UE comprising: receiving circuitry to receive, from an eNB, an M-CFI in an M-PCFICH transmission; and control circuitry, coupled with the receive circuitry, to detect configuration information for wireless communication within the narrow system bandwidth based on the received M-CFI.

Example 37 may include the UE of example 36, wherein the narrow system bandwidth is 200 kHz.

Example 38 may include the UE of example 36, wherein the configuration information is associated with at least one of an M-PDCCH or an M-PDSCH.

Example 39 may include the UE of example 38, wherein the configuration information includes at least one of a number of symbols, a number of slots, a number of subframes, or a number of PRBs to be used for a transmission in at least one of the M-PDCCH or the M-PDSCH.

Example 40 may include the UE of example 38, wherein the configuration information includes at least one of a time location or a frequency location to be used for transmission in at least one of the M-PDCCH or the M-PDSCH.

Example 41 may include the UE of any of examples 36-40, wherein the configuration information is associated with an M-PHICH.

Example 42 may include the UE of example 36, further comprising: transmit circuitry, coupled with the control circuitry, to transmit data to the eNB within the narrow system bandwidth.

Example 43 may include a method, the method comprising: receiving, by a UE from an eNB, an M-CFI in an M-PCFICH transmission; detecting, by the UE, configuration information based on the received M-CFI; and transmitting, by the UE, data to the eNB based on the detected configuration information for MTC within narrow system bandwidth.

Example 44 may include the method of example 43, wherein the narrow system bandwidth is 200 kHz.

Example 45 may include the method of example 43, wherein the configuration information is associated with at least one of an M-PDCCH or an M-PDSCH.

Example 46 may include the method of example 45, wherein the configuration information includes at least one of a number of symbols, a number of slots, a number of subframes, or a number of PRBs to be used for transmission in at least one of the M-PDCCH or the M-PDSCH.

Example 47 may include the method of example 45, wherein the configuration information includes at least one of a time location or a frequency location to be used for transmission in at least one of the M-PDCCH or the M-PDSCH.

Example 48 may include the method of any of examples 43-45, wherein the configuration information is associated with an M-PHICH.

Example 49 may include an apparatus comprising means to perform the method of any of examples 27-35.

Example 50 may include one or more non-transitory computer readable media comprising instructions configured to cause an eNB, upon execution of the instructions by one or more processors of the eNB, to perform the method of any of examples 27-35.

Example 51 may include an apparatus comprising means to perform the method of any of examples 43-48.

Example 52 may include one or more non-transitory computer readable media comprising instructions configured to cause a UE, upon execution of the instructions by one or more processors of the UE, to perform the method of any of examples 43-48.

A third set of additional examples of the presently described method, system, and device embodiments include the following, non-limiting configurations. Each of the following non-limiting examples can stand on its own, or can be combined in any permutation or combination with any one or more of the other examples provided below or throughout the present disclosure.

References to examples below refer to the particular examples of the third set of example embodiments.

Example 1 may include an eNB operable to transmit PHICH for MTC within narrow system bandwidth, the eNB having computer circuitry configured to determine a configuration for ACK/NACK for transmission on indicated resources for receipt by a receiving UE.

Example 2 may include the computer circuitry of example 1, wherein the configuration for M-PHICH transmission can be predefined or configured by the higher layers.

Example 3 may include the computer circuitry of example 2, wherein the configuration information can be broadcast in the M-MIB conveyed in the M-PBCH or broadcast in M-SIB.

Example 4 may include the computer circuitry of example 2, wherein the configuration information can be can be predefined or configured in accordance with super-frame duration.

Example 5 may include the computer circuitry of example 1, further arranged to apply channel coding on the ACK/NACK.

Example 6 may include the computer circuitry of example 1, wherein after channel coding, the eNB is configured to perform bit scrambling on the coded bits in accordance with a scrambling sequence based on a function of at least one of: a physical cell ID, a slot number, a subframe number, or a super-frame number.

Example 7 may include the computer circuitry of example 1, wherein after bit scrambling, the eNB is further arranged to perform BPSK modulation, resource group alignment, layer mapping, and precoding for transmission of the M-PHICH.

Example 8 may include the computer circuitry of example 1, wherein the eNB is further arranged to map the PHICH symbols in the last K0 subframes of the control region, with the starting position in accordance with the physical cell identity, wherein K¬0 is predefined or configured by the higher layers.

Example 9 may include the computer circuitry of example 8, wherein the three symbol quadruplets in one M-PHICH group are separated by approximately one-third of the K0 subframes.

Example 10 may include the computer circuitry of example 8, wherein the three symbol quadruplets in one M-PHICH group are allocated in the contiguous M-REGs.

Example 11 may include the computer circuitry of example 1, wherein the eNB is further arranged to map the PHICH symbols in the K1 subframes of the data region, with the starting position in accordance with the physical cell identity, wherein K1 is predefined or configured by the higher layers.

Example 12 may include the computer circuitry of example 11, wherein the three symbol quadruplets in one M-PHICH group are separated by approximately one-third of the K1 subframes.

Example 13 may include the computer circuitry of example 11, wherein the three symbol quadruplets in one M-PHICH group are allocated in the contiguous M-REGs.

Example 14 may include the computer circuitry of example 11, wherein the M-PHICH symbols are allocated in the resource elements near the RS (e.g., CRS or dedicated M-RS), wherein M-PHICH can be equally distributed or allocated in the contiguous M-REGs.

Example 15 may include the computer circuitry of example 1, wherein the eNB is further arranged to map the PHICH symbols in the K2 subframes within a super-frame, with the starting position in accordance with the physical cell identity.

Example 16 may include the computer circuitry of example 15, wherein the three symbol quadruplets in one M-PHICH group are separated by approximately one-third of the K2 subframes.

Example 17 may include the computer circuitry of example 15, wherein the three symbol quadruplets in one M-PHICH group are allocated in the contiguous M-REGs.

Example 18 may include the computer circuitry of example 1, wherein for M-PUSCH transmissions scheduled from serving cell in super-frame n, a UE shall determine the corresponding M-PHICH resource of serving cell in super-frame.

Example 19 may include the computer circuitry of example 18, wherein the M-PHICH resource index is derived in accordance with the resource index of the corresponding M-PUSCH transmission, wherein the resource index of the corresponding M-PUSCH transmission is defined as a function of either time or frequency locations, (e.g., symbol, slot, subframes, subcarrier, PRB, etc.), or a function of any combinations of these parameters.

Example 20 may include an apparatus to be included in an eNB adapted for MTC within narrow system bandwidth, the apparatus comprising: control circuitry to assign resources associated with an PHICH based on a physical cell identity; and transmit circuitry, coupled with the control circuitry, to transmit HARQ ACK/NACK using the M-PHICH.

Example 21 may include the apparatus of example 20, wherein the control circuitry is further to generate at least one of a MIB or a SIB associated with MTC that is to include information associated with the configuration of HARQ ACK/NACK transmission using the M-PHICH and further wherein the transmit circuitry is to transmit the at least one of the MIB or the SIB to a UE.

Example 22 may include the apparatus of example 20, wherein the control circuitry is to assign a plurality of MTC PHICHs to a same group of REs, wherein a number of groups of MTC PHICHs is based on a duration of a super frame.

Example 23 may include the apparatus of example 22, wherein a super frame comprises a plurality of subframes.

Example 24 may include the apparatus of any of examples 20-23, wherein the control circuitry is to include the MTC PHICH in a control region of a super frame or in a data region of the super frame.

Example 25 may include the apparatus of any of examples 20-23, wherein the control circuitry is to map resources associated with the MTC PHICH in contiguous REGs associated with MTC.

Example 26 may include the apparatus of any of examples 20-23, wherein the control circuitry is to apply channel coding to the HARQ ACK/NACK to generate a scrambling sequence based on at least one of the physical cell identity, a slot number, a subframe number, or a super frame number, and to perform bit scrambling on the channel-coded HARQ ACK/NACK using the generated scrambling sequence.

Example 27 may include a method to be performed by an eNB adapted for MTC within narrow system bandwidth, the method comprising: receiving UL data from a UE; generating HARQ ACK/NACK based on the receiving of the UL data; assigning resources associated with an MTC PHICH based on a physical cell identity; and transmitting the HARQ ACK/NACK using the MTC PHICH.

Example 28 may include the method of example 27, further comprising: generating at least one of a MIB or a SSIB associated with MTC that is to include information associated with the configuration of HARQ ACK/NACK transmission using the MTC PHICH; and transmitting the at least one of the MIB or the SIB to the UE.

Example 29 may include the method of example 27, further comprising: assigning a plurality of MTC PHICHs to a same group of resource elements, wherein a number of groups of MTC PHICHs is based on a duration of a super frame.

Example 30 may include the method of example 29, wherein a super frame comprises a plurality of subframes.

Example 31 may include the method of any of examples 27-30, wherein the MTC PHICH is included in a control region of a super frame or in a data region of the super frame.

Example 32 may include the method of any of examples 27-30, further comprising: mapping resources associated with the MTC PHICH in contiguous REGs associated with MTC.

Example 33 may include the method of any of examples 27-30, further comprising: applying channel coding to the HARQ data; generating a scrambling sequence based on at least one of the physical cell identity, a slot number, a subframe number, or a super frame number; and performing bit scrambling on the channel-coded HARQ ACK/NACK using the generated scrambling sequence.

Example 34 may include an apparatus to be included in a UE adapted for MTC within narrow system bandwidth, the apparatus comprising: receive circuitry to receive downlink data from an eNB; control circuitry, coupled with the receive circuitry, to generate HARQ ACK/NACK based on the received downlink data, to assign resources associated with an MTC PHICH based on a physical cell identity; and transmit circuitry, coupled with the control circuitry, to transmit the HARQ ACK/NACK using the MTC PHICH.

Example 35 may include the apparatus of example 34, wherein the receive circuitry is further to receive at least one of a MIB or a SIB associated with MTC that is to include information associated with a configuration of HARQ ACK/NACK transmission using the MTC PHICH and further wherein the control circuitry is to assign resources associated with the MTC PHICH based on the received MIB or SIB.

Example 36 may include the apparatus of example 34, wherein the control circuitry is to assign a plurality of MTC PHICHs to a same group of resources, wherein a number of groups of MTC PHICHs is based on a duration of a super frame.

Example 37 may include the apparatus of example 36, wherein a super frame comprises a plurality of subframes.

Example 38 may include the apparatus of any of examples 34-37, wherein the control circuitry is to map resources associated with the MTC PHICH in contiguous REGs associated with MTC.

Example 39 may include the apparatus of any of examples 34-37, wherein the control circuitry is to apply channel coding to the HARQ ACK/NACK, to generate a scrambling sequence based on at least one of the physical cell identity, a slot number, a subframe number, or a super frame number, and to perform bit scrambling on the channel-coded HARQ ACK/NACK using the generated scrambling sequence.

Example 40 may include a method to be performed by a UE adapted for MTC within narrow system bandwidth, the method comprising: receiving downlink data from an evolved Node B eNB; HARQ ACK/NACK based on the received downlink data; assigning resources associated with an MTC PHICH based on a physical cell identity; and transmitting the HARQ ACK/NACK using the MTC PHICH.

Example 41 may include the method of example 40, further comprising: receiving at least one of a MIB or a SIB associated with MTC that is to include information associated with a configuration of HARQ ACK/NACK transmission using the MTC PHICH and further wherein the control circuitry is to assign resources associated with the MTC PHICH based on the received MIB or MTC SIB.

Example 42 may include the method of example 40, further comprising: assigning a plurality of MTC PHICHs to a same group of resource elements, wherein a number of groups of MTC PHICHs is based on a duration of a super frame.

Example 43 may include the method of example 42, wherein a super frame comprises a plurality of subframes.

Example 44 may include the method of any of examples 40-43, further comprising: mapping resources associated with the MTC PHICH in contiguous REGs associated with MTC.

Example 45 may include the method of any of examples 40-43, further comprising: applying channel coding to the HARQ ACK/NACK; generating a scrambling sequence based on at least one of the physical cell identity, a slot number, a subframe number, or a super frame number; and performing bit scrambling on the channel-coded HARQ ACK/NACK using the generated scrambling sequence.

Example 46 may include an apparatus comprising means to perform the method of any of examples 40-45.

Example 47 may include one or more non-transitory computer readable media comprising instructions configured to cause a UE, upon execution of the instructions by one or more processors of the UE, to perform the method of any of examples 40-45.

Example 48 may include an apparatus comprising means to perform the method of any of examples 27-33.

Example 49 may include one or more non-transitory computer readable media comprising instructions configured to cause an eNB, upon execution of the instructions by one or more processors of the eNB, to perform the method of any of examples 27-33.

Example 50 may include a method of communicating in a wireless network as shown and described herein.

Example 51 may include a system for providing wireless communication as shown and described herein.

Example 52 may include a device for providing wireless communication as shown and described herein.

The foregoing description of one or more implementations provides illustration and description, but is not intended to be exhaustive or to limit the scope of the embodiments described herein to the precise form disclosed. Modifications and variations are possible in light of the above teachings or may be acquired from practice of various implementations of the present innovations.

Figure 29:
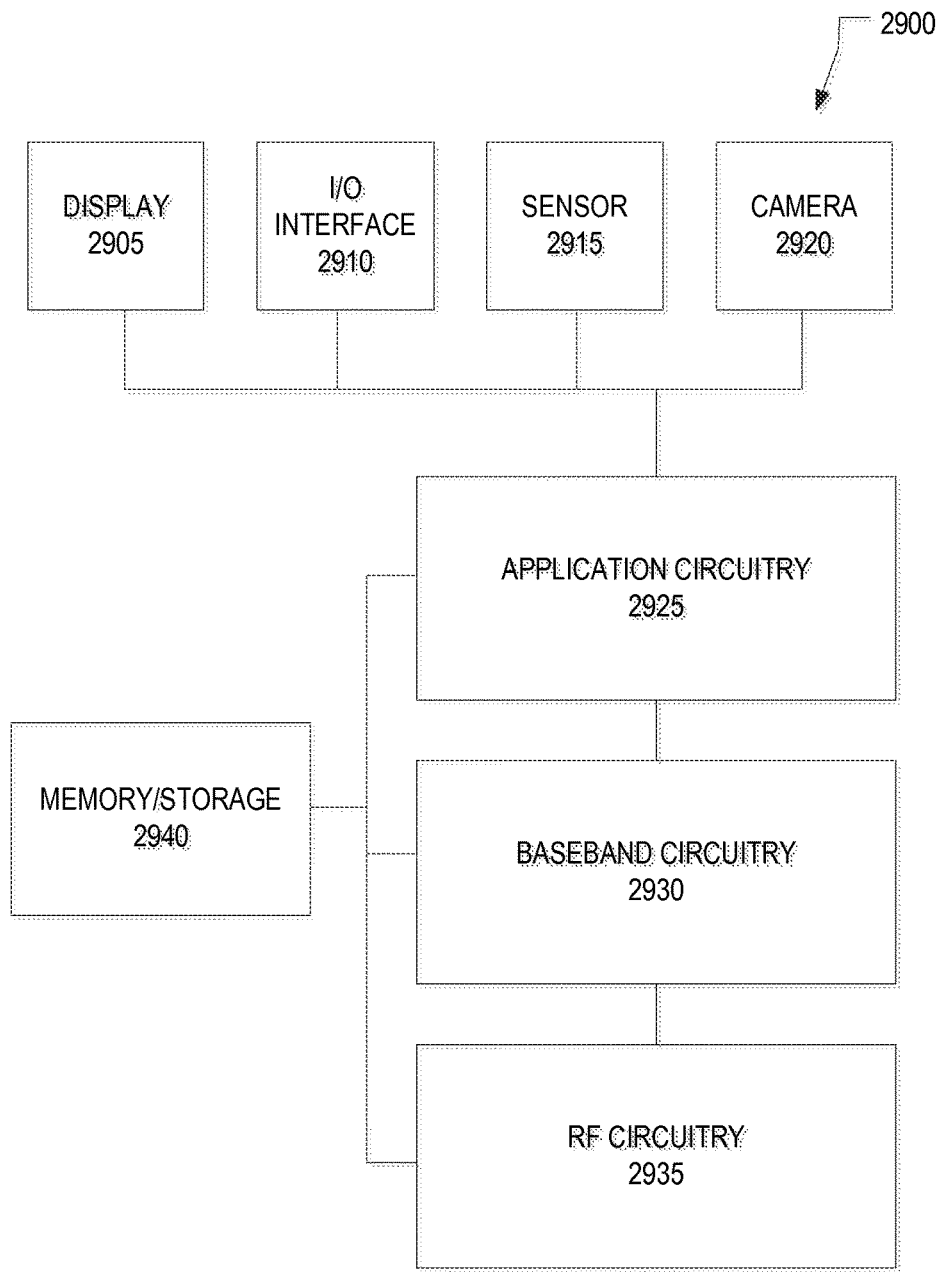
FIG. 29 illustrates aspects of a computing machine, according to some example embodiments.

FIG. 29 then illustrates aspects of computing machine according to some example embodiments. Embodiments described herein may be implemented into a system 2900 using any suitably configured hardware and/or software. FIG. 29 illustrates, for some embodiments, an example system 2900 comprising radio frequency (RF) circuitry 2935, baseband circuitry 2930, application circuitry 2925, memory/storage 2940, display 2905, camera 2930, sensor 2915, and input/output (I/O) interface 2910, coupled with each other at least as shown.

The application circuitry 2925 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 2940 and configured to execute instructions stored in the memory/storage 2940 to enable various applications and/or operating systems running on the system 2900.

The baseband circuitry 2930 may include circuitry such as, but not limited to, one or more single-core or multi-core processors. The processor(s) may include a baseband processor. The baseband circuitry 2930 may handle various radio control functions that enables communication with one or more radio networks via the RF circuitry 2935. The radio control functions may include, but are not limited to, signal modulation, encoding, decoding, radio frequency shifting, and the like. In some embodiments, the baseband circuitry 2930 may provide for communication compatible with one or more radio technologies. For example, in some embodiments, the baseband circuitry 2930 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 2930 is configured to support radio communications of more than one wireless protocol may be referred to as multi-mode baseband circuitry.

In various embodiments, baseband circuitry 2930 may include circuitry to operate with signals that are not strictly considered as being in a baseband frequency. For example, in some embodiments, baseband circuitry 2930 may include circuitry to operate with signals having an intermediate frequency, which is between a baseband frequency and a radio frequency.

RF circuitry 2935 may enable communication with wireless networks using modulated electromagnetic radiation through a non-solid medium. In various embodiments, the RF circuitry 2935 may include switches, filters, amplifiers, and the like to facilitate the communication with the wireless network.

In various embodiments, RF circuitry 2935 may include circuitry to operate with signals that are not strictly considered as being in a radio frequency. For example, in some embodiments, RF circuitry 2935 may include circuitry to operate with signals having an intermediate frequency, which is between a baseband frequency and a radio frequency.

In various embodiments, the transmitter circuitry or receiver circuitry discussed above with respect to the UE or eNB may be embodied in whole or in part in one or more of the RF circuitry 2935, the baseband circuitry 2930, and/or the application circuitry 2925.

In some embodiments, some or all of the constituent components of a baseband processor or as the baseband circuitry 2930, the application circuitry 2925, and/or the memory/storage 2940 may be implemented together on a system on a chip (SOC).

Memory/storage 2940 may be used to load and store data and/or instructions, for example, for system 2900. Memory/ storage 2940 for one embodiment may include any combination of suitable volatile memory (e.g., dynamic random access memory (DRAM)) and/or non-volatile memory (e.g., Flash memory).

In various embodiments, the I/O interface 2910 may include one or more user interfaces designed to enable user interaction with the system and/or peripheral component interfaces designed to enable peripheral component interaction with the system 2900. User interfaces may include, but are not limited, to a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, sensor 2915 may include one or more sensing devices to determine environmental conditions and/or location information related to the system 2900. In some embodiments, the sensors 2915 may include, but are not limited to, a gyro sensor, an accelerometer, a proximity sensor, an ambient light sensor, and a positioning unit. The positioning unit may also be part of, or interact with, the baseband circuitry 2930 and/or RF circuitry 2935 to communicate with components of a positioning network (e.g., a global positioning system (GPS) satellite). In various embodiments, the display 2905 may include a display (e.g., a liquid crystal display, a touch screen display, etc.).

In various embodiments, the system 2900 may be a mobile computing device such as, but not limited to, a laptop computing device, a tablet computing device, a netbook, an ultrabook, a smartphone, and the like. In various embodiments, system 2900 may have more or less components, and/or different architectures.

FIG. 30 shows an example UE, illustrated as UE 3000. UE 3000 may be an implementation of UE 101 or eNB 150 any device described herein. The UE 3000 can include one or more antennas configured to communicate with transmission station, such as a base station (BS), an eNB, or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a WLAN, a WPAN, and/or a WWAN.

FIG. 30 illustrates an example of a UE 3000. The UE 3000 can be any mobile device, a mobile station (MS), a mobile wireless device, a mobile communication device, a tablet, a handset, or other type of mobile wireless computing device. The UE 3000 can include one or more antennas 3008 within housing 3002 that are configured to communicate with a hotspot, BS, an eNB, or other type of WLAN or WWAN access point. A UE may thus communicate with a WAN such as the Internet via an eNB or base station transceiver implemented as part of an asymmetric RAN as detailed above. UE 3000 can be configured to communicate using multiple wireless communication standards, including standards selected from 3GPP LTE, WiMAX, HSPA, Bluetooth, and Wi-Fi standard definitions. The UE 3000 can communicate using separate antennas for each wireless communication standard or shared antennas for multiple wireless communication standards. The UE 3000 can communicate in a WLAN, a WPAN, and/or a WWAN.

FIG. 30 also shows a microphone 3030 and one or more speakers 3012 that can be used for audio input and output from the UE 3000. A display screen 3004 can be a liquid crystal display (LCD) screen, or other type of display screen such as an organic light emitting diode (OLED) display. The display screen 3004 can be configured as a touch screen. The touch screen can use capacitive, resistive, or another type of touch screen technology. An application processor 3014 and a graphics processor 3018 can be coupled to internal memory 3016 to provide processing and display capabilities. A non-volatile memory port 3010 can also be used to provide data I/O options to a user. The non-volatile memory port 3010 can also be used to expand the memory capabilities of the UE 3000. A keyboard 3006 can be integrated with the UE 3000 or wirelessly connected to the UE 3000 to provide additional user input. A virtual keyboard can also be provided using the touch screen. A camera 3022 located on the front (display screen) side or the rear side of the UE 3000 can also be integrated into the housing 3002 of the UE 3000.

Figure 31:
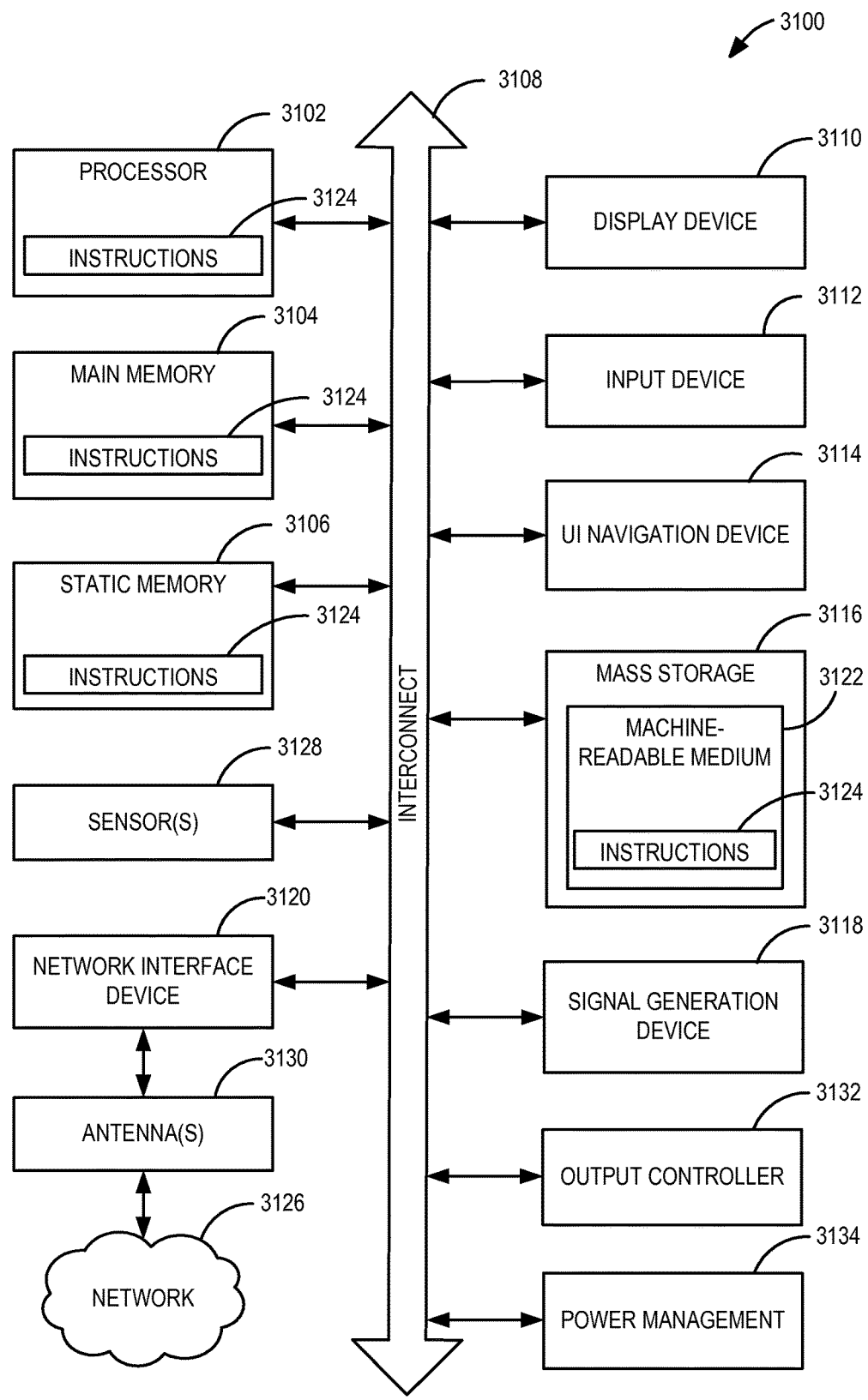
FIG. 31 is a block diagram illustrating an example computer system machine which may be used in association with various embodiments described herein.

FIG. 31 is a block diagram illustrating an example computer system machine 3100 upon which any one or more of the methodologies herein discussed can be run, and may be used to implement eNB 150 and UE 101 or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 3100 includes a processor 3102 (e.g., a central processing unit (CPU), a graphics processing unit (GPU) or both), a main memory 3104, and a static memory 3106, which communicate with each other via an interconnect 3108 (e.g., a link, a bus, etc.). The computer system machine 3100 can further include a video display unit 3110, an alphanumeric input device 3112 (e.g., a keyboard), and a user interface (UI) navigation device 3114 (e.g., a mouse). In one embodiment, the video display unit 3110, input device 3112, and UI navigation device 3114 are a touch screen display. The computer system machine 3100 can additionally include a storage device 3116 (e.g., a drive unit), a signal generation device 3118 (e.g., a speaker), an output controller 3132, a power management controller 3134, and a network interface device 3130 (which can include or operably communicate with one or more antennas 3130, transceivers, or other wireless communications hardware), and one or more sensors 3128, such as a GPS sensor, compass, location sensor, accelerometer, or other sensor.

The storage device 3116 includes a machine-readable medium 3122 on which is stored one or more sets of data structures and instructions 3124 (e.g., software) embodying or utilized by any one or more of the methodologies or functions described herein. The instructions 3124 can also reside, completely or at least partially, within the main memory 3104, static memory 3106, and/or within the processor 3102 during execution thereof by the computer system machine 3100, with the main memory 3104, static memory 3106, and the processor 3102 also constituting machine-readable media.

While the machine-readable medium 3122 is illustrated in an example embodiment to be a single medium, the term "machine-readable medium" can include a single medium or multiple media (e.g., a centralized or distributed database, and/or associated caches and servers) that store the one or more instructions 3124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 3124 can further be transmitted or received over a communications network 3126 using a transmission medium via the network interface device 3130 utilizing any one of a number of well-known transfer protocols (e.g., hypertext transport protocol HTTP). The term "transmission medium" shall be taken to include any medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 3102.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 3102.16 (e.g., 3102.16p), or Bluetooth (e.g., Bluetooth 30.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an API, reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus of an evolved nodeB (eNB) for machine-type communications (MTC), the apparatus comprising:
control circuitry configured to:
determine a super-frame structure, the super-frame structure comprising a certain number of subframes wherein the certain number of subframes for the super-frame structure is set by the eNB, at least in part, based on a coverage enhancement target of a narrowband deployment;
determine configuration information for a user equipment (UE) in communication with the eNB; and
generate a configuration for an MTC control format indicator (M-CFI) for the UE to indicate the determined configuration information; and
transmit circuitry configured to transmit the M-CFI through a narrowband MTC Physical Control Format Indicator Channel (M-PCFICH) within a super-frame configured in accordance with the super-frame structure;
wherein an MTC resource element group (M-REG) is defined for transmission of the M-PCFICH, wherein a plurality of resource elements (REs) are mapped to the M-REG where the M-REG is not used for reference signals;
wherein the eNB further comprises circuitry to map M-PCFICH symbols on indicated M-REGs;
wherein the eNB is arranged to map the M-PCFICH symbols using $$z^{(p)}(i)=[y^{(p)}(4i),y^{(p)}(4i+1),y^{(p)}(4i+2),y^{(p)}(4i+3)]$$

to denote a symbol quadruplet$^i$ for an antenna port$^p$ for M-PCFICH transmission, where $y^{(p)}(k)$, k=0, . . . , 15 represents an M-PCFICH signal for antenna port$^p$ and where p=0, . . . , P−1 represents a number of antenna ports for cell-specific reference signals P∈{1,2,4};
wherein:
$z^{(p)}(0)$ is mapped to the M-REG represented by k=k,
$z^{(p)}(1)$ is mapped to the M-REG represented by k=k+1;
$z^{(p)}(2)$ is mapped to the M-REG represented by k=k+($N_{REG}$/2); and
$z^{(p)}(3)$ is mapped to the M-REG represented by k=k+1+($N_{REG}$/2); and
wherein:
k is an M-REG index;
k=2($N_{ID}$ mod [$N_{REG}$/4]); and
$N_{REG}$ is a number of M-REGs in one subframe of the superframe.

2. The apparatus of claim 1, wherein the M-CFI indicates resource information for an MTC Physical Downlink Control Channel (M-PDCCH) or MTC Physical Downlink Shared Channel (M-PDSCH) transmission.

3. The apparatus of claim 2, wherein the M-PDCCH comprises a number of symbol, slot, subframes, subcarrier, and physical resource blocks (PRB) for the M-PDCCH.

4. The apparatus of claim 2, wherein the transmit circuitry comprises:
block code circuitry configured to generate a codeword;
scrambling circuitry coupled to the block code circuitry and configured to scramble the codeword; and
modulation circuitry configured to generate a plurality of symbols from the scrambled codeword.

5. The apparatus of claim 3, wherein the M-PCFICH is determined from a plurality of symbols by an M-PCFICH mapping of resource elements associated with the symbols onto one or more subframes of the superframe structure.

6. The apparatus of claim 4, wherein the scrambling circuitry is configured to scramble the codeword using a scrambling sequence based on a function of a super-frame number associated with the super-frame.

7. The apparatus of claim 1, wherein the plurality of REs are mapped based at least in part on a first subcarrier and an orthogonal frequency division multiplexing symbol associated with the M-REG.

8. The apparatus of claim 1, wherein the M-REG is allocated over one or more partial subframes of the certain number of subframes of the super-frame.

9. The apparatus of claim 1, wherein the M-REG is allocated over one or more contiguous or non-contiguous full subframes of the certain number of subframe of the super-frame.

10. The apparatus of claim 9, wherein the starting position is mapped in accordance with a physical cell identity.

11. The apparatus of claim 10, wherein the eNB is arranged to map second M-PCFICH symbols using $$z^{(p)}(i)=[y^{(p)}(4i),y^{(p)}(4i+1),y^{(p)}(4i+2),y^{(p)}(4i+3)]$$

to denote a second symbol quadruplet$^i$ for the antenna port$^p$ for second M-PCFICH transmission, where $y^{(p)}(k)$, k=0, . . . , 15 represents second M-PCFICH signal for antenna port$^p$
wherein:
$z^{(p)}(0)$ is mapped to a second M-REG represented by k=k;
$z^{(p)}(1)$ is mapped to the second M-REG represented by k=k+1;
$z^{(p)}(2)$ is mapped to the second M-REG represented by k=k+($N_{REG}$/2); and
$z^{(p)}(3)$ is mapped to the second M-REG represented by k=k+1+($N_{REG}$/2).

12. The apparatus of claim 11, wherein the UE comprises four antenna ports;
wherein a cyclic prefix associated with the super-frame is an extended cyclic prefix; and
wherein:
$N_{REG}$=38.

13. The apparatus of claim 10, wherein the eNB is arranged to map second M-PCFICH symbols using $$z^{(p)}(i)=[y^{(p)}(4i),y^{(p)}(4i+1),y^{(p)}(4i+2),y^{(p)}(4i+3)]$$

to denote a second symbol quadruplet$^1$ for the antenna port$^p$ for second M-PCFICH transmission, where $y^{(p)}(k)$, k=0, . . . , 15 represents second M-PCFICH signal for antenna port$^p$;
wherein:
$z^{(p)}(0)$ is mapped to a second M-REG represented by k=k;
$z^{(p)}(1)$ is mapped to the second M-REG represented by k=k+[$N_{REG}$/4];
$z^{(p)}(2)$ is mapped to the second M-REG represented by k=k+($N_{REG}$/2);
$z^{(p)}(3)$ is mapped to the second M-REG represented by k=k+[3 $N_{REG}$/4].

14. The apparatus of claim 10, wherein the eNB is arranged to map second M-PCFICH symbols using $$z^{(p)}(i)=[y^{(p)}(4i),y^{(p)}(4i+1),y^{(p)}(4i+2),y^{(p)}(4i+3)]$$

to denote a second symbol quadruplet$^i$ for the antenna port$^p$ for second M-PCFICH transmission, where $y^{(p)}(k)$, k=0, . . . , 15, represents the second M-PCFICH signal for antenna port$^p$;

wherein:

$z^{(p)}(0)$ is mapped to a second M-REG represented by k=k;

$z^{(p)}(1)$ is mapped to the second M-REG represented by k=k+1;

$z^{(p)}(2)$ is mapped to the second M-REG represented by k=k+2;

$z^{(p)}(3)$ is mapped to the second M-REG represented by k=k+3.

15. The apparatus of claim 1 further comprising communication circuitry is further configured to receive uplink data from the UE and transmit hybrid automatic repeat request (HARQ) data using a MTC Physical HARQ Indicator Channel (M-PHICH); and wherein the control circuitry is further configured to:

generate the HARQ data based on the received uplink data; and assign resources associated with M-PHICH based on a physical cell identity.

16. A non-transitory computer readable medium comprising instructions that, when executed by one or more processors, configure an evolved nodeB (eNB) for machine-type communications (MTC) comprising:

determining a super-frame structure, the super-frame structure comprising a certain number of subframes wherein the certain number of subframes for the super-frame structure is set by the eNB, at least in part, on a bandwidth for the MTC;

determining configuration information for a user equipment (UE) in communication with the eNB;

generating a configuration for an MTC Control Format Indicator (M-CFI) for the UE to indicate the determined configuration information; and transmitting circuitry configured to transmit the M-CFI through a narrowband MTC Physical Control Format Indicator (M-PCFICH) within a super-frame configured with the super-frame structure;

wherein the M-CFI indicates resource information for an MTC Physical Downlink Control Channel (M-PDCCH) or MTC Physical Downlink Shared Channel (M-PDSCH) transmission;

wherein an MTC resource element group (M-REG) is defined for transmission of the M-PCFICH, wherein a plurality of resource elements (REs) are mapped to the M-REG where the M-REG is not used for reference signals;

wherein the M-REG is allocated over one or more contiguous or non-contiguous full subframes of the super-frame;

wherein the eNB further comprises circuitry to map M-PCFICH symbols on indicated M-REGs, with the starting position in accordance with a physical cell identity;

wherein the eNB is arranged to map the M-PCFICH symbols using $$z^{(p)}(i)=[y^{(p)}(4i),y^{(p)}(4i+1),y^{(p)}(4i+2),y^{(p)}(4i+3)]$$

to denote a symbol quadruplet $i$ for an antenna port $p$ for M-PCFICH transmission, where $y^{(p)}(k)$, k=0, ..., 15, represents an M-PCFICH signal for antenna port $p$ and where p=0, ..., P−1 represents a number of antenna ports for cell-specific reference signals P∈{1,2,4};

wherein:

$z^{(p)}(0)$ is mapped to the M-REG represented by k=k;

$z^{(p)}(1)$ is mapped to the M-REG represented by k=k+1;

$z^{(p)}(2)$ is mapped to the M-REG represented by k=k+$(N_{REG}/2)$; and $z^{(p)}(3)$ is mapped to the M-REG represented by k=k+1+$(N_{REG}/2)$; and wherein:

k is an M-REG index;

k=2($N_{ID}$ mod [$N_{REG}$/4]); and $N_{REG}$ is a number of M-REGs in one subframe of the superframe.

17. The computer readable medium of claim 16, wherein the M-REG is allocated over one or more partial subframes of the super-frame.

18. The computer readable medium of claim 16 wherein the instructions further configure MTC physical broadcast channel (M-PBCH) circuitry to generate a codeword, scramble the codeword, and generate a plurality of symbols from the codeword;

wherein the M-CFI indicates resource information for the MTC Physical Downlink Control Channel (M-PDCCH) or the MTC Physical Downlink Shared Channel (M-PDSCH) transmission.

19. The computer readable medium of claim 16, wherein the plurality of REs are mapped based at least in part on a first subcarrier and an orthogonal frequency division multiplexing symbol associated with the M-REG.

20. An apparatus of a user equipment (UE) for machine-type communications (MTC), the apparatus comprising:

receive circuitry configured to receive a MTC control format indicator (M-CFI) through a narrowband MTC physical control format indicator channel (M-PCFICH) from an enhanced node B (eNB) within a super-frame having a super-frame structure, the super-frame structure comprising a certain number of subframes wherein the certain number of subframes for the super-frame structure is set by the eNB, at least in part, on a bandwidth for the MTC; and control circuitry configured to:

detect configuration information associated with the super-frame structure based on the M-CFI, wherein the detected super frame structure is based, at least in part, on a bandwidth and coverage enhancement target of a narrowband deployment wherein an MTC resource element group (M-REG) is defined for transmission of the M-PCFICH, wherein a plurality of resource elements (REs) are mapped to the M-REG where the M-REG is not used for reference signals;

wherein the M-REG is allocated over one or more contiguous or non-contiguous full subframes of the super-frame;

wherein the eNB further comprises circuitry to map M-PCFICH symbols on indicated M-REGs, with the starting position in accordance with a physical cell identity;

wherein the eNB is arranged to map the M-PCFICH symbols using $$z^{(p)}(i)=[y^{(p)}(4i),y^{(p)}(4i+1),y^{(p)}(4i+2),y^{(p)}(4i+3)]$$

to denote a symbol quadruplet $i$ for an antenna port $p$ for M-PCFICH transmission, where $y^{(p)}(k)$, k=0, ..., 15, represents an M-PCFICH signal for antenna port $p$ and where p=0, ..., P−1 represents a number of antenna ports for cell-specific reference signals P∈{1,2,4};

wherein:

$z^{(p)}(0)$ is mapped to the M-REG represented by k=k;

$z^{(p)}(1)$ is mapped to the M-REG represented by k=k+1;

$z^{(p)}(2)$ is mapped to the M-REG represented by k=k+$(N_{REG}/2)$; and $z^{(p)}(3)$ is mapped to the M-REG represented by $k=k+1+(N_{REG}/2)$; and wherein:

k is an M-REG index;

$k=2(N_{ID} \bmod [N_{REG}/4])$; and $N_{REG}$ is a number of M-REGs in one subframe of the superframe.

21. The apparatus of claim 20 wherein the coverage enhancement target comprises a link budget improvement associated with a periodicity of the super-frame structure.

22. The apparatus of claim 20 wherein the receive circuitry is further configured to:

receive downlink data from the ENB;

generate hybrid automatic repeat request (HARQ) data using the received downlink data;

assign resources associated with an MTC Physical HARQ Indicator Channel (M-PHICH) based on the physical cell identity; and wherein the UE further comprises transmit circuitry configured to transmit the HARQ data using the M-PHICH.

23. The apparatus of claim 20, wherein the M-CFI indicates resource information for an MTC Physical Downlink Control Channel (M-PDCCH) or MTC Physical Downlink Shared Channel (M-PDSCH) transmission.

24. The apparatus of claim 20, wherein the M-PCFICH is determined from a plurality of symbols by an M-PCFICH mapping of resource elements associated with the symbols onto one or more subframes of the superframe structure.

\* \* \* \* \*